US008732660B2

(12) United States Patent
Neill et al.

(10) Patent No.: US 8,732,660 B2
(45) Date of Patent: May 20, 2014

(54) USER INPUT AUTO-COMPLETION

(75) Inventors: Allan W. Neill, N Highland, UT (US); Scott A. Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 587 days.

(21) Appl. No.: 13/019,620

(22) Filed: Feb. 2, 2011

(65) Prior Publication Data

US 2012/0198419 A1    Aug. 2, 2012

(51) Int. Cl.
*G06F 9/44*        (2006.01)

(52) U.S. Cl.
USPC ........... 717/110; 717/106; 717/107; 717/109; 717/143; 707/E17.138

(58) Field of Classification Search
None
See application file for complete search history.

(56) References Cited

U.S. PATENT DOCUMENTS

| | | | |
|---|---|---|---|
| 5,561,421 A | 10/1996 | Smith et al. | |
| 6,667,700 B1 | 12/2003 | McCanne et al. | |
| 6,906,645 B2 | 6/2005 | Jones et al. | |
| 7,026,960 B2 | 4/2006 | Lee et al. | |
| 7,026,962 B1 | 4/2006 | Emami et al. | |
| 7,031,910 B2 | 4/2006 | Eisele | |
| 7,280,920 B1 | 10/2007 | Whiteside et al. | |
| 7,417,568 B2 | 8/2008 | Fallon et al. | |
| 2006/0285760 A1 | 12/2006 | Malvar | |
| 2007/0168320 A1 | 7/2007 | Borthakur et al. | |
| 2007/0168946 A1 * | 7/2007 | Drissi et al. | 717/110 |
| 2007/0168949 A1 * | 7/2007 | Shattuck et al. | 717/115 |
| 2008/0154928 A1 * | 6/2008 | Bashyam et al. | 707/101 |
| 2008/0243518 A1 | 10/2008 | Oraevsky et al. | |
| 2008/0244506 A1 * | 10/2008 | Killian et al. | 717/100 |
| 2009/0018801 A1 | 1/2009 | Gladkova et al. | |
| 2009/0018996 A1 | 1/2009 | Hunt et al. | |
| 2009/0144561 A1 | 6/2009 | Davidson et al. | |
| 2009/0222438 A1 * | 9/2009 | Strandell et al. | 707/5 |
| 2010/0169342 A1 * | 7/2010 | Kenedy et al. | 707/758 |
| 2011/0040827 A1 * | 2/2011 | Katsunuma et al. | 709/203 |
| 2011/0145254 A1 * | 6/2011 | Pragada et al. | 707/740 |
| 2012/0191716 A1 * | 7/2012 | Omoigui | 707/740 |
| 2012/0226691 A1 * | 9/2012 | Edwards | 707/737 |
| 2012/0290574 A1 * | 11/2012 | Isaacson et al. | 707/737 |
| 2013/0132392 A1 * | 5/2013 | Kenedy et al. | 707/737 |
| 2013/0238611 A1 * | 9/2013 | Chaturvedi et al. | 707/723 |

OTHER PUBLICATIONS

"Sequitur Algorith", [Online]. Retrieved from the Internet: http://en.wikipedia.org/wiki/Sequitur_algorithm, (Oct. 2, 2008), 2 pgs.

Cherniavsky, Neva, "Grammar-based compression of DNA sequences", [Online]. Retrieved from the Internet: <URL: http://www.cs.washington.edu/homes/mchermia/dnasequitur/quals.pdf>, (2004), 14 pgs.

Davis, George B, "Clearing the FOG: Fuzzy, Overlapping Groups for Social Networks", [Online]. Retrieved from the Internet: ,http://www.cs.cmu/-gbd/papers/davis05fog.pdf., (Accessed May 21, 2012), 45 pgs.

(Continued)

*Primary Examiner* — Chameli Das
(74) *Attorney, Agent, or Firm* — Schwegman, Lundberg $ Woessner, P.A.

(57) ABSTRACT

Methods and computer program product relate to user input auto-completion. The methods and product are executable on a processing device in a computing system environment so as to provide an auto-completion scheme with enhanced capabilities that improve user efficiency when performing a task.

14 Claims, 55 Drawing Sheets

(56) References Cited

OTHER PUBLICATIONS

Galas, David J, et al., "Set-based Complexity and Biological Information", [Online]. Retrieved from the Internet: http://arxiv.org/ftp/arxiv/papers/0801/0801.4024.pdf, (Jan. 11, 2008), 30 pgs.

Kaymak, Uzay, "Data-drivin Fuzzy Modeling", Erasmus University Rotterdam, [Online]. Retrieved from the Internet: <http://fuzzy.iau.dtu.dk/download/ddfm.ppt><http://74.125.47.132/search?q=cache:ubXdCCWMJ8cJ:fuzzy.iau.dtu.dk/download/ddfm.ppt>, (Oct. 1, 2001), 49 pgs.

Nevill, Craig G, et al., "Identifying Hierarchical Structure in Sequences: A Linear-Time Algorithm", [Online]. Retrieved from the Internet: http://sequitur.info/jair/, (Oct. 27, 2008), 16 pgs.

Palla, Gergely, et al., "Uncovering the overlapping community structure of complex networks in nature and society", [Online]. Retrieved from the Internet: ,http://www.nature.com/nature/journal/v435/n7043/extref/nature03607>, (accessed May 21, 2012), 12 pgs.

Torsello, Andrea, et al., "Beyond Partitions: Allowing Overlapping Groups in Pairwise Clustering", (2008), 4 pgs.

* cited by examiner

| Term | Definition |
| --- | --- |
| Alphabet | The set of all possible symbols currently in use. |
| Atomic symbols | The symbols 0 and 1, which are based on the raw 0 and 1 bit values.<br>All subsequently defined symbols represent tuples that are based on symbols 0 and 1. |
| Character | A symbol that appears in the data stream. |
| Compressed file size | The number of bits that are required to store the encoded data stream, the dictionary, and the symbol-encoding information. |
| Data stream | A sequential stream of characters.<br>The terms data stream and text are synonymous in this document. |
| Dictionary | A collection of information regarding all symbols (the alphabet). |
| Encoded data stream | A data stream of Huffman encoded characters. |
| Pass | The performance of one iteration of the compression procedure applied to the current data stream. |
| Symbol | A unit of information. The information that is represented by a symbol can be from 1 to N binary bits in length. |
| Symbol-encoding information | Symbols in the alphabet are digitally encoded to reduce the amount of space required to store or transmit them electronically. The encoding information is stored and used to decompress the data later.<br><br>A well understood method of minimizing the space required to store a series of characters is the use of minimum weighted path length trees, as given by David Huffman (D. E. Knuth, *The Art of Computer Programming*, 1973, vol. 1, p. 402). |
| Text | A sequential stream of characters.<br>The terms data stream and text are synonymous in this document. |
| Tuple | Two adjoining characters in the data stream or text. The order of the appearance of characters in the tuple is designated as "first" and "last". The notation for tuples is "first>last" to show the order of appearance in the pair of characters and to avoid confusion of the tuples with real numbers. For example, a tuple of symbol 1 followed by symbol 0 is written as 1>0.<br><br>In each pass through the data stream, the most highly occurring tuple is determined. A new symbol is created to represent the tuple in the data stream. The symbol stands for and replaces all occurrences of the tuple in the data stream. |

FIG. 1

Pythagoerean Theorem $$A^2 + B^2 = C^2$$

| Tuple | $A^2$ | $B^2$ | $C^2$ | Hypotenuse |
|---|---|---|---|---|
| 1>5 | 1 | 25 | 26 | 5.1 |
| 3>7 | 9 | 49 | 58 | 7.6 |
| 4>4 | 16 | 16 | 32 | 5.7 |

| Tuple Array | First | | | | | | | |
|---|---|---|---|---|---|---|---|---|
| Last | 0 | 1 | 2 | 3 | 4 | 5 | 6 | 7 |
| 0 | 0>0 | 1>0 | 2>0 | 3>0 | 4>0 | 5>0 | 6>0 | 7>0 |
| 1 | 0>1 | 1>1 | 2>1 | 3>1 | 4>1 | 5>1 | 6>1 | 7>1 |
| 2 | 0>2 | 1>2 | 2>2 | 3>2 | 4>2 | 5>2 | 6>2 | 7>2 |
| 3 | 0>3 | 1>3 | 2>3 | 3>3 | 4>3 | 5>3 | 6>3 | 7>3 |
| 4 | 0>4 | 1>4 | 2>4 | 3>4 | 4>4 | 5>4 | 6>4 | 7>4 |
| 5 | 0>5 | 1>5 | 2>5 | 3>5 | 4>5 | 5>5 | 6>5 | 7>5 |
| 6 | 0>6 | 1>6 | 2>6 | 3>6 | 4>6 | 5>6 | 6>6 | 7>6 |
| 7 | 0>7 | 1>7 | 2>7 | 3>7 | 4>7 | 5>7 | 6>7 | 7>7 |

FIG. 8

| Alphabet | Definition | |
|---|---|---|
| | First | Last |
| 0 | 0 | - |
| 1 | 1 | - |

| Tuple Array | First | |
|---|---|---|
| Last | 0 | 1 |
| 0 | 0>0 | 1>0 |
| 1 | 0>1 | 1>1 |

40

| Tuple Count | First | |
|---|---|---|
| Last | 0 | 1 |
| 0 | 95 | 96 |
| 1 | 96 | 48 |

| Symbol | Count |
|---|---|
| 0 | 240 |
| 1 | 144 |
| Total | 384 |

| Alphabet | Definition | |
|---|---|---|
| | First | Last |
| 0 | 0 | - |
| 1 | 1 | - |
| 2 | 1 | 0 |

| Symbol | Count |
|--------|-------|
| 0 | 144 |
| 1 | 48 |
| 2 | 96 |
| Total | 288 |

41¹

| Symbol | Huffman Code | Bit Length | Symbol Count | Total Bits |
|---|---|---|---|---|
| 0 | 0 | 1 | 144 | 144 |
| 1 | 101 | 3 | 48 | 144 |
| 2 | 11 | 2 | 96 | 192 |
| EOF | 100 | 3 | 1 | 3 |
| | | | Total Bits for Data | 483 |

FIG. 17

| Compression Overhead | Current |
|---|---|
| File Information | 8 |
| Dictionary Length | 2 |
| Tree Length | 15 |
| Total Overhead | 25 |

FIG. 18

| Compressed File Size | Original Bit Count | Current Bit Count |
|---|---|---|
| Data Length | 384 | 483 |
| Overhead | 0 | 25 |
| Total Bits Needed | 384 | 508 |
| Compression Ratio | | 132% |

FIG. 19

| Tuple Array | First | | |
|---|---|---|---|
| Last | 0 | 1 | 2 |
| 0 | 0>0 | 1>0 | 2>0 |
| 1 | 0>1 | 1>1 | 2>1 |
| 2 | 0>2 | 1>2 | 2>2 |

| Tuple Count | First | | |
|---|---|---|---|
| Last | 0 | 1 | 2 |
| 0 | 48 | 0 | (56) |
| 1 | 9 | 0 | 39 |
| 2 | 48 | 48 | 0 |

| Alphabet | Definition | |
|---|---|---|
| | First | Last |
| 0 | 0 | - |
| 1 | 1 | - |
| 2 | 1 | 0 |
| 3 | 2 | 0 |

| Symbol | Count | Huffman Code |
|--------|-------|--------------|
| 0      | 88    | 11           |
| 1      | 48    | 01           |
| 2      | 40    | 001          |
| 3      | 58    | 10           |
| EOF    | 1     | 000          |

FIG. 24

| Symbol | Huffman Code | Bit Length | Symbol Count | Total Bits |
|--------|--------------|------------|--------------|------------|
| 0      | 11           | 2          | 88           | 176        |
| 1      | 01           | 2          | 48           | 96         |
| 2      | 001          | 3          | 40           | 120        |
| 3      | 10           | 2          | 56           | 112        |
| EOF    | 000          | 3          | 1            | 3          |
|        |              |            | Total Bits for Data | 507 |

| Compression Overhead | Current |
|---|---|
| File Information | 8 |
| Dictionary Length | 6 |
| Tree Length | 24 |
| Total Overhead | 38 |

| Compressed File Size | Original | Current |
|---|---|---|
| Data Length | 384 | 507 |
| Overhead | 0 | 38 |
| Total Bits Needed | 384 | 545 |
| Compression Ratio | | 141% |

| Tuple Array | First | | | |
|---|---|---|---|---|
| Last | 0 | 1 | 2 | 3 |
| 0 | 0>0 | 1>0 | 2>0 | 3>0 |
| 1 | 0>1 | 1>1 | 2>1 | 3>1 |
| 2 | 0>2 | 1>2 | 2>2 | 3>2 |
| 3 | 0>3 | 1>3 | 2>3 | 3>3 |

Figures 29, 30:
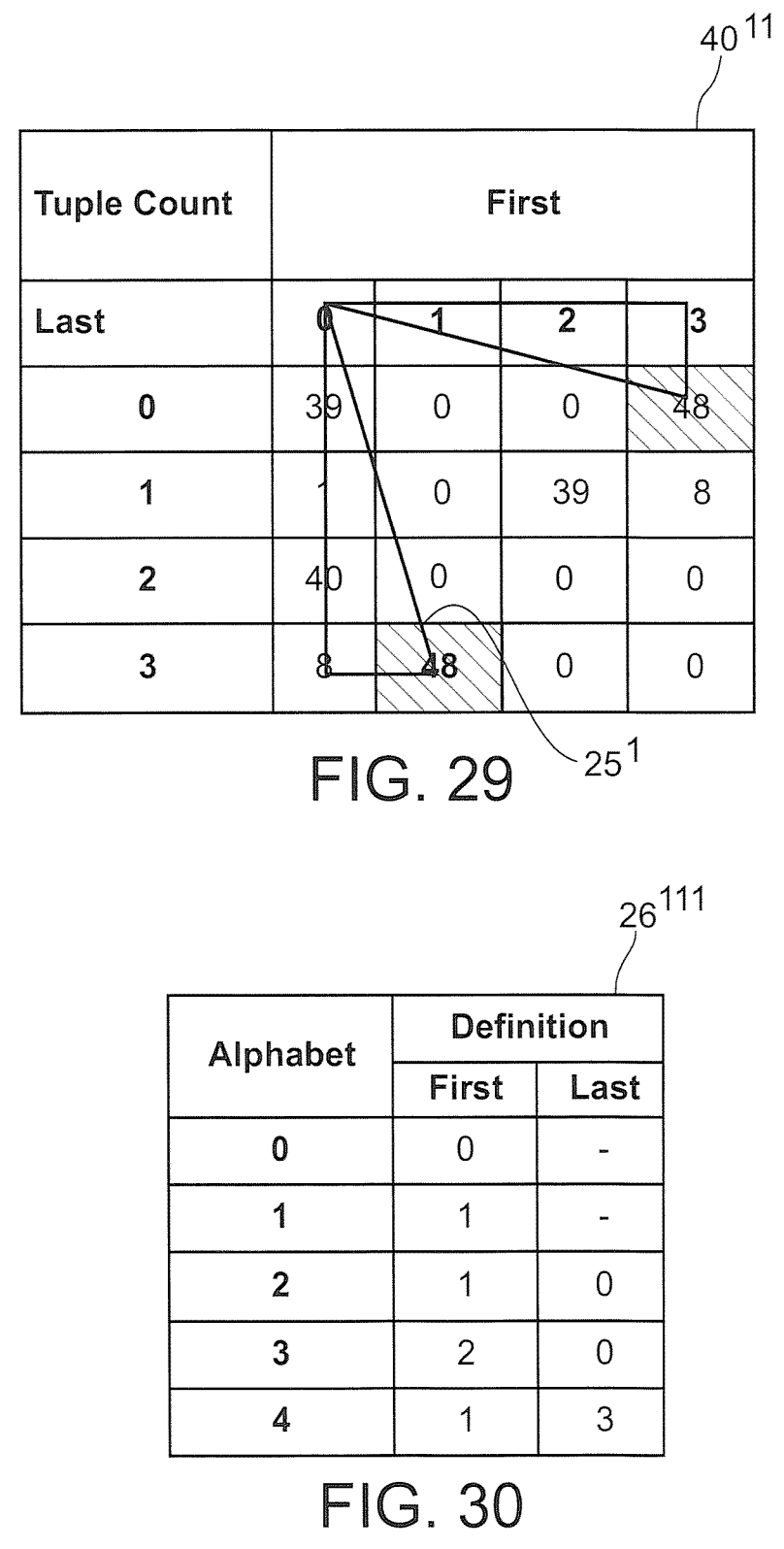

| Tuple Count | First | | | |
|---|---|---|---|---|
| Last | 0 | 1 | 2 | 3 |
| 0 | 39 | 0 | 0 | 48 |
| 1 | 1 | 0 | 39 | 8 |
| 2 | 40 | 0 | 0 | 0 |
| 3 | 8 | 48 | 0 | 0 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |

| Symbol | Symbol Count | Huffman Code |
|---|---|---|
| 0 | 88 | 0 |
| 1 | 0 | - |
| 2 | 40 | 111 |
| 3 | 8 | 1101 |
| 4 | 48 | 10 |
| EOF | 1 | 1100 |

| Symbol | Huffman Code | Bit Length | Symbol Count | Total Bits |
|---|---|---|---|---|
| 0 | 0 | 1 | 88 | 88 |
| 2 | 111 | 3 | 40 | 120 |
| 3 | 1101 | 4 | 8 | 32 |
| 4 | 10 | 2 | 48 | 96 |
| EOF | 1100 | 4 | 1 | 4 |
| | | | Total Bits for Data | 340 |

| Compression Overhead | Current |
|---|---|
| File Information | 8 |
| Dictionary Length | 10 |
| Tree Length | 24 |
| Total Overhead | 42 |

| Compressed File Size | Original | Current |
|---|---|---|
| Data Length | 384 | 340 |
| Overhead | 0 | 42 |
| Total Bits Needed | 384 | 382 |
| Compression Ratio | | 99% |

| Tuple Array | First | | | | |
|---|---|---|---|---|---|
| Last | 0 | 1 | 2 | 3 | 4 |
| 0 | 0>0 | 1>0 | 2>0 | 3>0 | 4>0 |
| 1 | 0>1 | 1>1 | 2>1 | 3>1 | 4>1 |
| 2 | 0>2 | 1>2 | 2>2 | 3>2 | 4>2 |
| 3 | 0>3 | 1>3 | 2>3 | 3>3 | 4>3 |
| 4 | 0>4 | 1>4 | 2>4 | 3>4 | 4>4 |

| Tuple Count | First | | | | |
|---|---|---|---|---|---|
| Last | 0 | 1 | 2 | 3 | 4 |
| 0 | 39 | 0 | 0 | 0 | (48) |
| 1 | 0 | 0 | 0 | 0 | 0 |
| 2 | 40 | 0 | 0 | 0 | 0 |
| 3 | 8 | 0 | 0 | 0 | 0 |
| 4 | 1 | 0 | 39 | 8 | 0 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |
| 5 | 4 | 0 |

| Symbol | Symbol Count | Huffman Code |
|---|---|---|
| 0 | 40 | 10 |
| 1 | 0 | - |
| 2 | 40 | 01 |
| 3 | 8 | 001 |
| 4 | 0 | - |
| 5 | 48 | 11 |
| EOF | 1 | 000 |

| Symbol | Huffman Code | Bit Length | Symbol Count | Total Bits |
|---|---|---|---|---|
| 0 | 10 | 2 | 40 | 80 |
| 2 | 01 | 2 | 40 | 80 |
| 3 | 001 | 3 | 8 | 24 |
| 5 | 11 | 2 | 48 | 96 |
| EOF | 000 | 3 | 1 | 3 |
| | | | Total Bits for Data | 283 |

FIG. 41

| Compression Overhead | Current |
|---|---|
| File Information | 8 |
| Dictionary Length | 16 |
| Tree Length | 24 |
| Total Overhead | 48 |

FIG. 42

| Compressed File Size | Original | Current |
|---|---|---|
| Data Length | 384 | 283 |
| Overhead | 0 | 48 |
| Total Bits Needed | 384 | 331 |
| Compression Ratio | | 86% |

FIG. 43

| Tuple Array | First | | | | | |
|---|---|---|---|---|---|---|
| Last | 0 | 1 | 2 | 3 | 4 | 5 |
| 0 | 0>0 | 1>0 | 2>0 | 3>0 | 4>0 | 5>0 |
| 1 | 0>1 | 1>1 | 2>1 | 3>1 | 4>1 | 5>1 |
| 2 | 0>2 | 1>2 | 2>2 | 3>2 | 4>2 | 5>2 |
| 3 | 0>3 | 1>3 | 2>3 | 3>3 | 4>3 | 5>3 |
| 4 | 0>4 | 1>4 | 2>4 | 3>4 | 4>4 | 5>4 |
| 5 | 0>5 | 1>5 | 2>5 | 3>5 | 4>5 | 5>5 |

| Tuple Count | First | | | | | |
|---|---|---|---|---|---|---|
| Last | 0 | 1 | 2 | 3 | 4 | 5 |
| 0 | 0 | 0 | 0 | 0 | 0 | 39 |
| 1 | 0 | 0 | 0 | 0 | 0 | 0 |
| 2 | 39 | 0 | 0 | 0 | 0 | 1 |
| 3 | 0 | 0 | 0 | 0 | 0 | 8 |
| 4 | 0 | 0 | 0 | 0 | 0 | 0 |
| 5 | 1 | 0 | 39 | 8 | 0 | 0 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |
| 5 | 4 | 0 |
| 6 | 2 | 5 |

| Symbol | Symbol Count | Huffman Code |
|---|---|---|
| 0 | 40 | 0 |
| 1 | 0 | - |
| 2 | 1 | 10100 |
| 3 | 8 | 1011 |
| 4 | 0 | - |
| 5 | 9 | 100 |
| 6 | 39 | 11 |
| EOF | 1 | 10101 |

| Symbol | Huffman Code | Bit Length | Symbol Count | Total Bits |
|---|---|---|---|---|
| 0 | 0 | 1 | 40 | 40 |
| 2 | 10100 | 5 | 1 | 5 |
| 3 | 1011 | 4 | 8 | 32 |
| 5 | 100 | 3 | 9 | 27 |
| 6 | 11 | 2 | 39 | 78 |
| EOF | 10101 | 5 | 1 | 5 |
| | | | Total Bits for Data | 187 |

| Compression Overhead | Current |
|---|---|
| File Information | 8 |
| Dictionary Length | 22 |
| Tree Length | 29 |
| Total Overhead | 59 |

FIG. 50

| Compressed File Size | Original | Current |
|---|---|---|
| Data Length | 384 | 187 |
| Overhead | 0 | 59 |
| Total Bits Needed | 384 | 246 |
| Compression Ratio | | 64% |

FIG. 51

| Tuple Array | First | | | | | | |
|---|---|---|---|---|---|---|---|
| Last | 0 | 1 | 2 | 3 | 4 | 5 | 6 |
| 0 | 0>0 | 1>0 | 2>0 | 3>0 | 4>0 | 5>0 | 6>0 |
| 1 | 0>1 | 1>1 | 2>1 | 3>1 | 4>1 | 5>1 | 6>1 |
| 2 | 0>2 | 1>2 | 2>2 | 3>2 | 4>2 | 5>2 | 6>2 |
| 3 | 0>3 | 1>3 | 2>3 | 3>3 | 4>3 | 5>3 | 6>3 |
| 4 | 0>4 | 1>4 | 2>4 | 3>4 | 4>4 | 5>4 | 6>4 |
| 5 | 0>5 | 1>5 | 2>5 | 3>5 | 4>5 | 5>5 | 6>5 |
| 6 | 0>6 | 1>6 | 2>6 | 3>6 | 4>6 | 5>6 | 6>6 |

| Tuple Count | First | | | | | | |
|---|---|---|---|---|---|---|---|
| Last | 0 | 1 | 2 | 3 | 4 | 5 | 6 |
| 0 | 0 | 0 | 0 | 0 | 0 | 4 | 35 |
| 1 | 0 | 0 | 0 | 0 | 0 | 0 | 0 |
| 2 | 0 | 0 | 0 | 0 | 0 | 1 | 0 |
| 3 | 0 | 0 | 0 | 0 | 0 | 4 | 4 |
| 4 | 0 | 0 | 0 | 0 | 0 | 0 | 0 |
| 5 | 1 | 0 | 0 | 8 | 0 | 0 | 0 |
| 6 | (39) | 0 | 0 | 0 | 0 | 0 | 0 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |
| 5 | 4 | 0 |
| 6 | 2 | 5 |
| 7 | 0 | 6 |

| Symbol | Symbol Count | Huffman Code |
|---|---|---|
| 0 | 1 | 0100 |
| 1 | 0 | - |
| 2 | 1 | 01011 |
| 3 | 8 | 011 |
| 4 | 0 | - |
| 5 | 9 | 00 |
| 6 | 0 | - |
| 7 | 39 | 1 |
| EOF | 1 | 01010 |

| Symbol | Huffman Code | Bit Length | Symbol Count | Total Bits |
|---|---|---|---|---|
| 0 | 0100 | 4 | 1 | 4 |
| 2 | 01011 | 5 | 1 | 5 |
| 3 | 011 | 3 | 8 | 24 |
| 5 | 00 | 2 | 9 | 18 |
| 7 | 1 | 1 | 39 | 39 |
| EOF | 01010 | 5 | 1 | 5 |
| | | | Total Bits for Data | 95 |

FIG. 58

| Compression Overhead | Current |
|---|---|
| File Information | 8 |
| Dictionary Length | 28 |
| Tree Length | 35 |
| Total Overhead | 71 |

| Compressed File Size | Original | Current |
|---|---|---|
| Data Length | 384 | 95 |
| Overhead | 0 | 71 |
| Total Bits Needed | 384 | 166 |
| Compression Ratio | | 43% |

| Symbol | Occurrences | Huffman Code | Original Bits | Total Original Bits Represented | % of File Represented |
|---|---|---|---|---|---|
| 7 | 39 | 1 | 01011000 | 312 | 81.2 |
| 5 | 9 | 00 | 11000 | 45 | 11.7 |
| 3 | 8 | 011 | 100 | 24 | 6.2 |
| 2 | 1 | 01011 | 10 | 2 | 0.5 |
| 0 | 1 | 0100 | 0 | 1 | 0.3 |
| EOF | 1 | 01010 | N/A | N/A | N/A |

61

| Pre-Fix Order Parse of the Huffman Tree | | |
|---|---|---|
| Path | Symbol | Binary Symbol |
| 110 | 5 | 0101 |
| 110 | 0 | 0000 |
| 10 | 8 | 1000 |
| 0 | 2 | 0010 |
| 0 | 3 | 0011 |
| 0 | 7 | 0111 |

| Binary Powers | Decimal Value | Binary Value | Number of Bits |
|---|---|---|---|
| $2^0$ | 1 | 1 | 1 |
| $2^1$ | 2 | 10 | 2 |
| $2^2$ | 4 | 100 | 3 |
| $2^3$ | 8 | 1000 | 4 |
| $2^4$ | 16 | 10000 | 5 |

62

| Symbol | Tuple First | Tuple Last | Bits per Symbol | Binary Values First | Binary Values Last | Stored Bits |
|---|---|---|---|---|---|---|
| 2 | 1 | 0 | 1 | 1 | 0 | 10 |
| 3 | 2 | 0 | 2 | 10 | 00 | 1000 |
| 4 | 1 | 3 | 2 | 01 | 11 | 0111 |
| 5 | 4 | 0 | 3 | 100 | 000 | 100000 |
| 6 | 2 | 5 | 3 | 010 | 101 | 010101 |
| 7 | 0 | 6 | 3 | 000 | 110 | 000110 |

FIG. 65

0 5 7 7 7 7 7 7 7 7 7 7 7 7 7 7 7 7 7 7 7 7 7 7 7 7 7 7 3 5 7
7 3 5 7 7 7 7 7 7 7 3 5 7 3 5 3 5 3 5 3 5 3 5 2 EOF

FIG. 66

| Symbol | Huffman Code |
|---|---|
| 0 | 0100 |
| 2 | 01011 |
| 3 | 011 |
| 5 | 00 |
| 7 | 1 |
| EOF | 01010 |

| File Type | Symbol Width | Huffman Tree | |
|---|---|---|---|
| Dictionary | | | Encoded Data |
| | | EOF | Pad Bits |

| 0000 | 0000 | 1100101110000010100000100001100111 | |
|---|---|---|---|
| 1010000111000001010100110 | | 010000111111111 | |
| 1111111111111110110011101100111111101100101100 | | | |
| 0110001100011000110001011 | | 01010 | x |

| Symbol | Bits per Symbol |
|--------|-----------------|
| 2 | 1 |
| 3 | 2 |
| 4 | 2 |
| 5 | 3 |
| 6 | 3 |
| 7 | 3 |

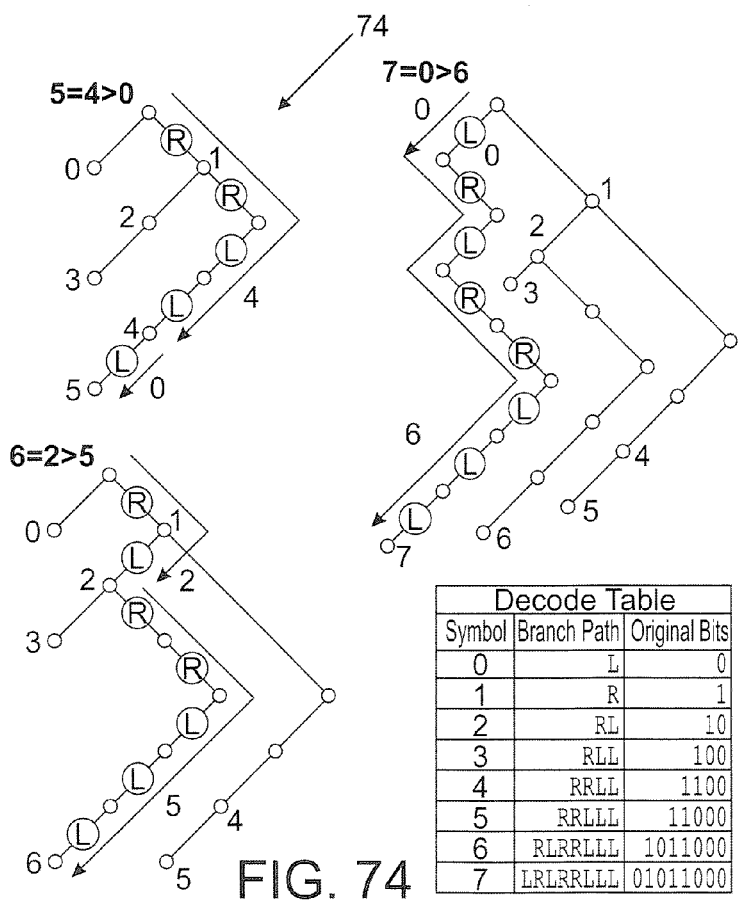
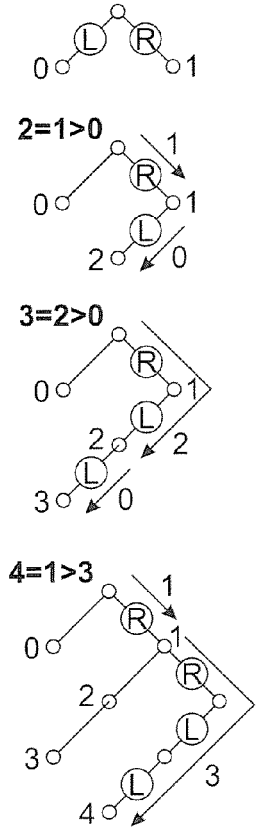
FIG. 73
FIG. 74

| Encoded Data | Symbol and Original Bits Represented |
|---|---|
| 0100 | Symbol 0 = 0 |
| 00 | Symbol 5 = 11000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |

FIG. 82A

| Encoded Data | Symbol and Original Bits Represented |
|---|---|
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 01011 | Symbol 2 = 10 |
| 01010 | EOF=done |

FIG. 82B

| Symbol | Tuple | |
|---|---|---|
| | First | Last |
| 0 | atomic | atomic |
| 1 | atomic | atomic |
| 2 | 1 | 0 |
| 3 | 2 | 0 |
| 4 | 1 | 3 |
| 5 | 4 | 0 |
| 6 | 5 | 3 |
| 7 | 5 | 0 |
| 8 | 7 | 2 |

| Symbol | Count |
|--------|-------|
| 0 | 1 |
| 1 | 0 |
| 2 | 1 |
| 3 | 0 |
| 4 | 0 |
| 5 | 1 |
| 6 | 14 |
| 7 | 0 |
| 8 | 14 |
| EOF | 1 |

| Symbol | Symbol Count | Huffman Code |
|---|---|---|
| 0 | 1 | 1001 |
| 1 | 0 | – |
| 2 | 1 | 1010 |
| 3 | 0 | – |
| 4 | 0 | – |
| 5 | 1 | 1011 |
| 6 | 14 | 11 |
| 7 | 0 | – |
| 8 | 14 | 0 |
| EOF | 1 | 1000 |

| Term | Definition |
|---|---|
| Coded Huffman tree | The path information for each symbol that appears in the Huffman tree and its value. We convert the symbol's digital value to binary. Each symbol is stored in the same number of bits, as determined by the symbol with the largest digital value and stored as the "symbol width". |
| File type | The first four bits in the file are reserved for the version number of the file format, called the *file type*. This field allows flexibility for future versions of the software that might be used to write the encoded data to the storage media. The file type indicates which version of the software was used when we saved the file in order to allow the file to be decompressed later. |
| Symbol width | The second four bits in the compressed file are reserved for the *maximum symbol width*. This is the number of bits that it takes to store in binary form the largest symbol value. The actual value stored is 4 less than the number of bits required to store the largest symbol value in the compressed data. When we read the value, we add four to the stored number to get the actual maximum symbol width. |

Fig. 94

```
TreeSet s = new TreeSet();

for (int i = 0; i < MAX; i++) {
    System.out.println(" - Storing Integer(" + i - ")");
    s.add(new Integer(i));
}

/*
 * Attempting to add any of the following
 * elements will result in a "java.lang.ClassCastException" runtime
 * exception:
 *
 * s.add((Object)"Melody");
 * s.add("Jeff");
 */

Iterator i = s.iterator();
while (i.hasNext()) {
System.out.println(i.next());
}
```

FIG. 99a

USER INPUT AUTO-COMPLETION

FIELD OF THE INVENTION

The present invention relates generally to the computing field, and more particularly, to a computer program product and method that use relevancy groups to expand the power and abilities of auto-completion technology as it has developed to date.

BACKGROUND OF THE INVENTION

There are currently a number of collaborative, productivity and creative tools available to computer operators that are designed to improve user efficiency and enhance the overall user experience. For example, today's software developer has many integrated development environment (IDE) tools from which to choose. Some are commercially available for money and are closed source (MSFT VisualStudio) and some are free and are open source (Eclipse, NetBeans, etc). Some are graphical (color coded syntax, collapse/expand, visual break points and stack pointers). Some allow for integrated build and test. They are available for many programming languages such as C#, C, C++, JAVA (computer programming language), Python, etc. Some allow for simple jumps to declarations or references of objects or symbols (mouse over, tabbed windows, etc). Some have access to help or documentation that describe various system modules and libraries and their APIs, parameters, return code, and exceptions. Some have the ability to automatically generate some code under certain conditions (constructors, accessor methods, gets/sets, exception handlers, return values, error codes, etc). Some allow for work queues or to do lists so that the programmer can come back to certain files to finish skeletons, stubs, or other placeholder members or methods.

Almost all these tools have some form of auto-complete where the tool is constantly checking for valid syntax and for objects that are in scope and can be resolved and what members are available from those objects, or even local scope if the language is not an object oriented language. In addition, many IDEs have access to local or online sample code that can be used as a reference or which can be used to jumpstart a certain procedure or method. The Internet is full of code samples that can be used as patterns for new code that need to be written to perform certain functions (read a buffered file, issue a REST request, handle exceptions, spawn new threads from a thread pool, etc). However, under current auto-complete schemes access to these sample code snippets or files is manual and must be explicitly initiated by the programmer.

There are no tools currently available that can automatically sense and detect the kind of code that is being written and automatically suggest possible sample code that can be used in place of the code that is about to be written. A need exists for a computer program and method that effectively automates the auto-complete process thereby creating a way to program that has never before existed. Such an approach could effectively improve the code overall while also resulting in more and better code reuse while programming.

SUMMARY OF THE INVENTION

The foregoing and other objects are solved by associating lookups in lookup repositories of a useful application tool into relevancy groups based upon detected common patterns in those lookups. Based upon user input, lookups from the closest relevancy group are presented to the user for possible selection and actual use. This auto-complete process is triggered without user request each time a new or modified user input is received by the processing device. This user input auto-complete scheme is particularly useful when used in conjunction with IDE tools to allow auto-completion of user inputs of partial code and even non-complete or non-compilable code with a lookup of sample code that actually does what the user input only suggested. In this way code writing is simplified and streamlined and programmer efficiency and productivity are substantially increased.

Additionally, it should be appreciated that this user input auto-complete scheme is useful when used in conjunction with almost any "look ahead" type application where the current use is limited to structured data with explicit lookups. Thus, the user input auto-complete scheme could be used in conjunction with any collaborative, productivity or creative tool such as: (1) a word processor that looks for "paragraphs similar to what I am currently writing"; (2) a spread sheet program that looks for similar sheets to what I am currently completing; (3) a Photoshop-GIMP type application that looks for images close to what is currently being edited; and (4) an iTunes/Rapsody type application that finds music similar to what is currently being listened to or searched for. Advantageously, the user input auto-completion scheme provides for a more intelligent and intuitive way to quickly suggest to users possible insertions and replacements for what they are doing.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention, and together with the description serve to explain the principles of the invention. In the drawings:

FIG. 1 is a table in accordance with the present invention showing terminology;

FIG. 8 is an initial dictionary in accordance with the present invention for the data stream of FIG. 9;

FIGS. 9-60 are iterative data streams and table sin accordance with the present invention depicting dictionaries, arrays, tuple counts, encoding, and the like illustrative of multiple passes through the compression algorithm;

FIG. 61 is a chart in accordance with the present invention showing compression optimization;

FIG. 62 is a table in accordance with the present invention showing compression statistics;

FIGS. 63-69 are diagrams and table sin accordance with the present invention relating to storage of a compressed file;

FIGS. 70-82*b* are data streams tree diagrams and tables in accordance with the present invention relating to decompression of a compressed file;

FIGS. 84-93 are diagrams in accordance with a "fast approximation" embodiment of the invention that utilizes key information of an earlier compressed file for a file under present consideration having patterns substantially similar to the earlier compressed file;

FIGS. 94-97 are definitions and diagrams in accordance with the present invention showing a use of "digital spectrum" embodiment of an encoded file, including distances between filed;

FIGS. 99*a*-99*c* are display screens illustrating the benefits provided by application of the user input auto-completion method schematically illustrated in FIG. 98 as compared to prior art auto-completion schemes.

Figure 2:
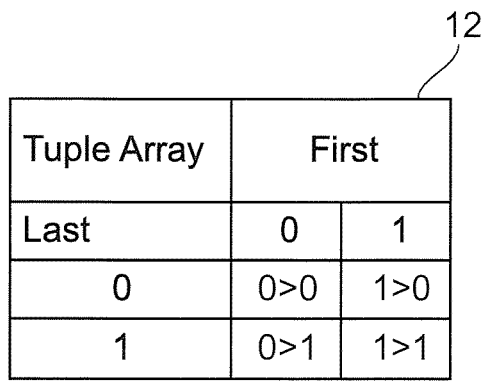
FIG. 2 is a table in accordance with the present invention showing a tuple array and tuple nomenclature.

Reference will now be made in detail to the present preferred embodiment of the invention, examples of which are illustrated in the accompanying drawings.

DETAILED DESCRIPTION OF THE PREFERRED EMBODIMENTS OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for optimizing data compression of digital data and providing for animation of data files.

In a representative embodiment, a user input auto-completion method for executing on a processing device in a computing system environment is based upon detecting common patterns in the lookups in the lookup repositories of an application tool in use on the processing device and grouping those lookups into different relevancy groups based upon detected common patterns. Preferably, the pattern detection scheme is "discovery oriented". In other words, the scheme is arbitrary or open ended and the pattern detecting agent is capable of detecting substantially any pattern on any arbitrarily sized set of data or parsable files of any type, kind or format. The common pattern evaluation or analysis is preferably completed on data files bit by bit, byte by byte and on parsable files token by token so as to allow detection of common patterns no matter the subject matter of the files whether it be words, spreadsheets of numbers, pictures (e.g. .jpg) or other.

One particularly useful pattern detection agent is the subject matter of co-pending patent application Ser. No. 12/637,807, entitled "Grouping and Differentiating Files Based On Content", filed on Dec. 15, 2009 and owned by the Assignee of the present invention (the disclosure of which is fully incorporated herein by reference).

In a representative embodiment of this pattern detection agent, compression occurs by finding highly occurring patterns in data streams, and replacing them with newly defined symbols that require less space to store than the original patterns. The goal is to eliminate as much redundancy from the digital data as possible. The end result has been shown by the inventor to achieve greater compression ratios on certain tested files than algorithms heretofore known.

In information theory, it is well understood that collections of data contain significant amounts of redundant information. Some redundancies are easily recognized, while others are difficult to observe. A familiar example of redundancy in the English language is the ordered pair of letters QU. When Q appears in written text, the reader anticipates and expects the letter U to follow, such as in the words queen, quick, acquit, and square. The letter U is mostly redundant information when it follows Q. Replacing a recurring pattern of adjacent characters with a single symbol can reduce the amount of space that it takes to store that information. For example, the ordered pair of letters QU can be replaced with a single memorable symbol when the text is stored. For this example, the small Greek letter alpha ($\alpha$) is selected as the symbol, but any could be chosen that does not otherwise appear in the text under consideration. The resultant compressed text is one letter shorter for each occurrence of QU that is replaced with the single symbol ($\alpha$), e.g., "$\alpha$een," "$\alpha$ick," "ac$\alpha$it," and "s$\alpha$are." Such is also stored with a definition of the symbol alpha ($\alpha$) in order to enable the original data to be restored. Later, the compressed text can be expanded by replacing the symbol with the original letters QU. There is no information loss. Also, this process can be repeated many times over to achieve further compression.

DEFINITIONS

With reference to FIG. 1, a table 10 is used to define terminology used in the below compression method and procedure.

Discussion

Redundancy is the superfluous repetition of information. As demonstrated in the QU example above, adjacent characters in written text often form expected patterns that are easily detected. In contrast, digital data is stored as a series of bits where each bit can have only one of two values: off (represented as a zero (0)) and on (represented as a one (1)). Redundancies in digital data, such as long sequences of zeros or ones, are easily seen with the human eye. However, patterns are not obvious in highly complex digital data. The invention's methods and procedures identify these redundancies in stored information so that even highly complex data can be compressed. In turn, the techniques can be used to reduce, optimize, or eliminate redundancy by substituting the redundant information with symbols that take less space to store than the original information. When it is used to eliminate redundancy, the method might originally return compressed data that is larger than the original. This can occur because information about the symbols and how the symbols are encoded for storage must also be stored so that the data can be decompressed later. For example, compression of the word "queen" above resulted in the compressed word "$\alpha$een." But a dictionary having the relationship QU=$\alpha$ also needed to be stored with the word "αeen," which makes a "first pass" through the compression technique increase in size, not decrease. Eventually, however, further "passes" will stop increasing and decrease so rapidly, despite the presence of an ever-growing dictionary size, that compression ratios will be shown to greatly advance the state of the art. By automating the techniques with computer processors and computing software, compression will also occur exceptionally rapidly. In addition, the techniques herein will be shown to losslessly compress the data.

The Compression Procedure

The following compression method iteratively substitutes symbols for highly occurring tuples in a data stream. An example of this process is provided later in the document.

Prerequisites

The compression procedure will be performed on digital data. Each stored bit has a value of binary 0 or binary 1. This series of bits is referred to as the original digital data.

Preparing the Data

The original digital data is examined at the bit level. The series of bits is conceptually converted to a stream of characters, referred to as the data stream that represents the original data. The symbols 0 and 1 are used to represent the respective raw bit values in the new data stream. These symbols are considered to be atomic because all subsequently defined symbols represent tuples that are based on 0 and 1.

A dictionary is used to document the alphabet of symbols that are used in the data stream. Initially, the alphabet consists solely of the symbols 0 and 1.

Compressing the Data Stream

The following tasks are performed iteratively on the data stream:

Identifying all possible tuples that can occur for the set of characters that are in the current data stream.

Determining which of the possible tuples occurs most frequently in the current data stream. In the case of a tie, use the most complex tuple. (Complexity is discussed below.)

Creating a new symbol for the most highly occurring tuple, and add it to the dictionary.

Replacing all occurrences of the most highly occurring tuple with the new symbol.

Encoding the symbols in the data stream by using an encoding scheme, such as a path-weighted Huffman coding scheme.

Calculating the compressed file size.

Determining whether the compression goal has been achieved.

Repeating for as long as necessary to achieve optimal compression. That is, if a stream of data were compressed so completely that it was represented by a single bit, it and its complementary dictionary would be larger than the original representation of the stream of data absent the compression. (For example, in the QU example above, if "α" represented the entire word "queen," the word "queen" could be reduced to one symbol, e.g., "α." However, this one symbol and its dictionary (reciting "queen=α" is larger than the original content "queen.") Thus, optimal compression herein recognizes a point of marginal return whereby the dictionary grows too large relative to the amount of compression being achieved by the technique.

Each of these steps is described in more detail below.

Identifying all Possible Tuples

From FIG. 1, a "tuple" is an ordered pair of adjoining characters in a data stream. To identify all possible tuples in a given data stream, the characters in the current alphabet are systematically combined to form ordered pairs of symbols. The left symbol in the pair is referred to as the "first" character, while the right symbol is referred to as the "last" character. In a larger context, the tuples represent the "patterns" examined in a data stream that will yield further advantage in the art.

In the following example and with any data stream of digital data that can be compressed according to the techniques herein, two symbols (0 and 1) occur in the alphabet and are possibly the only symbols in the entire data stream. By examining them as "tuples," the combination of the 0 and 1 as ordered pairs of adjoining characters reveals only four possible outcomes, i.e., a tuple represented by "00," a tuple represented by "01," a tuple represented by "10," and a tuple represented by "11."

With reference to FIG. 2, these four possibilities are seen in table 12. In detail, the table shows the tuple array for characters 0 and 1. In the cell for column 0 and row 0, the tuple is the ordered pair of 0 followed by 0. The shorthand notation of the tuple in the first cell is "0>0". In the cell for column 0 and row 1, the tuple is 0 followed by 1, or "0>1". In the cell for column 1 and row 0, the tuple is "1>0". In the cell for column 1 and row 1, the tuple is "1>1".

Determining the Most Highly Occurring Tuple

With FIG. 2 in mind, it is determined which tuple in a bit stream is the most highly occurring. To do this, simple counting occurs. It reveals how many times each of the possible tuples actually occurs. Each pair of adjoining characters is compared to the possible tuples and the count is recorded for the matched tuple.

The process begins by examining the adjacent characters in position one and two of the data stream. Together, the pair of characters forms a tuple. Advance by one character in the stream and examine the characters in positions two and three. By incrementing through the data stream one character at a time, every combination of two adjacent characters in the data stream is examined and tallied against one of the tuples.

Sequences of repeated symbols create a special case that must be considered when tallying tuples. That is, when a symbol is repeated three or more times, skilled artisans might identify instances of a tuple that cannot exist because the symbols in the tuple belong to other instances of the same tuple. The number of actual tuples in this case is the number of times the symbol repeats divided by two.

Figure 3:
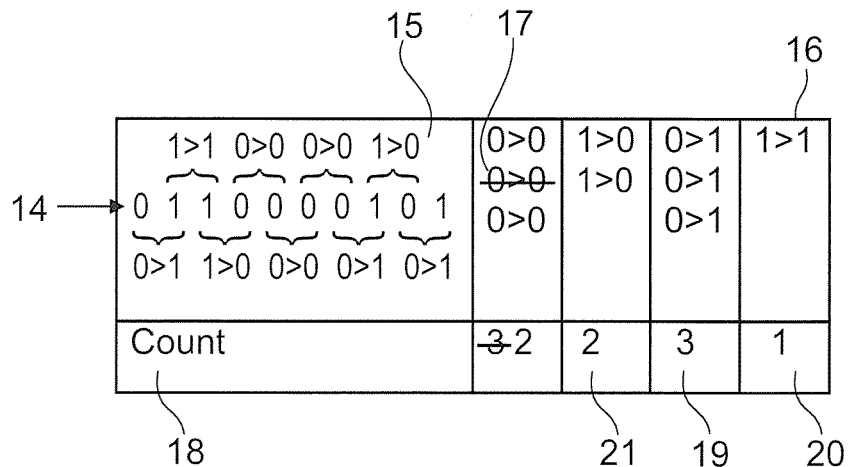
FIG. 3 is a table in accordance with the present invention showing the counting of tuples in a data stream.

For example, consider the data stream 14 in table 16 (FIG. 3) having 10 characters shown as "0110000101." Upon examining the first two characters 01, a tuple is recognized in the form 0 followed by 1 (0>1). Then, increment forward one character and consider the second and third characters 11, which forms the tuple of 1 followed by 1 (1>1). As progression occurs through the data stream, 9 possible tuple combinations are found: 0>1, 1>1, 1>0, 0>0, 0>0, 0>0, 0>1, 1>0, and 0>1 (element 15, FIG. 3). In the sequence of four sequential zeros (at the fourth through seventh character positions in the data stream "0110000101"), three instances of a 0 followed by a 0 (or 0>0) are identified as possible tuples. It is observed that the second instance of the 0>0 tuple (element 17, FIG. 3) cannot be formed because the symbols are used in the 0>0 tuple before and after it, by prescribed rule. Thus, there are only two possible instances in the COUNT 18, FIG. 3, of the 0>0 tuple, not 3. In turn, the most highly occurring tuple counted in this data stream is 0>1, which occurs 3 times (element 19, FIG. 3). Similarly, tuple 1>1 occurs once (element 20, FIG. 3), while tuple 1>0 occurs twice (element 21, FIG. 3).

Figure 4:
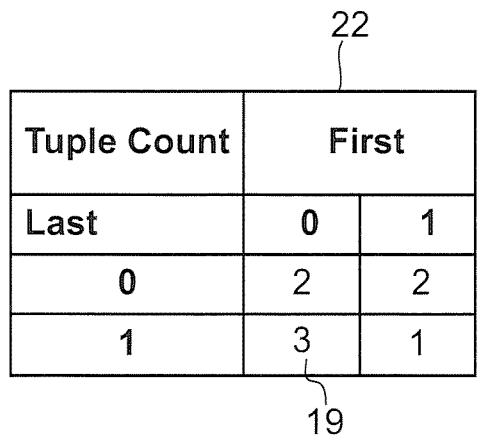
FIG. 4 is a table in accordance with the present invention showing the Count from FIG. 3 in array form.

After the entire data stream has been examined, the final counts for each tuple are compared to determine which tuple occurs most frequently. In tabular form, the 0 followed by a 1 (tuple 0>1) occurs the most and is referenced at element 19 in table 22, FIG. 4.

In the situation of a tie between two or more tuples, skilled artisans must choose between one of the tuples. For this, experimentation has revealed that choosing the tuple that contains the most complex characters usually results in the most efficient compression. If all tuples are equally complex, skilled artisans can choose any one of the tied tuples and define it as the most highly occurring.

The complexity of a tuple is determined by imagining that the symbols form the sides of a right triangle, and the complexity is a measure of the length of the hypotenuse of that triangle. Of course, the hypotenuse is related to the sum of the squares of the sides, as defined by the Pythagorean Theorem, FIG. 5.

The tuple with the longest hypotenuse is considered the most complex tuple, and is the winner in the situation of a tie between the highest numbers of occurring tuples. The reason for this is that less-complex tuples in the situation of a tie are most likely to be resolved in subsequent passes in the decreasing order of their hypotenuse length. Should a tie in hypotenuse length occur, or a tie in complexity, evidence appears to suggest it does not make a difference which tuple is chosen as the most highly occurring.

For example, suppose that tuples 3>7, 4>4 and 1>5 each occur 356 times when counted (in a same pass). To determine the complexity of each tuple, use the tuple symbols as the two sides of a right triangle and calculate the hypotenuse, FIG. 6. In the instance of 3>7, the side of the hypotenuse is the square root of (three squared (9) plus seven squared (49)), or the square root of 58, or 7.6. In the instance of 4>4, the side of the hypotenuse is the square root of (four squared (16) plus four squared (16), of the square root of 32, or 5.7. Similar, 1>5 calculates as a hypotenuse of 5.1 as seen in table 23 in the Figure. Since the tuple with the largest hypotenuse is the most complex, 3>7's hypotenuse of 7.6 is considered more complex than either of the tuples 4>4 or 1>5.

Figures 5, 6, 7:
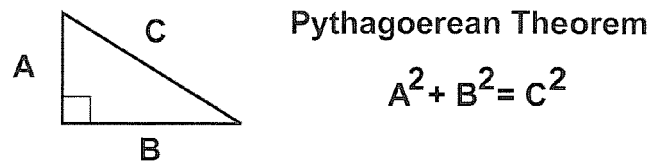
FIG. 5 is a Pythagorean's Theorem for use in resolving ties in the counts of highest occurring tuples.
FIG. 6 is a table in accordance with the present invention showing a representative resolution of a tie in the counts of three highest occurring tuples using Pythagorean's Theorem.
FIG. 7 is a table in accordance with the present invention showing an alternative resolution of a tie in the counts of highest occurring tuples.

Skilled artisans can also use the tuple array to visualize the hypotenuse by drawing lines in the columns and rows from the array origin to the tuple entry in the array, as shown in table 24 in FIG. 7. As seen, the longest hypotenuse is labeled 25, so the 3>7 tuple wins the tie, and is designated as the most highly occurring tuple. Hereafter, a new symbol is created to replace the highest occurring tuple (whether occurring the most outright by count or by tie resolution), as seen below. However, based on the complexity rule, it is highly likely that the next passes will replace tuple 4>4 and then tuple 1>5.

Creating a Symbol for the Most Highly Occurring Tuple

As before, a symbol stands for the two adjacent characters that form the tuple and skilled artisans select any new symbol they want provided it is not possibly found in the data stream elsewhere. Also, since the symbol and its definition are added to the alphabet, e.g., if "α=QU," a dictionary grows by one new symbol in each pass through the data, as will be seen. A good example of a new symbol for use in the invention is a numerical character, sequentially selected, because numbers provide an unlimited source of unique symbols. In addition, reaching an optimized compression goal might take thousands (or even tens of thousands) of passes through the data stream and redundant symbols must be avoided relative to previous passes and future passes.

Replacing the Tuple with the New Symbol

Upon examining the data stream to find all occurrences of the highest occurring tuple, skilled artisans simply substitute the newly defined or newly created symbol for each occurrence of that tuple. Intuitively, substituting a single symbol for two characters compresses the data stream by one character for each occurrence of the tuple that is replaced.

Encoding the Alphabet

To accomplish this, counting occurs for how many times that each of the symbols in the current alphabet occurs in the data stream. They then use the symbol count to apply an encoding scheme, such as a path-weighted Huffman coding scheme, to the alphabet. Huffman trees should be within the purview of the artisan's skill set.

The encoding assigns bits to each symbol in the current alphabet that actually appears in the data stream. That is, symbols with a count of zero occurrences are not encoded in the tree. Also, symbols might go "extinct" in the data stream as they are entirely consumed by yet more complex symbols, as will be seen. As a result, the Huffman code tree is rebuilt every time a new symbol is added to the dictionary. This means that the Huffman code for a given symbol can change with every pass. The encoded length of the data stream usually decreases with each pass.

Calculating the Compressed File Size

The compressed file size is the total amount of space that it takes to store the Huffman-encoded data stream plus the information about the compression, such as information about the file, the dictionary, and the Huffman encoding tree. The compression information must be saved along with other information so that the encoded data can be decompressed later.

To accomplish this, artisans count the number of times that each symbol appears in the data stream. They also count the number of bits in the symbol's Huffman code to find its bit length. They then multiply the bit length by the symbol count to calculate the total bits needed to store all occurrences of the symbol. This is then repeated for each symbol. Thereafter, the total bit counts for all symbols are added to determine how many bits are needed to store only the compressed data. To determine the compressed file size, add the total bit count for the data to the number of bits required for the related compression information (the dictionary and the symbol-encoding information).

Determining Whether the Compression Goal has been Achieved

Substituting a tuple with a single symbol reduces the total number of characters in a data stream by one for each instance of a tuple that is replaced by a symbol. That is, for each instance, two existing characters are replaced with one new character. In a given pass, each instance of the tuple is replaced by a new symbol. There are three observed results:

The length of the data stream (as measured by how many characters make up the text) decreases by half the number of tuples replaced.

The number of symbols in the alphabet increases by one.

The number of nodes in the Huffman tree increases by two.

By repeating the compression procedure a sufficient number of times, any series of characters can eventually be reduced to a single character. That "super-symbol" character conveys the entire meaning of the original text. However, the information about the symbols and encoding that is used to reach that final symbol is needed to restore the original data later. As the number of total characters in the text decreases with each repetition of the procedure, the number of symbols increases by one. With each new symbol, the size of the dictionary and the size of the Huffman tree increase, while the size of the data decreases relative to the number of instances of the tuple it replaces. It is possible that the information about the symbol takes more space to store than the original data it replaces. In order for the compressed file size to become smaller than the original data stream size, the text size must decrease faster than the size increases for the dictionary and the Huffman encoding information.

The question at hand is then, what is the optimal number of substitutions (new symbols) to make, and how should those substitutions be determined?

For each pass through the data stream, the encoded length of the text decreases, while the size of the dictionary and the Huffman tree increases. It has been observed that the compressed file size will reach a minimal value, and then increase. The increase occurs at some point because so few tuple replacements are done that the decrease in text size no longer outweighs the increase in size of the dictionary and Huffman tree.

The size of the compressed file does not decrease smoothly or steadily downward. As the compression process proceeds, the size might plateau or temporarily increase. In order to determine the true (global) minimum, it is necessary to continue some number of iterations past the each new (local) minimum point. This true minimal value represents the optimal compression for the data stream using this method.

Through experimentation, three conditions have been found that can be used to decide when to terminate the compression procedure: asymptotic reduction, observed low, and single character. Each method is described below. Other terminating conditions might be determined through further experimentation.

Asymptotic Reduction

An asymptotic reduction is a concession to processing efficiency, rather than a completion of the procedure. When compressing larger files (100 kilobytes (KB) or greater), after several thousand passes, each additional pass produces only a very small additional compression. The compressed size is still trending downward, but at such a slow rate that additional compute time is not warranted.

Based on experimental results, the process is terminated if at least 1000 passes have been done, and less than 1% of additional data stream compression has occurred in the last 1000 passes. The previously noted minimum is therefore used as the optimum compressed file.

Observed Low

A reasonable number of passes have been performed on the data and in the last reasonable number of passes a new minimum encoded file size has not been detected. It appears that further passes only result in a larger encoded file size.

Based on experimental results, the process is terminated if at least 1000 passes have been done, and in the last 10% of the passes, a new low has not been established. The previously noted minimum is then used as the optimum compressed file.

Single Character

The data stream has been reduced to exactly one character. This case occurs if the file is made up of data that can easily reduce to a single symbol, such a file filled with a repeating pattern. In cases like this, compression methods other than this one might result in smaller compressed file sizes.

How the Procedure Optimizes Compression

The representative embodiment of the invention uses Huffman trees to encode the data stream that has been progressively shortened by tuple replacement, and balanced against the growth of the resultant Huffman tree and dictionary representation.

The average length of a Huffman encoded symbol depends upon two factors:

How many symbols must be represented in the Huffman tree

The distribution of the frequency of symbol use

The average encoded symbol length grows in a somewhat stepwise fashion as more symbols are added to the dictionary. Because the Huffman tree is a binary tree, increases naturally occur as the number of symbols passes each level of the power of 2 (2, 4, 8, 16, 32, 64, etc.). At these points, the average number of bits needed to represent any given symbol normally increases by 1 bit, even though the number of characters that need to be encoded decreases. Subsequent compression passes usually overcome this temporary jump in encoded data stream length.

The second factor that affects the efficiency of Huffman coding is the distribution of the frequency of symbol use. If one symbol is used significantly more than any other, it can be assigned a shorter encoding representation, which results in a shorter encoded length overall, and results in maximum compression. The more frequently a symbol occurs, the shorter the encoded stream that replaces it. The less frequently a symbol occurs, the longer the encoded stream that replaces it.

If all symbols occur at approximately equal frequencies, the number of symbols has the greater effect than does the size of the encoded data stream. Supporting evidence is that maximum compression occurs when minimum redundancy occurs, that is, when the data appears random. This state of randomness occurs when every symbol occurs at the same frequency as any other symbol, and there is no discernable ordering to the symbols.

The method and procedure described in this document attempt to create a state of randomness in the data stream. By replacing highly occurring tuples with new symbols, eventually the frequency of all symbols present in the data stream becomes roughly equal. Similarly, the frequency of all tuples is also approximately equal. These two criteria (equal occurrence of every symbol and equal occurrence of ordered symbol groupings) is the definition of random data. Random data means no redundancy. No redundancy means maximum compression.

This method and procedure derives optimal compression from a combination of the two factors. It reduces the number of characters in the data stream by creating new symbols to replace highly occurring tuples. The frequency distribution of symbol occurrence in the data stream tends to equalize as oft occurring symbols are eliminated during tuple replacement. This has the effect of flattening the Huffman tree, minimizing average path lengths, and therefore, minimizing encoded data stream length. The number of newly created symbols is held to a minimum by measuring the increase in dictionary size against the decrease in encoded data stream size.

Example of Compression

To demonstrate the compression procedure, a small data file contains the following simple ASCII characters:

aaaaaaaaaaaaaaaaaaaaaaaaaaabaaabaaaaaaaababbbbbb

Each character is stored as a sequence of eight bits that correlates to the ASCII code assigned to the character. The bit values for each character are:

a=01100001 b=01100010

The digital data that represents the file is the original data that we use for our compression procedure. Later, we want to decompress the compressed file to get back to the original data without data loss.

Preparing the Data Stream

The digital data that represents the file is a series of bits, where each bit has a value of 0 or 1. We want to abstract the view of the bits by conceptually replacing them with symbols to form a sequential stream of characters, referred to as a data stream.

For our sample digital data, we create two new symbols called 0 and 1 to represent the raw bit values of 0 and 1, respectively. These two symbols form our initial alphabet, so we place them in the dictionary 26, FIG. 8.

The data stream 30 in FIG. 9 represents the original series of bits in the stored file, e.g., the first eight bits 32 are "01100001" and correspond to the first letter "a" in the data file. Similarly, the very last eight bits 34 are "01100010" and correspond to the final letter "b" in the data file, and each of the 1's and 0's come from the ASCII code above.

Also, the characters in data stream 30 are separated with a space for user readability, but the space is not considered, just the characters. The space would not occur in computer memory either.

Compressing the Data Stream

The data stream 30 of FIG. 9 is now ready for compression. The procedure will be repeated until the compression goal is achieved. For this example, the compression goal is to minimize the amount of space that it takes to store the digital data.

Initial Pass

For the initial pass, the original data stream and alphabet that were created in "Preparing the Data Stream" are obtained.

Identifying all Possible Tuples

An easy way to identify all possible combinations of the characters in our current alphabet (at this time having 0 and 1) is to create a tuple array (table 35, FIG. 10). Those symbols are placed or fitted as a column and row, and the cells are filled in with the tuple that combines those symbols. The columns and rows are constructed alphabetically from left to right and top to bottom, respectively, according to the order that the symbols appear in our dictionary. For this demonstration, we will consider the symbol in a column to be the first character in the tuple, and the symbol in a row to be the last character in the tuple. To simplify the presentation of tuples in each cell, we will use the earlier-described notation of "first>last" to indicate the order of appearance in the pair of characters, and to make it easier to visually distinguish the symbols in the pair. The tuples shown in each cell now represent the patterns we want to look for in the data stream.

For example, the table 35 shows the tuple array for characters 0 and 1. In the cell for column 0 and row 0, the tuple is the ordered pair of 0 followed by 0. The shorthand notation of the tuple in the first cell is "0>0". In the cell for column 0 and row 1, the tuple is 0 followed by 1, or "0>1". In the cell for column 1 and row 0, the tuple is "1>0". In the cell for column 1 and row 1, the tuple is "1>1". (As skilled artisans will appreciate, most initial dictionaries and original tuple arrays will be identical to these. The reason is that computing data streams will all begin with a stream of 1's and 0's having two symbols only.)

Determining the Highly Occurring Tuple

After completion of the tuple array, we are ready to look for the tuples in the data stream 30, FIG. 9. We start at the beginning of the data stream with the first two characters "01" labeled element 37. We compare this pair of characters to our known tuples, keeping in mind that order matters. We match the pair to a tuple, and add one count for that instance. We move forward by one character, and look at the pair of characters 38 in positions two and three in the data stream, or "11." We compare and match this pair to one of the tuples, and add one count for that instance. We continue tallying occurrences of the tuples in this manner until we reach the end of the data stream. In this instance, the final tuple is "10" labeled 39. By incrementing through the data stream one character at a time, we have considered every combination of two adjacent characters in the data stream, and tallied each instance against one of the tuples. We also consider the rule for sequences of repeated symbols, described above, to determine the actual number of instances for the tuple that is defined by pairs of that symbol.

For example, the first two characters in our sample data stream are 0 followed by 1. This matches the tuple 0>1, so we count that as one instance of the tuple. We step forward one character. The characters in positions two and three are 1 followed by 1, which matches the tuple 1>1. We count it as one instance of the 1>1 tuple. We consider the sequences of three or more zeros in the data stream (e.g., 01100001 . . . ) to determine the actual number of tuples for the 0>0 tuple. We repeat this process to the end of the data set with the count results in table 40, FIG. 11.

Now that we have gathered statistics for how many times each tuple appears in the data stream 30, we compare the total counts for each tuple to determine which pattern is the most highly occurring. The tuple that occurs most frequently is a tie between a 1 followed by 0 (1>0), which occurs 96 times, and a 0 followed by 1 (0>1), which also occurs 96 times. As discussed above, skilled artisans then choose the most complex tuple and do so according to Pythagorean's Theorem. The sum of the squares for each tuple is the same, which is 1 (1+0) and 1 (0+1). Because they have the same complexity, it does not matter which one is chosen as the highest occurring. In this example, we will choose tuple 1>0.

We also count the number of instances of each of the symbols in the current alphabet as seen in table 41, FIG. 12. The total symbol count in the data stream is 384 total symbols that represent 384 bits in the original data. Also, the symbol 0 appears 240 times in original data stream 30, FIG. 9, while the symbol 1 only appears 144 times.

Pass 1

In this next pass, we replace the most highly occurring tuple from the previous pass with a new symbol, and then we determine whether we have achieved our compression goal.

Creating a Symbol for the Highly Occurring Tuple

We replace the most highly occurring tuple from the previous pass with a new symbol and add it to the alphabet. Continuing the example, we add a new symbol 2 to the dictionary and define it with the tuple defined as 1 followed by 0 (1>0). It is added to the dictionary 26' as seen in FIG. 13. (Of course, original symbol 0 is still defined as a 0, while original symbol 1 is still defined as a 1. Neither of these represent a first symbol followed a last symbol which is why dashes appear in the dictionary 26' under "Last" for each of them.)

Replacing the Tuple with the New Symbol

In the original data stream 30, every instance of the tuple 1>0 is now replaced with the new, single symbol. In our example data stream 30, FIG. 9, the 96 instances of the tuple 1>0 have been replaced with the new symbol "2" to create the output data stream 30', FIG. 14, that we will use for this pass. As skilled artisans will observe, replacing ninety-six double instances of symbols with a single, new symbol shrinks or compresses the data stream 30' in comparison to the original data stream 30, FIG. 8.

Encoding the Alphabet

After we compress the data stream by using the new symbol, we use a path-weighted Huffman coding scheme to assign bits to each symbol in the current alphabet. To do this, we again count the number of instances of each of the symbols in the current alphabet (now having "0," "1" and "2.") The total symbol count in the data stream is 288 symbols as seen in table 41', FIG. 15. We also have one end-of-file (EOF) symbol at the end of the data stream (not shown).

Next, we use the counts to build a Huffman binary code tree. 1) List the symbols from highest count to lowest count. 2) Combine the counts for the two least frequently occurring symbols in the dictionary. This creates a node that has the value of the sum of the two counts. 3) Continue combining the two lowest counts in this manner until there is only one symbol remaining. This generates a Huffman binary code tree.

Finally, label the code tree paths with zeros (0s) and ones (1s). The Huffman coding scheme assigns shorter code words to the more frequent symbols, which helps reduce the size length of the encoded data. The Huffman code for a symbol is defined as the string of values associated with each path transition from the root to the symbol terminal node.

Figures 14, 15, 16:
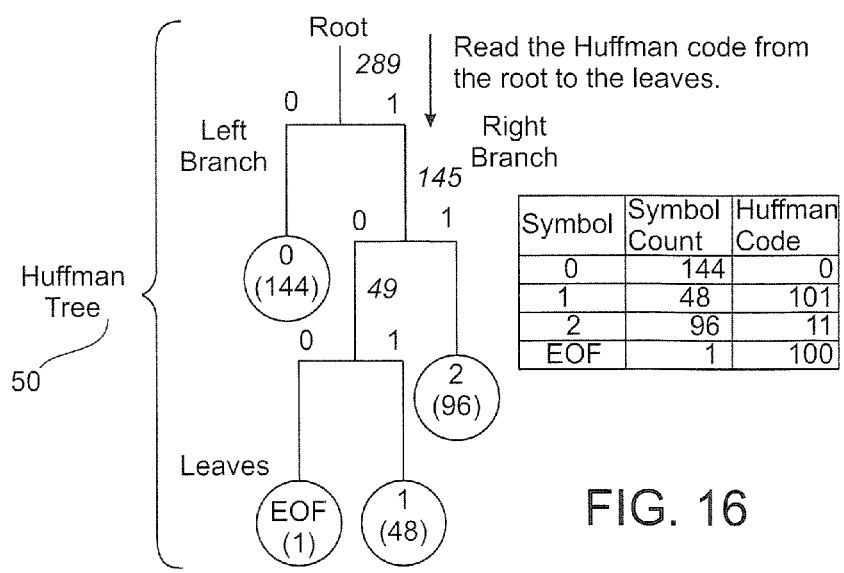

With reference to FIG. 16, the tree 50 demonstrates the process of building the Huffman tree and code for the symbols in the current alphabet. We also create a code for the end of file marker that we placed at the end of the data stream when we counted the tuples. In more detail, the root contemplates 289 total symbols, i.e., the 288 symbols for the alphabet "0," "1" and "2" plus one EOF symbol. At the leaves, the "0" is shown with its counts 144, the "1" with its count of 48, the "2" with its count of 96 and the EOF with its count of 1. Between the leaves and root, the branches define the count in a manner skilled artisans should readily understand.

In this compression procedure, we will re-build a Huffman code tree every time we add a symbol to the current dictionary. This means that the Huffman code for a given symbol can change with every compression pass.

Calculating the Compressed File Size

From the Huffman tree, we use its code to evaluate the amount of space needed to store the compressed data as seen in table 52, FIG. 17. First, we count the number of bits in the Huffman code for each symbol to find its bit length 53. Next, we multiply a symbol's bit length by its count 54 to calculate the total bits 55 used to store the occurrences of that symbol. We add the total bits 56 needed for all symbols to determine how many bits are needed to store only the compressed data. As seen, the current data stream 30', FIG. 14 requires 483 bits to store only the information.

To know whether we achieved optimal compression, we must consider the total amount of space that it takes to store the compressed data plus the information about the compression that we need to store in order to decompress the data later. We also must store information about the file, the dictionary, and the Huffman tree. The table 57 in FIG. 18 shows the total compression overhead as being 25 bits, which brings the compressed size of the data stream to 508 bits, or 483 bits plus 25 bits.

Determining Whether the Compression Goal has been Achieved

Finally, we compare the original number of bits (384, FIG. 12) to the current number of bits (508) that are needed for this compression pass. We find that it takes 1.32 times as many bits to store the compressed data as it took to store the original data, table 58, FIG. 19. This is not compression at all, but expansion.

In early passes, however, we expect to see that the substitution requires more space than the original data because of the effect of carrying a dictionary, adding symbols, and building a tree. On the other hand, skilled artisans should observe an eventual reduction in the amount of space needed as the compression process continues. Namely, as the size of the data set decreases by the symbol replacement method, the size grows for the symbol dictionary and the Huffman tree information that we need for decompressing the data.

Pass 2

In this pass, we replace the most highly occurring tuple from the previous pass (pass 1) with still another new symbol, and then we determine whether we have achieved our compression goal.

Identifying all Possible Tuples

As a result of the new symbol, the tuple array is expanded by adding the symbol that was created in the previous pass. Continuing our example, we add 2 as a first symbol and last symbol, and enter the tuples in the new cells of table 35', FIG. 20.

Determining the Highly Occurring Tuple

As before, the tuple array identifies the tuples that we look for and tally in our revised alphabet. As seen in table 40', FIG. 21, the Total Symbol Count=288. The tuple that occurs most frequently when counting the data stream 30', FIG. 14, is the character 2 followed by the character 0 (2>0). It occurs 56 times as seen circled in table 40', FIG. 21.

Creating a Symbol for the Highly Occurring Tuple

We define still another new symbol "3" to represent the most highly occurring tuple 2>0, and add it to the dictionary 26", FIG. 22, for the alphabet that was developed in the previous passes.

Replacing the Tuple with the New Symbol

Figures 23, 24, 25:
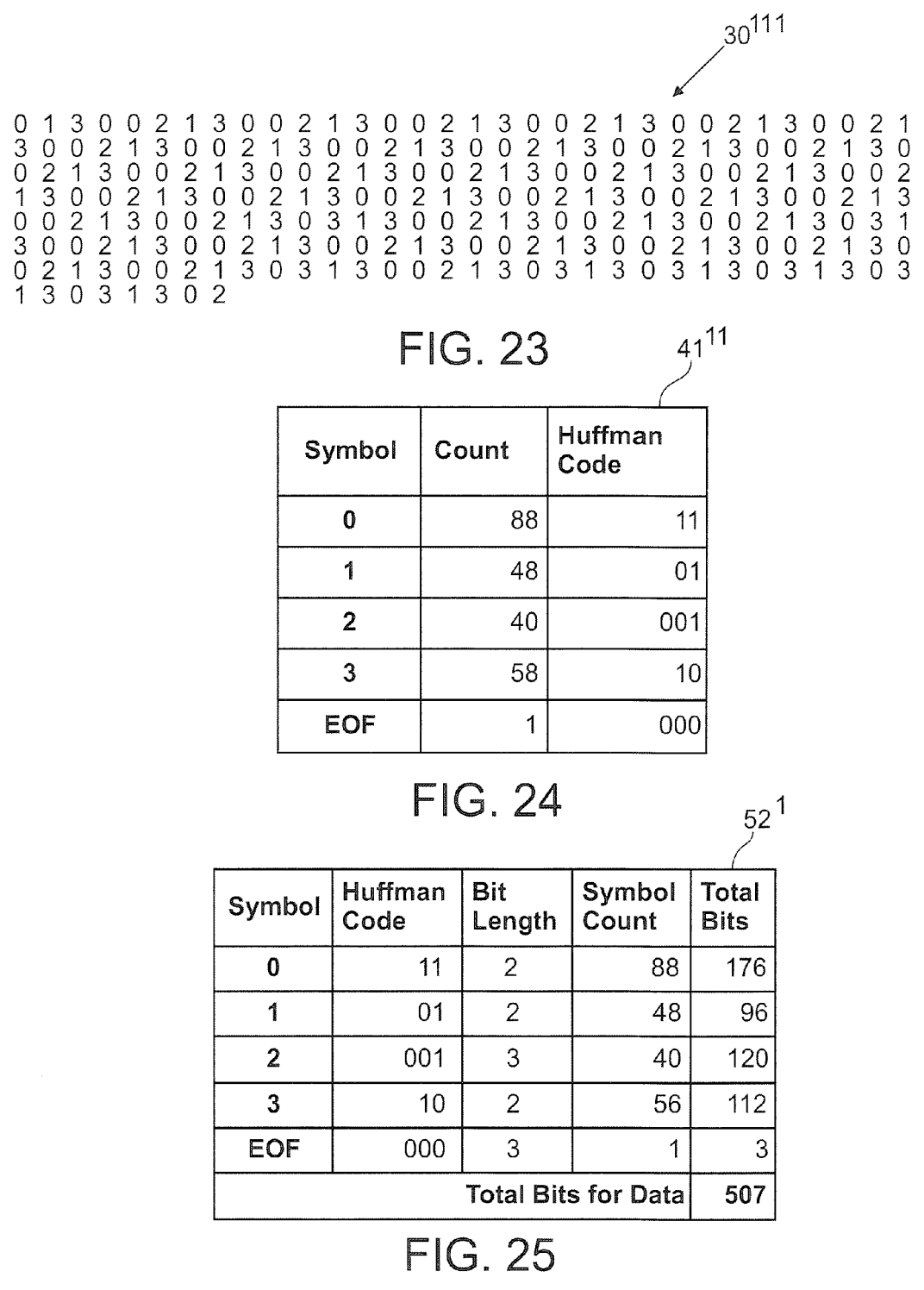

In the data stream 30', FIG. 14, we replace every instance of the most highly occurring tuple with the new single symbol. We replace the 56 instances of the 2>0 tuple with the symbol 3 and the resultant data stream 30" is seen in FIG. 23.

Encoding the Alphabet

As demonstrated above, we count the number of symbols in the data stream, and use the count to build a Huffman tree and code for the current alphabet. The total symbol count has been reduced from 288 to 234 (e.g., 88+48+40+58, but not including the EOF marker) as seen in table 41", FIG. 24.

Calculating the Compressed File Size

We need to evaluate whether our substitution reduces the amount of space that it takes to store the data. As described above, we calculate the total bits needed (507) as in table 52', FIG. 25.

In table 57', FIG. 26, the compression overhead is calculated as 38 bits.

Determining Whether the Compression Goal has been Achieved

Finally, we compare the original number of bits (384) to the current number of bits (545=507+38) that are needed for this compression pass. We find that it takes 141% or 1.41 times as many bits to store the compressed data as it took to store the original data. Compression is still not achieved and the amount of data in this technique is growing larger rather than smaller in comparison to the previous pass requiring 132%.

Pass 3

In this pass, we replace the most highly occurring tuple from the previous pass with a new symbol, and then we determine whether we have achieved our compression goal.

Identifying all Possible Tuples

We expand the tuple array 35", FIG. 28 by adding the symbol that was created in the previous pass. We add the symbol "3" as a first symbol and last symbol, and enter the tuples in the new cells.

Determining the Highly Occurring Tuple

The tuple array identifies the tuples that we look for and tally in our revised alphabet. In table 40", FIG. 29, the Total Symbol Count is 232, and the tuple that occurs most frequently is the character 1 followed by character 3 (1>3). It occurs 48 times, which ties with the tuple of character 3 followed by character 0. We determine that the tuple 1>3 is the most complex tuple because it has a hypotenuse length 25' of 3.16 (SQRT($1^2+3^2$)), and tuple 3>0 has a hypotenuse of 3 (SQRT($0^2+3^2$)).

Creating a Symbol for the Highly Occurring Tuple

We define a new symbol 4 to represent the most highly occurring tuple 1>3, and add it to the dictionary 26', FIG. 30, for the alphabet that was developed in the previous passes.

Replacing the Tuple with the New Symbol

In the data stream, we replace every instance of the most highly occurring tuple from the earlier data stream with the new single symbol. We replace the 48 instances of the 1>3 tuple with the symbol 4 and new data stream 30-4 is obtained, FIG. 31.

Encoding the Alphabet

Figures 31, 32, 33:
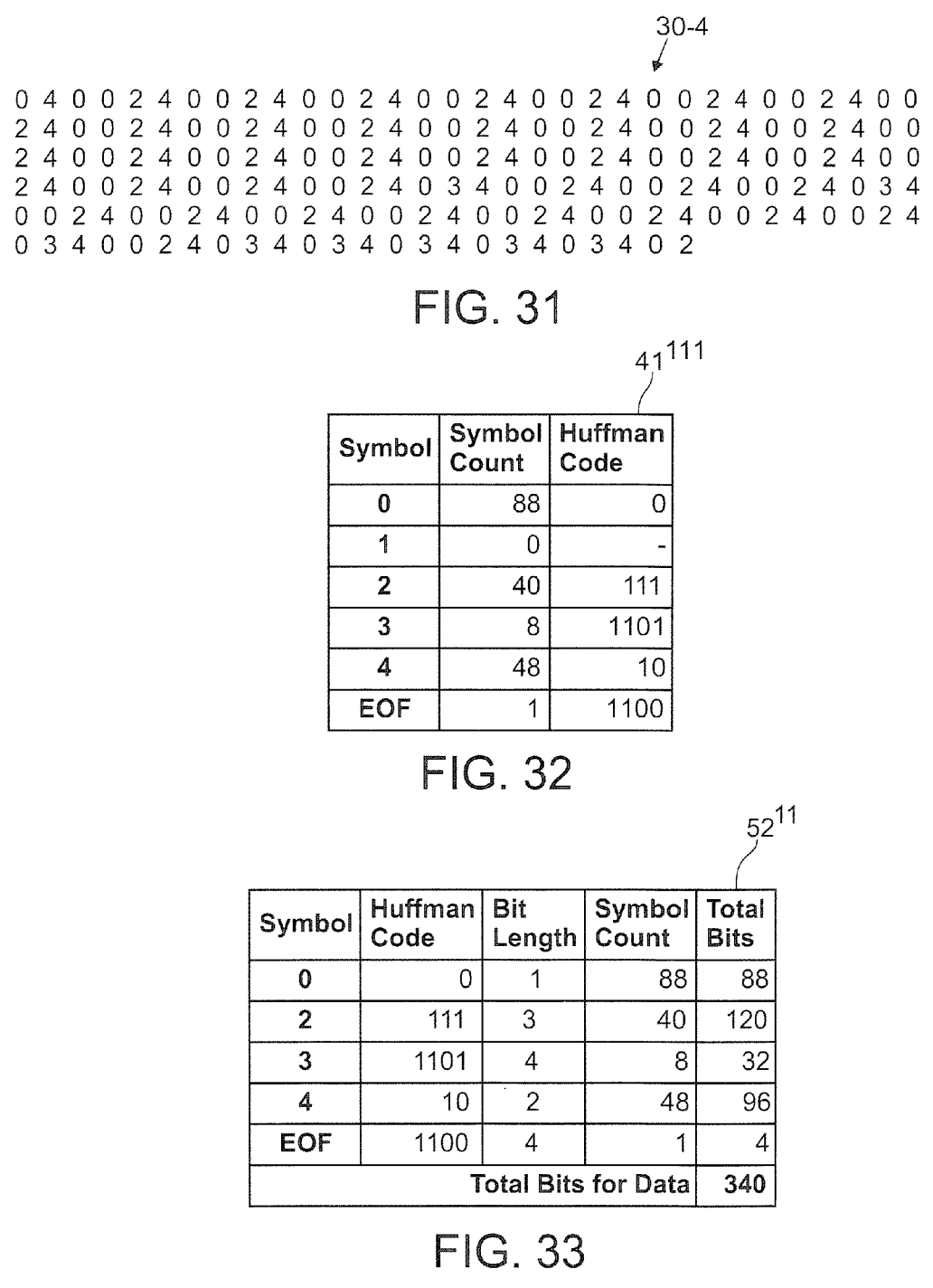

We count the number of symbols in the data stream, and use the count to build a Huffman tree and code for the current alphabet as seen in table 41''', FIG. 32. There is no Huffman code assigned to the symbol 1 because there are no instances of this symbol in the compressed data in this pass. (This can be seen in the data stream 30-4, FIG. 31.) The total symbol count has been reduced from 232 to 184 (e.g., 88+0+40+8+48, but not including the EOF marker).

Calculating the Compressed File Size

We need to evaluate whether our substitution reduces the amount of space that it takes to store the data. As seen in table 52", FIG. 33, the total bits are equal to 340.

In table 57", FIG. 34, the compression overhead in bits is 42.

Determining Whether the Compression Goal has been Achieved

Finally, we compare the original number of bits (384) to the current number of bits (382) that are needed for this compression pass. We find that it takes 0.99 times as many bits to store the compressed data as it took to store the original data. Compression is achieved.

Pass 4

In this pass, we replace the most highly occurring tuple from the previous pass with a new symbol, and then we determine whether we have achieved our compression goal.

Identifying all Possible Tuples

We expand the tuple array 35''', FIG. 36, by adding the symbol that was created in the previous pass. We add the symbol 4 as a first symbol and last symbol, and enter the tuples in the new cells.

Determining the Highly Occurring Tuple

The tuple array identifies the tuples that we look for and tally in our revised alphabet. In table 40''', FIG. 37, the Total Symbol Count=184 and the tuple that occurs most frequently is the character 4 followed by character 0 (4>0). It occurs 48 times.

Creating a Symbol for the Highly Occurring Tuple

We define a new symbol 5 to represent the 4>0 tuple, and add it to the dictionary 26-4, FIG. 38, for the alphabet that was developed in the previous passes.

Replacing the Tuple with the New Symbol

Figures 39, 40, 41:
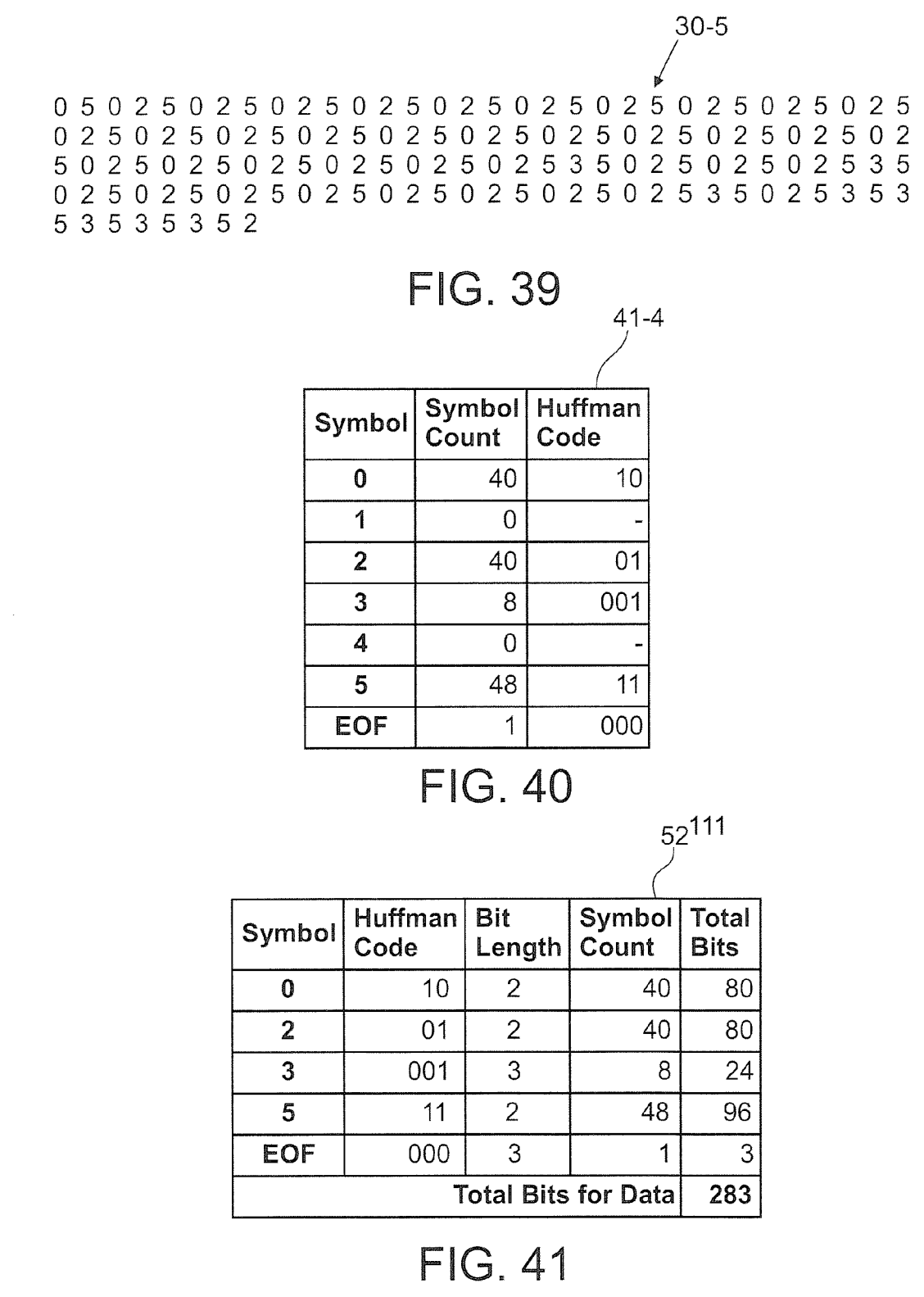

In the data stream, we replace every instance of the most highly occurring tuple with the new single symbol. We replace the 48 instances of the 40 tuple in data stream 30-4, FIG. 31, with the symbol 5 as seen in data stream 30-5, FIG. 39.

Encoding the Alphabet

As demonstrated above, we count the number of symbols in the data stream, and use the count to build a Huffman tree and code for the current alphabet. There is no Huffman code assigned to the symbol 1 and the symbol 4 because there are no instances of these symbols in the compressed data in this pass. The total symbol count has been reduced from 184 to 136 (e.g., 40+0+40+8+0+48, but not including the EOF marker) as seen in table 41-4, FIG. 40.

Calculating the Compressed File Size

We need to evaluate whether our substitution reduces the amount of space that it takes to store the data. As seen in table 52'''', FIG. 41, the total number of bits is 283.

As seen in table 57''', FIG. 42, the compression overhead in bits is 48.

Determining Whether the Compression Goal has been Achieved

Finally, we compare the original number of bits (384) to the current number of bits (331) that are needed for this compression pass as seen in table 58''', FIG. 43. In turn, we find that it takes 0.86 times as many bits to store the compressed data as it took to store the original data.

Pass 5

In this pass, we replace the most highly occurring tuple from the previous pass with a new symbol, and then we determine whether we have achieved our compression goal.

Identifying all Possible Tuples

We expand the tuple array by adding the symbol that was created in the previous pass. We add the symbol 5 as a first symbol and last symbol, and enter the tuples in the new cells as seen in table 35-4, FIG. 44.

Determining the Highly Occurring Tuple

The tuple array identifies the tuples that we look for and tally in our revised alphabet as seen in table 40-4, FIG. 45. (Total Symbol Count=136) The tuple that occurs most frequently is the symbol 2 followed by symbol 5 (2>5), which has a hypotenuse of 5.4. It occurs 39 times. This tuple ties with the tuple 0>2 (hypotenuse is 2) and 5>0 (hypotenuse is 5). The tuple 2>5 is the most complex based on the hypotenuse length 25" described above.

Creating a Symbol for the Highly Occurring Tuple

We define a new symbol 6 to represent the most highly occurring tuple 2>5, and add it to the dictionary for the alphabet that was developed in the previous passes as seen in table 26-5, FIG. 46.

Replacing the Tuple with the New Symbol

In the data stream, we replace every instance of the most highly occurring tuple with the new single symbol. We replace the 39 instances of the 2>5 tuple in data stream 30-5, FIG. 39, with the symbol 6 as seen in data stream 30-6, FIG. 47.

Encoding the Alphabet

As demonstrated above, we count the number of symbols in the data stream, and use the count to build a Huffman tree and code for the current alphabet as seen in table 41-5, FIG. 48. There is no Huffman code assigned to the symbol 1 and the symbol 4 because there are no instances of these symbols in the compressed data in this pass. The total symbol count has been reduced from 136 to 97 (e.g., 40+1+8+9+39, but not including the EOF marker) as seen in table 52-4, FIG. 49.

Calculating the Compressed File Size

We need to evaluate whether our substitution reduces the amount of space that it takes to store the data. As seen in table 52-4, FIG. 49, the total number of bits is 187.

As seen in table 57-4, FIG. 50, the compression overhead in bits is 59.

Determining Whether the Compression Goal has been Achieved

Finally, we compare the original number of bits (384) to the current number of bits (246, or 187+59) that are needed for this compression pass as seen in table 58-4, FIG. 51. We find that it takes 0.64 times as many bits to store the compressed data as it took to store the original data.

Pass 6

In this pass, we replace the most highly occurring tuple from the previous pass with a new symbol, and then we determine whether we have achieved our compression goal.

Identifying all Possible Tuples

We expand the tuple array 35-5 by adding the symbol that was created in the previous pass as seen in FIG. 52. We add the symbol 6 as a first symbol and last symbol, and enter the tuples in the new cells.

Determining the Highly Occurring Tuple

The tuple array identifies the tuples that we look for and tally in our revised alphabet. (Total Symbol Count=97) The tuple that occurs most frequently is the symbol 0 followed by symbol 6 (0>6). It occurs 39 times as seen in table 40-5, FIG. 53.

Creating a Symbol for the Highly Occurring Tuple

We define a new symbol 7 to represent the 0>6 tuple, and add it to the dictionary for the alphabet that was developed in the previous passes as seen in table 26-6, FIG. 54.

Replacing the Tuple with the New Symbol

In the data stream, we replace every instance of the most highly occurring tuple with the new single symbol. We replace the 39 instances of the 0>6 tuple in data stream 30-6, FIG. 47, with the symbol 7 as seen in data stream 30-7, FIG. 55.

Encoding the Alphabet

As demonstrated above, we count the number of symbols in the data stream, and use the count to build a Huffman tree and code for the current alphabet as seen in table 41-6, FIG. 56. There is no Huffman code assigned to the symbol 1, symbol 4 and symbol 6 because there are no instances of these symbols in the compressed data in this pass. The total symbol count has been reduced from 97 to 58 (e.g., 1+0+1+8+0+9+0+39, but not including the EOF marker).

Figures 57, 59:
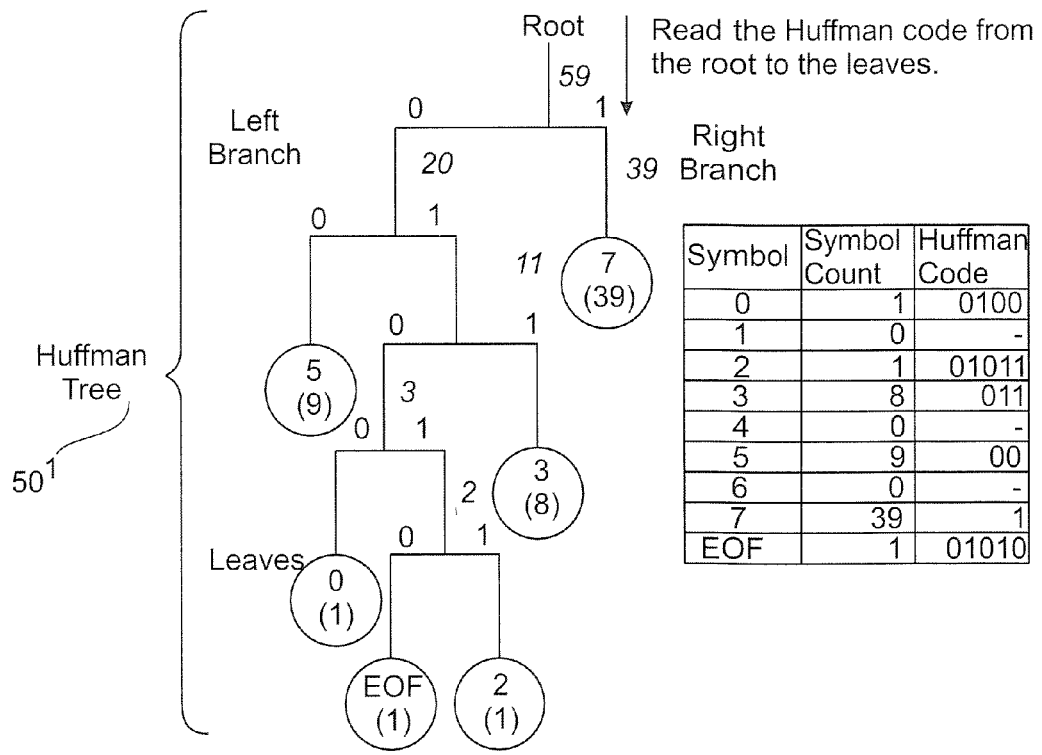

Because all the symbols 1, 4, and 6 have been removed from the data stream, there is no reason to express them in the encoding scheme of the Huffman tree 50', FIG. 57. However, the extinct symbols will be needed in the decode table. A complex symbol may decode to two less complex symbols. For example, a symbol 7 decodes to 0>6.

We need to evaluate whether our substitution reduces the amount of space that it takes to store the data. As seen in table 52-5, FIG. 58, the total number of bits is 95.

As seen in table 57-5, FIG. 59, the compression overhead in bits is 71.

Determining Whether the Compression Goal has been Achieved

Figures 60, 61:
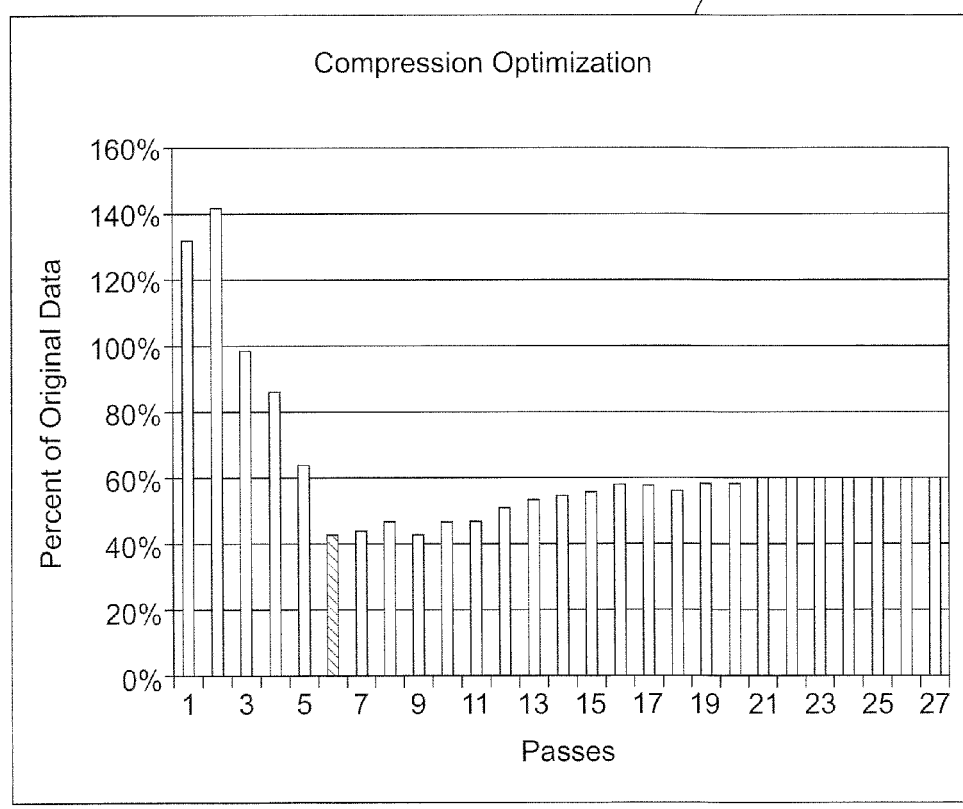

Finally, we compare the original number of bits (384) to the current number of bits (166, or 95+71) that are needed for this compression pass as seen in table 58-5, FIG. 60. We find that it takes 0.43 times as many bits to store the compressed data as it took to store the original data.

Subsequent Passes

Skilled artisans will also notice that overhead has been growing in size while the total number of bits is still decreasing. We repeat the procedure to determine if this is the optimum compressed file size. We compare the compression size for each subsequent pass to the first occurring lowest compressed file size. The chart 60, FIG. 61, demonstrates how the compressed file size grows, decreases, and then begins to grow as the encoding information and dictionary sizes grow. We can continue the compression of the foregoing techniques until the text file compresses to a single symbol after 27 passes.

Interesting Symbol Statistics

Figures 62, 63, 64:
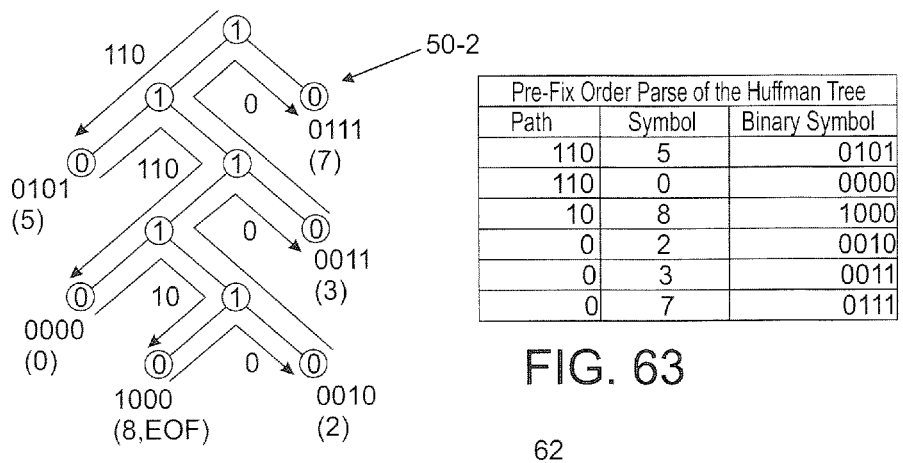

With reference to table 61, FIG. 62, interesting statistics about the symbols for this compression are observable. For instance, the top 8 symbols represent 384 bits (e.g., 312+45+24+2+1) and 99.9% (e.g., 81.2+11.7+6.2+0.5+0.3%) of the file.

Storing the Compressed File

The information needed to decompress a file is usually written at the front of a compressed file, as well as to a separate dictionary only file. The compressed file contains information about the file, a coded representation of the Huffman tree that was used to compress the data, the dictionary of symbols that was created during the compression process, and the compressed data. The goal is to store the information and data in as few bits as possible.

This section describes a method and procedure for storing information in the compressed file.

File Type

The first four bits in the file are reserved for the version number of the file format, called the file type. This field allows flexibility for future versions of the software that might be used to write the encoded data to the storage media. The file type indicates which version of the software was used when we saved the file in order to allow the file to be decompressed later.

Four bits allows for up to 16 versions of the software. That is, binary numbers from 0000 to 1111 represent version numbers from 0 to 15. Currently, this field contains binary 0000.

Maximum Symbol Width

The second four bits in the file are reserved for the maximum symbol width. This is the number of bits that it takes to store in binary form the largest symbol value. The actual value stored is four less than the number of bits required to store the largest symbol value in the compressed data. When we read the value, we add four to the stored number to get the actual maximum symbol width. This technique allows symbol values up to 20 bits. In practical terms, the value 2^20 (2 raised to the 20$^{th}$ power) means that about 1 million symbols can be used for encoding.

For example, if symbols 0-2000 might appear in the compressed file, the largest symbol ID (2000) would fit in a field containing 11 bits. Hence, a decimal 7 (binary 0111) would be stored in this field.

In the compression example, the maximum symbol width is the end-of-file symbol 8, which takes four bits in binary (1000). We subtract four, and store a value of 0000. When we decompress the data, we add four to zero to find the maximum symbol width of four bits. The symbol width is used to read the Huffman tree that immediately follows in the coded data stream.

Coded Huffman Tree

We must store the path information for each symbol that appears in the Huffman tree and its value. To do this, we convert the symbol's digital value to binary. Each symbol will be stored in the same number of bits, as determined by the symbol with the largest digital value and stored as the just read "symbol width".

In the example, the largest symbol in the dictionary in the Huffman encoded tree is the end-of-file symbol 8. The binary form of 8 is 1000, which takes 4 bits. We will store each of the symbol values in 4 bits.

To store a path, we will walk the Huffman tree in a method known as a pre-fix order recursive parse, where we visit each node of the tree in a known order. For each node in the tree one bit is stored. The value of the bit indicates if the node has children (1) or if it is a leaf with no children (0). If it is a leaf, we also store the symbol value. We start at the root and follow the left branch down first. We visit each node only once. When we return to the root, we follow the right branch down, and repeat the process for the right branch.

In the following example, the Huffman encoded tree is redrawn as 50-2 to illustrate the prefix-order parse, where nodes with children are labeled as 1, and leaf nodes are labeled as 0 as seen in FIG. 63.

The discovered paths and symbols are stored in the binary form in the order in which they are discovered in this method of parsing. Write the following bit string to the file, where the bits displayed in bold/underline represent the path, and the value of the 0 node are displayed without bold/underline. The spaces are added for readability; they are not written to media.

<u>110</u> 0101 <u>110</u> 0000 <u>10</u> 1000 <u>0</u> 0010 <u>0</u> 0011 <u>0</u> 0111

Encode Array for the Dictionary

The dictionary information is stored as sequential first/last definitions, starting with the two symbols that define the symbol 2. We can observe the following characteristics of the dictionary:

The symbols 0 and 1 are the atomic (non-divisible) symbols common to every compressed file, so they do not need to be written to media.

Because we know the symbols in the dictionary are sequential beginning with 2, we store only the symbol definition and not the symbol itself.

A symbol is defined by the tuple it replaces. The left and right symbols in the tuple are naturally symbols that precede the symbol they define in the dictionary.

We can store the left/right symbols of the tuple in binary form.

We can predict the maximum number of bits that it takes to store numbers in binary form. The number of bits used to store binary numbers increases by one bit with each additional power of two as seen, for example, in table 62, FIG. 64:

Because the symbol represents a tuple made up of lower-level symbols, we will increase the bit width at the next higher symbol value; that is, at 3, 5, 9, and 17, instead of at 2, 4, 8, and 16.

We use this information to minimize the amount of space needed to store the dictionary. We store the binary values for the tuple in the order of first and last, and use only the number of bits needed for the values.

Three dictionary instances have special meanings. The 0 and 1 symbols represent the atomic symbols of data binary 0 binary 1, respectively. The last structure in the array represents the end-of-file (EOF) symbol, which does not have any component pieces. The EOF symbol is always assigned a value that is one number higher than the last symbol found in the data stream.

Continuing our compression example, the table 63, FIG. 65, shows how the dictionary is stored.

Write the following bit string to the file. The spaces are added for readability; they are not written to media.

10 1000 0111 100000 010101 000110

Encoded Data

To store the encoded data, we replace the symbol with its matching Huffman code and write the bits to the media. At the end of the encoded bit string, we write the EOF symbol. In our example, the final compressed symbol string is seen again as 30-7, FIG. 66, including the EOF.

The Huffman code for the optimal compression is shown in table 67, FIG. 67.

As we step through the data stream, we replace the symbol with the Huffman coded bits as seen at string 68, FIG. 68. For example, we replace symbol 0 with the bits 0100 from table 67, replace symbol 5 with 00 from table 67, replace instances of symbol 7 with 1, and so on. We write the following string to the media, and write the end of file code at the end. The bits are separated by spaces for readability; the spaces are not written to media.

The compressed bit string for the data, without spaces is:
0100001111111111111111111111111111101100111011001
1111111011001011000110001100011 000110001011010
10

Overview of the Stored File

As summarized in the diagram 69, FIG. 69, the information stored in the compressed file is the file type, symbol width, Huffman tree, dictionary, encoded data, and EOF symbol. After the EOF symbol, a variable amount of pad bits are added to align the data with the final byte in storage.

In the example, the bits 70 of FIG. 70 are written to media. Spaces are shown between the major fields for readability; the spaces are not written to media. The "x" represents the pad bits. In FIG. 69, the bits 70 are seen filled into diagram 69b corresponding to the compressed file format.

Decompressing the Compressed File

The process of decompression unpacks the data from the beginning of the file 69, FIG. 69, to the end of the stream.

File Type

Read the first four bits of the file to determine the file format version.

Maximum Symbol Width

Read the next four bits in the file, and then add four to the value to determine the maximum symbol width. This value is needed to read the Huffman tree information.

Huffman Tree

Reconstruct the Huffman tree. Each 1 bit represents anode with two children. Each 0 bit represents a leaf node, and it is immediately followed by the symbol value. Read the number of bits for the symbol using the maximum symbol width.

In the example, the stored string for Huffman is:
110010111000001010000001000011100111

Figures 71, 72:
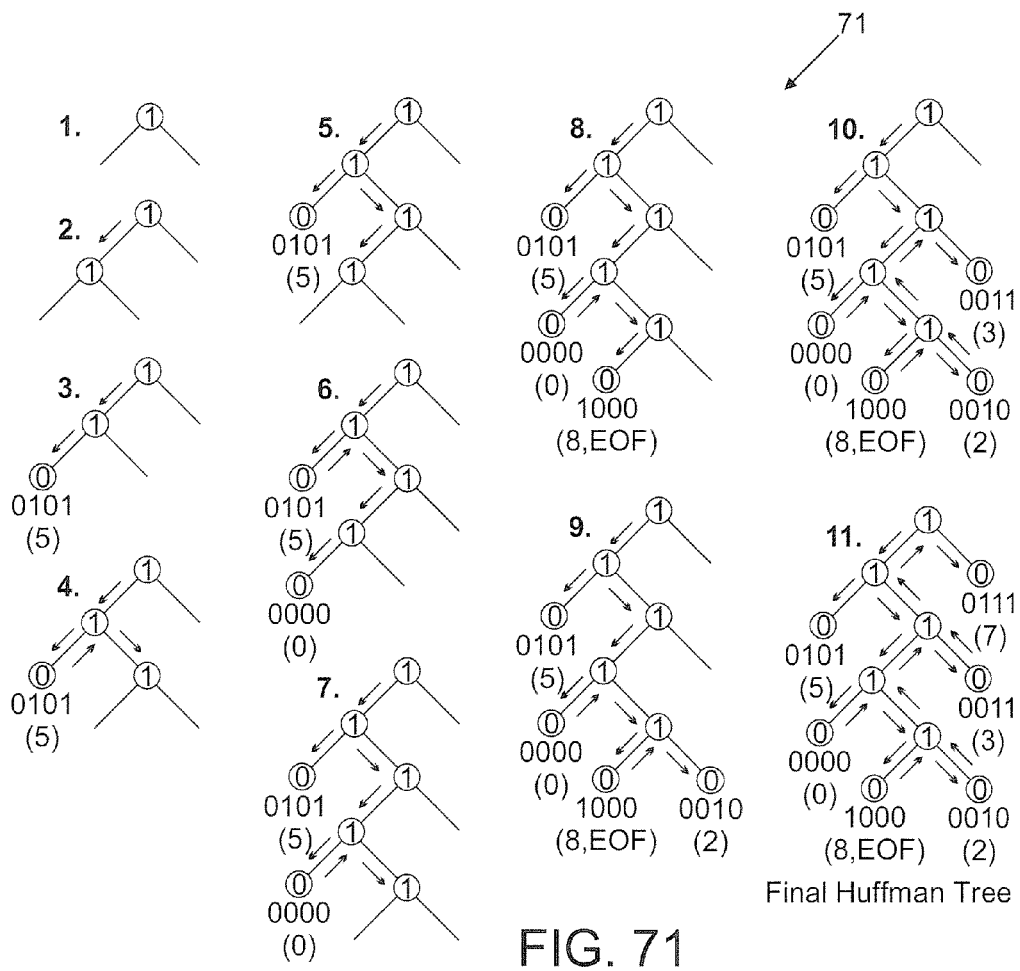

With reference to FIG. 71, diagram 71 illustrates how to unpack and construct the Huffman tree using the pre-fix order method.

Dictionary

To reconstruct the dictionary from file 69, read the values for the pairs of tuples and populate the table. The values of 0 and 1 are known, so they are automatically included. The bits are read in groups based on the number of bits per symbol at that level as seen in table 72, FIG. 72.

In our example, the following bits were stored in the file:
10100001111010000101010000110

We read the numbers in pairs, according to the bits per symbol, where the pairs represent the numbers that define symbols in the dictionary:

| Bits | Symbol |
| --- | --- |
| 1 0 | 2 |
| 10 00 | 3 |
| 01 11 | 4 |
| 100 000 | 5 |
| 010 101 | 6 |
| 000 110 | 7 |

We convert each binary number to a decimal number:

| Decimal Value | Symbol |
| --- | --- |
| 1 0 | 2 |
| 2 0 | 3 |

| Decimal Value | Symbol |
|---|---|
| 1 3 | 4 |
| 4 0 | 5 |
| 2 5 | 6 |
| 0 6 | 7 |

We identify the decimal values as the tuple definitions for the symbols:

| Symbol | Tuple |
|---|---|
| 2 | 1 > 0 |
| 3 | 2 > 0 |
| 4 | 1 > 3 |
| 5 | 4 > 0 |
| 6 | 2 > 5 |
| 7 | 0 > 6 |

We populate the dictionary with these definitions as seen in table 73, FIG. 73.

Construct the Decode Tree

We use the tuples that are defined in the re-constructed dictionary to build the Huffman decode tree. Let's decode the example dictionary to demonstrate the process. The diagram 74 in FIG. 74 shows how we build the decode tree to determine the original bits represented by each of the symbols in the dictionary. The step-by-step reconstruction of the original bits is as follows:

Start with symbols 0 and 1. These are the atomic elements, so there is no related tuple. The symbol 0 is a left branch from the root. The symbol 1 is a right branch. (Left and right are relative to the node as you are facing the diagram that is, on your left and on your right.) The atomic elements are each represented by a single bit, so the binary path and the original path are the same. Record the original bits 0 and 1 in the decode table.

Symbol 2 is defined as the tuple 1>0 (symbol 1 followed by symbol 0). In the decode tree, go to the node for symbol 1, then add a path that represents symbol 0. That is, add a left branch at node 1. The terminating node is the symbol 2. Traverse the path from the root to the leaf to read the branch paths of left (L) and right (R). Replace each left branch with a 0 and each right path with a 1 to view the binary forum of the path as LR, or binary 10.

Symbol 3 is defined as the tuple 2>0. In the decode tree, go to the node for symbol 2, then add a path that represents symbol 0. That is, add a left branch at node 2. The terminating node is the symbol 3. Traverse the path from the root to the leaf to read the branch path of RLL. Replace each left branch with a 0 and each right path with a 1 to view the binary form of the path as 100.

Symbol 4 is defined as the tuple 1>3. In the decode tree, go to the node for symbol 1, then add a path that represents symbol 3. From the root to the node for symbol 3, the path is RLL. At symbol 1, add the RLL path. The terminating node is symbol 4. Traverse the path from the root to the leaf to read the path of RRLL, which translates to the binary format of 1100.

Symbol 5 is defined as the tuple 4>0. In the decode tree, go to the node for symbol 4, then add a path that represents symbol 0. At symbol 4, add the L path. The terminating node is symbol 5. Traverse the path from the root to the leaf to read the path of RRLLL, which translates to the binary format of 11000.

Symbol 6 is defined as the tuple 2>5. In the decode tree, go to the node for symbol 2, then add a path that represents symbol 5. From the root to the node for symbol 5, the path is RRLLL. The terminating node is symbol 6. Traverse the path from the root to the leaf to read the path of RLRRLLL, which translates to the binary format of 1011000.

Symbol 7 is defined as the tuple 0>6. In the decode tree, go to the node for symbol 0, then add a path that represents symbol 6. From the root to the node for symbol 6, the path is RLRRLLL. The terminating node is symbol 7. Traverse the path from the root to the leaf to read the path of LRLRRLLL, which translates to the binary format of 01011000.

Decompress the Data

Figure 75:
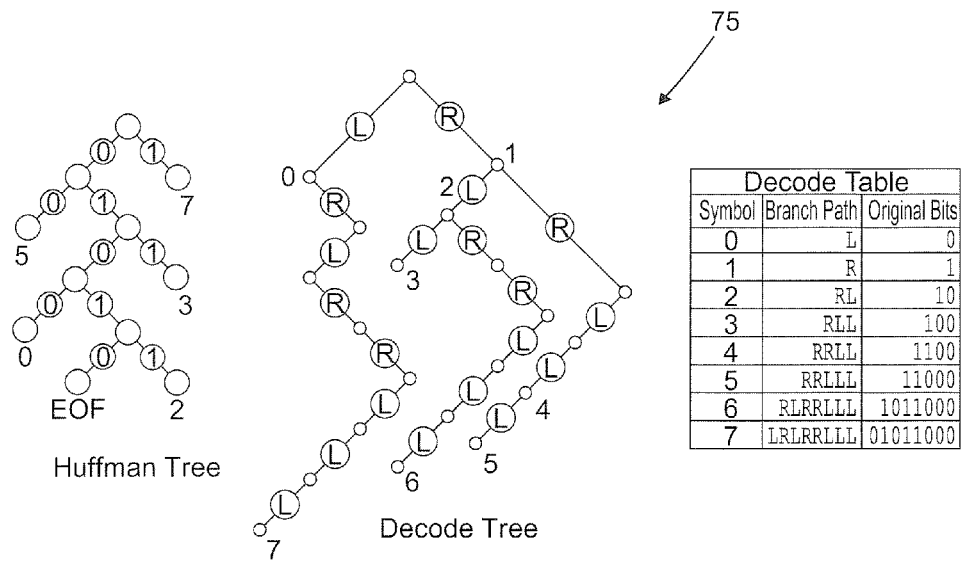

To decompress the data, we need the reconstructed Huffman tree and the decode table that maps the symbols to their original bits as seen at 75, FIG. 75. We read the bits in the data file one bit at a time, following the branching path in the Huffman tree from the root to a node that represents a symbol.

The compressed file data bits are:
010000111111111111111111111111111110110011101100 11111111011001011000110001100011 000110001011010 10

Figure 76:
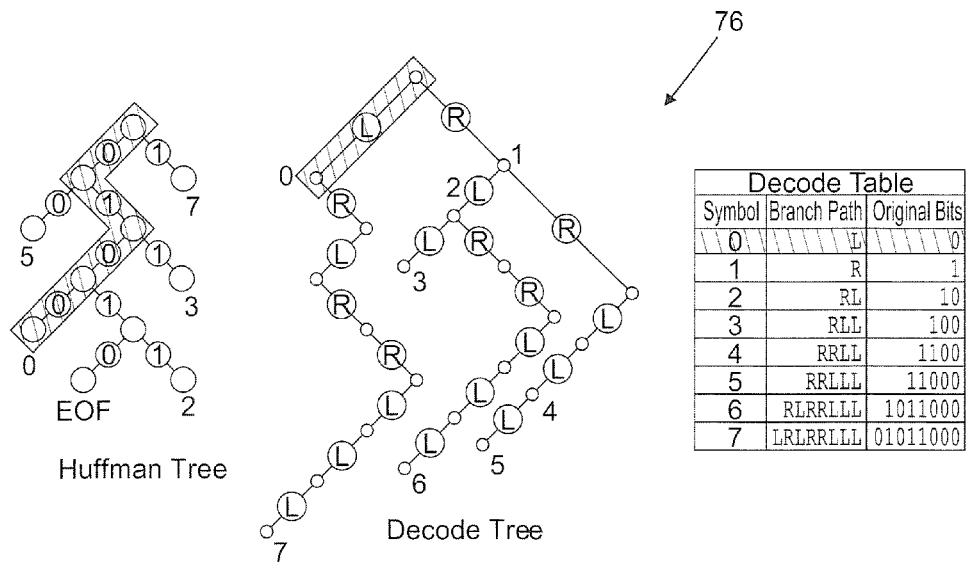

For example, the first four bits of encoded data 0100 takes us to symbol 0 in the Huffman tree, as illustrated in the diagram 76, FIG. 76. We look up 0 in the decode tree and table to find the original bits. In this case, the original bits are also 0. We replace 0100 with the single bit 0.

Figure 77:
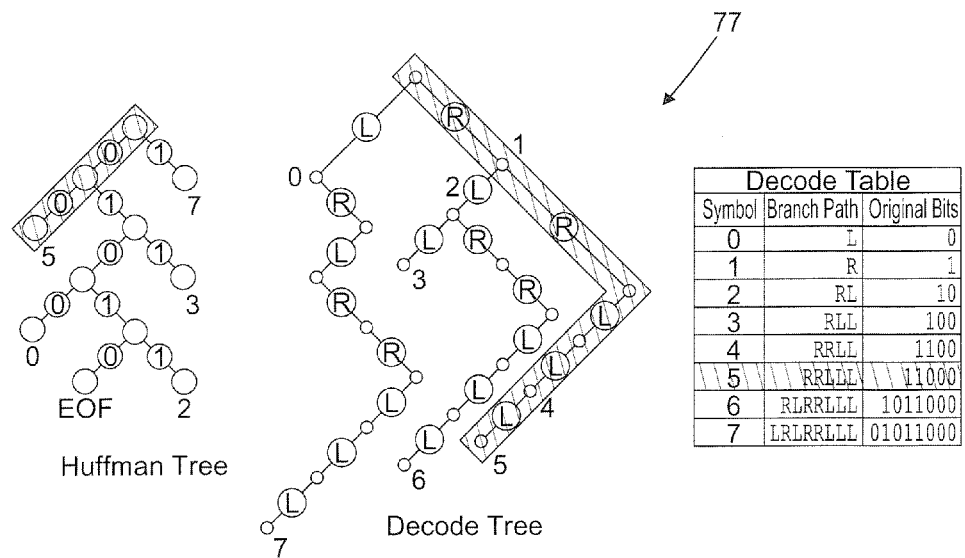

In the diagram 77 in FIG. 77, we follow the next two bits 00 to find symbol 5 in the Huffman tree. We look up 5 in the decode tree and table to find that symbol 5 represents original bits of 11000. We replace 00 with 11000.

Figure 78:
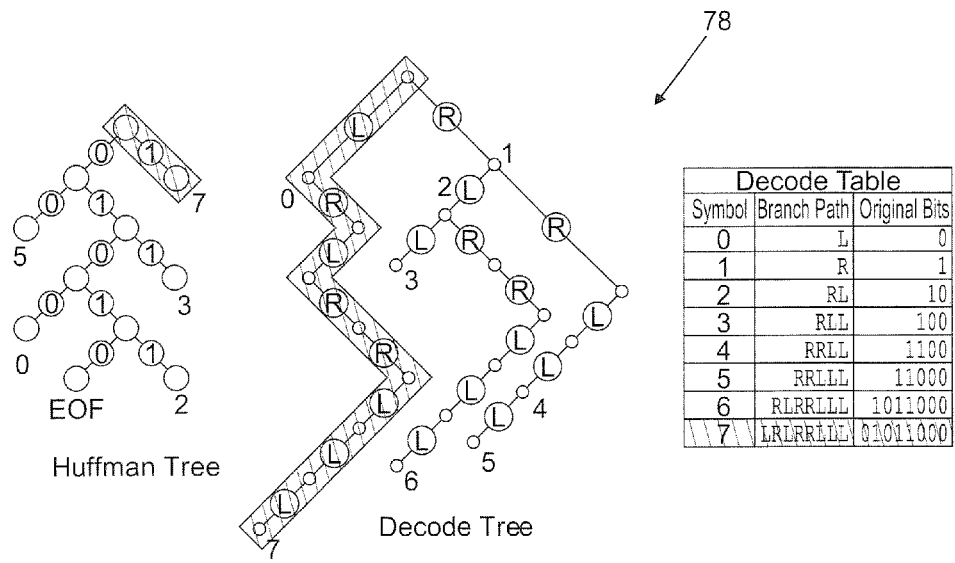

In the diagram 78, FIG. 78, we follow the next bit 1 to find symbol 7 in the Huffman tree. We look up 7 in the decode tree and table to find that symbol 7 represents the original bits 01011000. We replace the single bit 1 with 01011000. We repeat this for each 1 in the series of is that follow.

Figure 79:
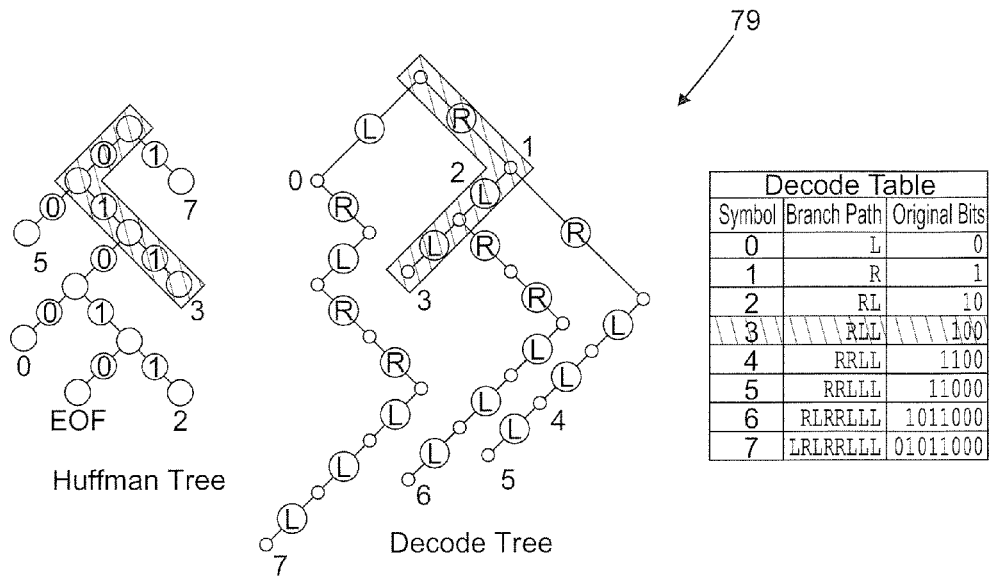

The next symbol we discover is with bits 011. We follow these bits in the Huffman tree in diagram 79, FIG. 79. We look up symbol 3 in the decode tree and table to find that it represents original bits 100, so we replace 011 with bits 100.

Figure 80:
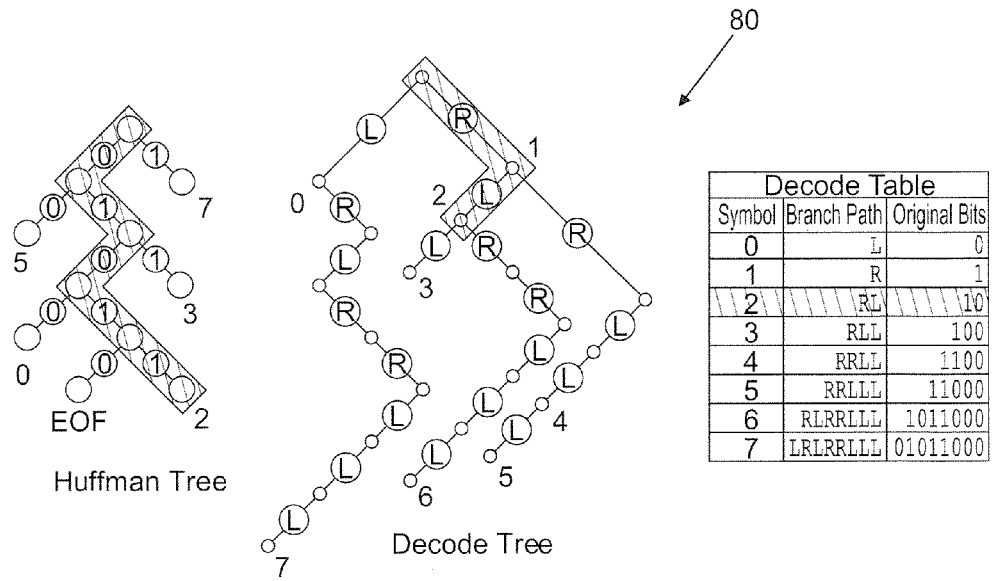

We continue the decoding and replacement process to discover the symbol 2 near the end of the stream with bits 01011, as illustrated in diagram 80, FIG. 80. We look up symbol 2 in the decode tree and table to find that it represents original bits 10, so we replace 01011 with bits 10.

Figure 81:
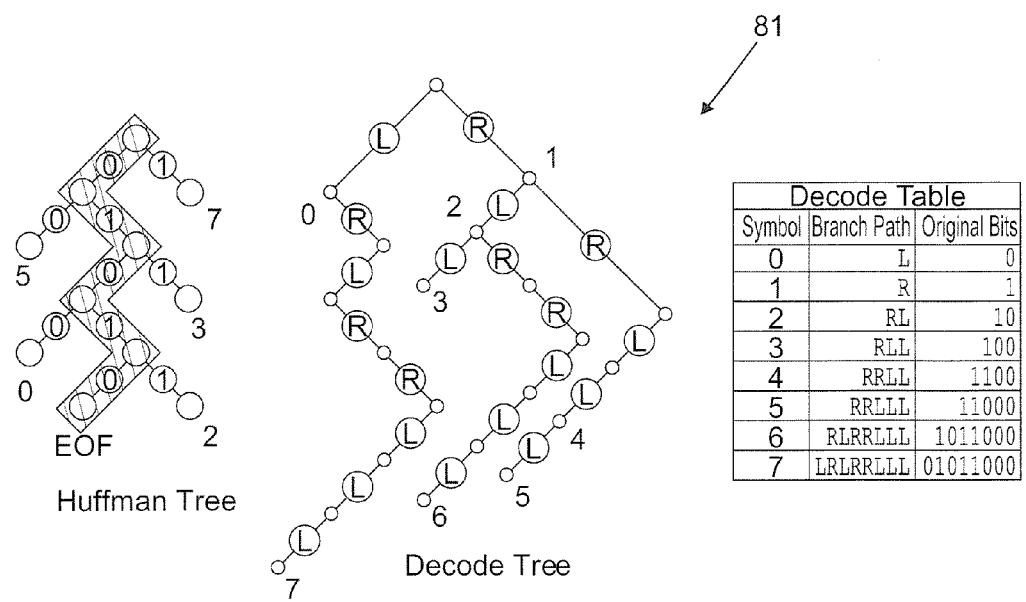

The final unique sequence of bits that we discover is the end-of-file sequence of 01010, as illustrated in diagram 81, FIG. 81. The EOF tells us that we are done unpacking.

Altogether, the unpacking of compressed bits recovers the original bits of the original data stream in the order of diagram 82 spread across two FIGS. 82*a* and 82*b*.

Figure 83:
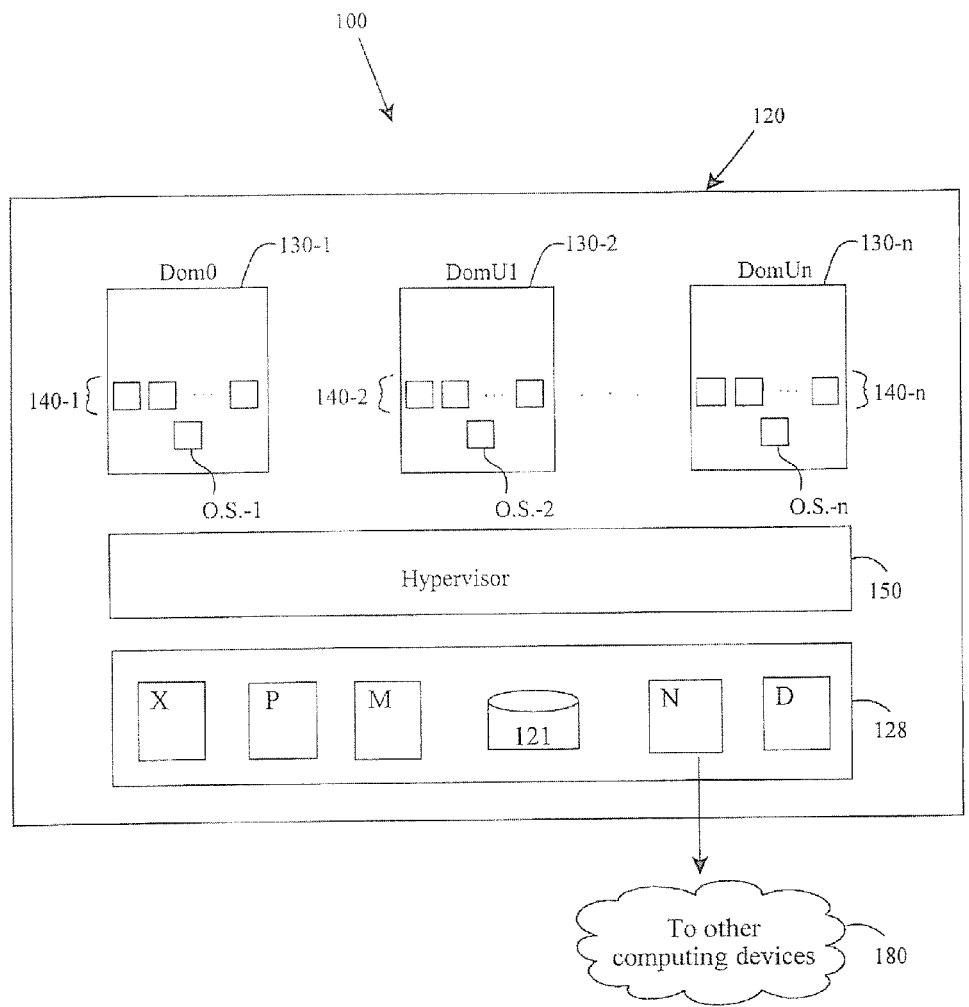
FIG. 83 is a diagram in accordance with the present invention showing a representative computing device for practicing all or some of the foregoing.

With reference to FIG. 83, a representative computing system environment 100 includes a computing device 120. Representatively, the device is a general or special purpose computer, a phone, a PDA, a server, a laptop, etc., having a hardware platform 128. The hardware platform includes physical I/O and platform devices, memory (M), processor (P), such as a CPU(s), USB or other interfaces (X), drivers (D), etc. In turn, the hardware platform hosts one or more virtual machines in the form of domains 130-1 (domain 0, or management domain), 130-2 (domain U1), . . . 130-*n* (domain Un), each having its own guest operating system (O.S.) (e.g., Linux, Windows, Netware, Unix, etc.), applications 140-1, 140-2, . . . 140-*n*, file systems, etc. The workloads of each virtual machine also consume data stored on one or more disks 121.

An intervening Xen or other hypervisor layer 150, also known as a "virtual machine monitor," or virtualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform. Alternatively, the computing system environment is not a virtual environment at all, but a more traditional environment lacking a hypervisor, and partitioned virtual domains. Also, the environment could include dedicated services or those hosted on other devices.

In any embodiment, the representative computing device 120 is arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

In still other embodiments, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of a computing device 120, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

While the foregoing produces a well-compressed output file, e.g., FIG. 69, skilled artisans should appreciate that the algorithm requires relatively considerable processing time to determine a Huffman tree, e.g., element 50, and a dictionary, e.g., element 26, of optimal symbols for use in encoding and compressing an original file. Also, the time spent to determine the key information of the file is significantly longer than the time spent to encode and compress the file with the key. The following embodiment, therefore, describes a technique to use a file's compression byproducts to compress other data files that contain substantially similar patterns. The effectiveness of the resultant compression depends on how similar a related file's patterns are to the original file's patterns. As will be seen, using previously created, but related key, decreases the processing time to a small fraction of the time needed for the full process above, but at the expense of a slightly less effective compression. The process can be said to achieve a "fast approximation" to optimal compression for the related files.

The definitions from FIG. 1 still apply.

Broadly, the "fast approximation" hereafter 1) greatly reduces the processing time needed to compress a file using the techniques above, and 2) creates and uses a decode tree to identify the most complex possible pattern from an input bit stream that matches previously defined patterns. Similar to earlier embodiments, this encoding method requires repetitive computation that can be automated by computer software. The following discusses the logical processes involved.

Compression Procedure Using a Fast Approximation to Optimal Compression

Instead of using the iterative process of discovery of the optimal set of symbols, above, the following uses the symbols that were previously created for another file that contains patterns significantly similar to those of the file under consideration. In a high-level flow, the process involves the following tasks:

Select a file that was previously compressed using the procedure(s) in FIGS. 2-82*b*. The file should contain data patterns that are significantly similar to the current file under consideration for compression.

From the previously compressed file, read its key information and unpack its Huffman tree and symbol dictionary by using the procedure described above, e.g., FIGS. 63-82*b*.

Create a decode tree for the current file by using the symbol dictionary from the original file.

Identify and count the number of occurrences of patterns in the current file that match the previously defined patterns.

Create a Huffman encoding tree for the symbols that occur in the current file plus an end-of-file (EOF) symbol.

Store the information using the Huffman tree for the current file plus the file type, symbol width, and dictionary from the original file.

Each of the tasks is described in more detail below. An example is provided thereafter.

Selecting a Previously Compressed File

The objective of the fast approximation method is to take advantage of the key information in an optimally compressed file that was created by using the techniques above. In its uncompressed form of original data, the compressed file should contain data patterns that are significantly similar to the patterns in the current file under consideration for compression. The effectiveness of the resultant compression depends on how similar a related file's patterns are to the original file's patterns. The way a skilled artisan recognizes a similar file is that similar bit patterns are found in the originally compressed and new file yet to be compressed. It can be theorized a priori that files are likely similar if they have similar formatting (e.g., text, audio, image, powerpoint, spreadsheet, etc), topic content, tools used to create the files, file type, etc. Conclusive evidence of similar bit patterns is that similar compression ratios will occur on both files (i.e. original file compresses to 35% of original size, while target file also compresses to about 35% of original size). It should be noted that similar file sizes are not a requisite for similar patterns being present in both files.

Figure 84:
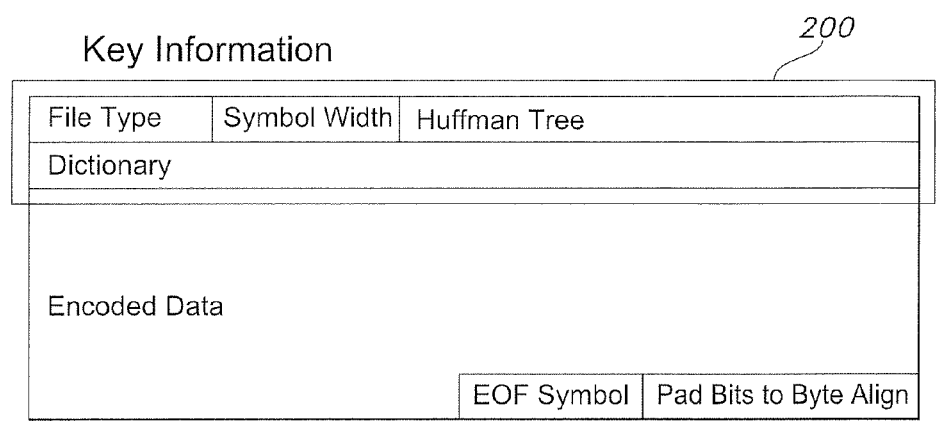

With reference to FIG. 84, the key information 200 of a file includes the file type, symbol width, Huffman tree, and dictionary from an earlier file, e.g., file 69, FIG. 69.

Reading and Unpacking the Key Information

From the key information 200, read and unpack the File Type, Maximum Symbol Width, Huffman Tree, and Dictionary fields.

Creating a Decode Tree for the Current File

Create a pattern decode tree using the symbol dictionary retrieved from the key information. Each symbol represents a bit pattern from the original data stream. We determine what those bits are by building a decode tree, and then parsing the tree to read the bit patterns for each symbol.

We use the tuples that are defined in the re-constructed dictionary to build the decode tree. The pattern decode tree is formed as a tree that begins at the root and branches downward. A terminal node represents a symbol ID value. A transition node is a placeholder for a bit that leads to terminal nodes.

Identifying and Counting Pattern Occurrences

Read the bit stream of the current file one bit at a time. As the data stream is parsed from left to right, the paths in the decode tree are traversed to detect patterns in the data that match symbols in the original dictionary.

Starting from the root of the pattern decode tree, use the value of each input bit to determine the descent path thru the pattern decode tree. A "0" indicates a path down and to the left, while a "1" indicates a path down and to the right. Continue descending through the decode tree until there is no more descent path available. This can occur because a branch left is indicated with no left branch available, or a branch right is indicated with no right branch available.

When the end of the descent path is reached, one of the following occurs:

If the descent path ends in a terminal node, count the symbol ID found there.

If the descent path ends in a transition node, retrace the descent path toward the root, until a terminal node is encountered. This terminal node represents the most complex pattern that could be identified in the input bit stream. For each level of the tree ascended, replace the bit that the path represents back into the bit stream because those bits form the beginning of the next pattern to be discovered. Count the symbol ID found in the terminal node.

Return to the root of the decode tree and continue with the next bit in the data stream to find the next symbol.

Repeat this process until all of the bits in the stream have been matched to patterns in the decode tree. When done, there exists a list of all of the symbols that occur in the bit stream and the frequency of occurrence for each symbol.

Creating a Huffman Tree and Code for the Current File

Use the frequency information to create a Huffman encoding tree for the symbols that occur in the current file. Include the end-of-file (EOF) symbol when constructing the tree and determining the code.

Storing the Compressed File

Use the Huffman tree for the current file to encode its data. The information needed to decompress the file is written at the front of the compressed file, as well as to a separate dictionary only file. The compressed file contains:

The file type and maximum symbol width information from the original file's key

A coded representation of the Huffman tree that was created for the current file and used to compress its data, The dictionary of symbols from the original file's key, The Huffman-encoded data, and The Huffman-encoded EOF symbol.

Example of "Fast Approximation"

This example uses the key information 200 from a previously created but related compressed file to approximate the symbols needed to compress a different file.

Reading and Unpacking the Key Information

With reference to table 202, FIG. 85, a representative dictionary of symbols (0-8) was unpacked from the key information 200 for a previously compressed file. The symbols 0 and 1 are atomic, according to definition (FIG. 1) in that they represent bits 0 and 1, respectively. The reading and unpacking this dictionary from the key information is given above.

Construct the Decode Tree from the Dictionary

Figure 86:
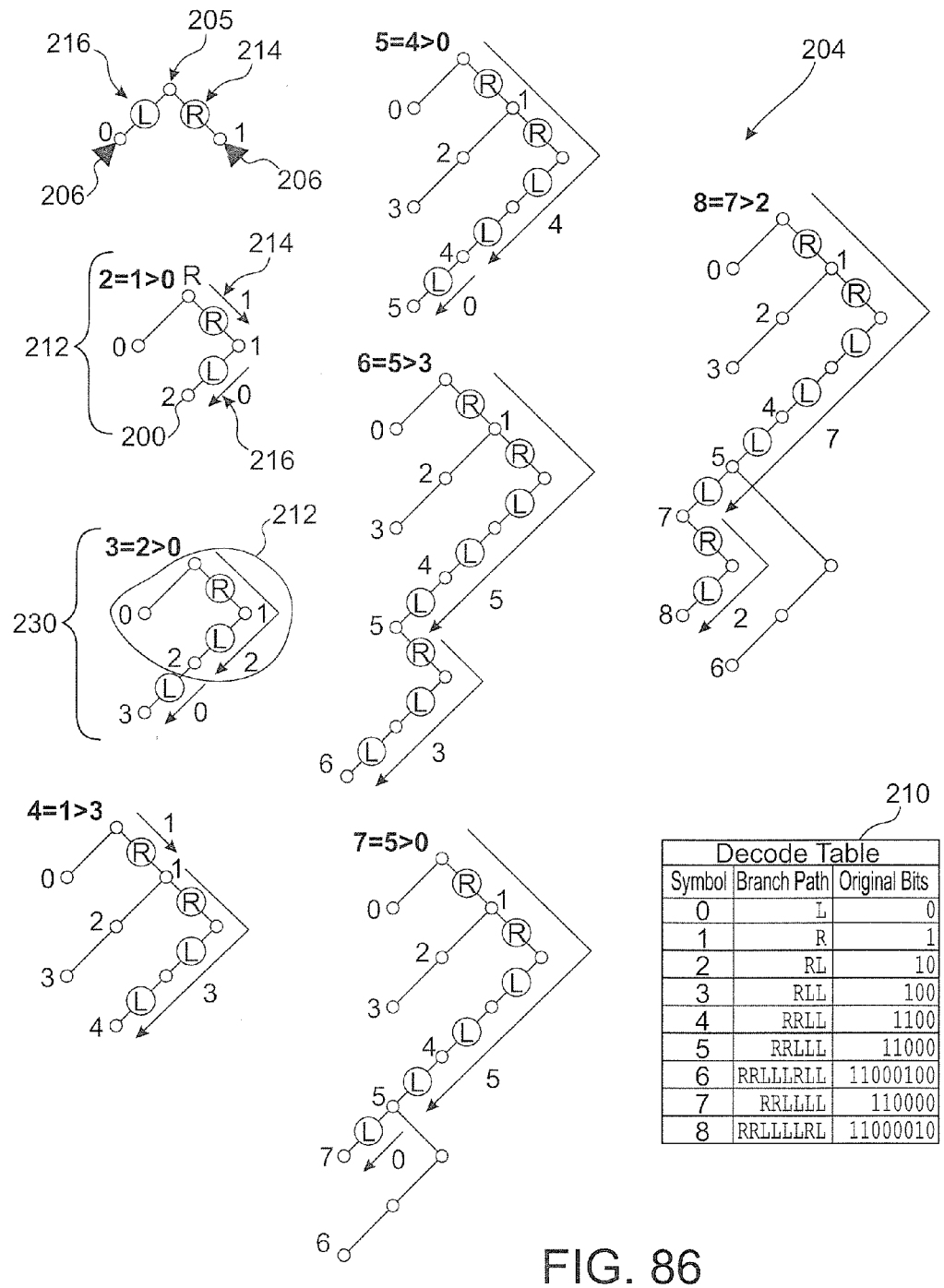

With reference to FIG. 86, a diagram 204 demonstrates the process of building the decode tree for each of the symbols in the dictionary (FIG. 85) and determining the original bits represented by each of the symbols in the dictionary. In the decode tree, there are also terminal nodes, e.g., 205, and transition nodes, e.g., 206. A terminal node represents a symbol value. A transition node does not represent a symbol, but represents additional bits in the path to the next symbol. The step-by-step reconstruction of the original bits is described below.

Start with symbols 0 and 1. These are the atomic elements, by definition, so there is no related tuple as in the dictionary of FIG. 85. The symbol 0 branches left and down from the root. The symbol 1 branches right and down from the root. (Left and right are relative to the node as you are facing the diagram—that is, on your left and on your right.) The atomic elements are each represented by a single bit, so the binary path and the original path are the same. You record the "original bits" 0 and 1 in the decode table 210, as well as its "branch path."

Symbol 2 is defined from the dictionary as the tuple 1>0 (symbol 1 followed by symbol 0). In the decode tree 212, go to the node for symbol 1 (which is transition node 205 followed by a right path R and ending in a terminal node 206, or arrow 214), then add a path that represents symbol 0 (which is transition node 205 followed by a left path L and ending in a terminal node 206, or path 216). That is, you add a left branch at node 1. The terminating node 220 is the symbol 2. Traverse the path from the root to the leaf to read the branch paths of right (R) and left (L). Replace each left branch with a 0 and each right path with a 1 to view the binary form of the path as RL, or binary 10 as in decode table 210.

Symbol 3 is defined as the tuple 2>0. In its decode tree 230, it is the same as the decode tree for symbol 2, which is decode tree 212, followed by the "0." Particularly, in tree 230, go to the node for symbol 2, then add a path that represents symbol 0. That is, you add a left branch (e.g., arrow 216) at node 2. The terminating node is the symbol 3. Traverse the path from the root to the leaf to read the branch path of RLL. Replace each left branch with a 0 and each right path with a 1 to view the binary format of 100 as in the decode table.

Similarly, the other symbols are defined with decode trees building on the decode trees for other symbols. In particular, they are as follows:

Symbol 4 from the dictionary is defined as the tuple 1>3. In its decode tree, go to the node for symbol 1, then add a path that represents symbol 3. From the root to the node for symbol 3, the path is RLL. At symbol 1, add the RLL path. The terminating node is symbol 4. Traverse the path from the root to the leaf to read the path of RRLL, which translates to the binary format of 1100 as in the decode table.

Symbol 5 is defined as the tuple 4>0. In its decode tree, go to the node for symbol 4, then add a path that represents symbol 0. At symbol 4, add the L path. The terminating node is symbol 5. Traverse the path from the root to the leaf to read the path of RRLLL, which translates to the binary format of 11000.

Symbol 6 is defined as the tuple 5>3. In its decode tree, go to the node for symbol 5, then add a path that represents symbol 3. The terminating node is symbol 6. Traverse the path from the root to the leaf to read the path of RRLLLRLL, which translates to the binary format of 11000100.

Symbol 7 is defined from the dictionary as the tuple 5>0. In its decode tree, go to the node for symbol 5, then add a path that represents symbol 0. From the root to the node for symbol 5, the path is RRLLL. Add a left branch. The terminating node is symbol 7. Traverse the path from the root to the leaf to read the path of RRLLLL, which translates to the binary format of 110000.

Finally, symbol 8 is defined in the dictionary as the tuple 7>2. In its decode tree, go to the node for symbol 7, then add a path that represents symbol 2. From the root to the node for symbol 7, the path is RRLLLL. Add a RL path for symbol 2. The terminating node is symbol 8. Traverse the path from the root to the leaf to read the path of RRLLLLRL, which translates to the binary format of 11000010.

Figure 87:
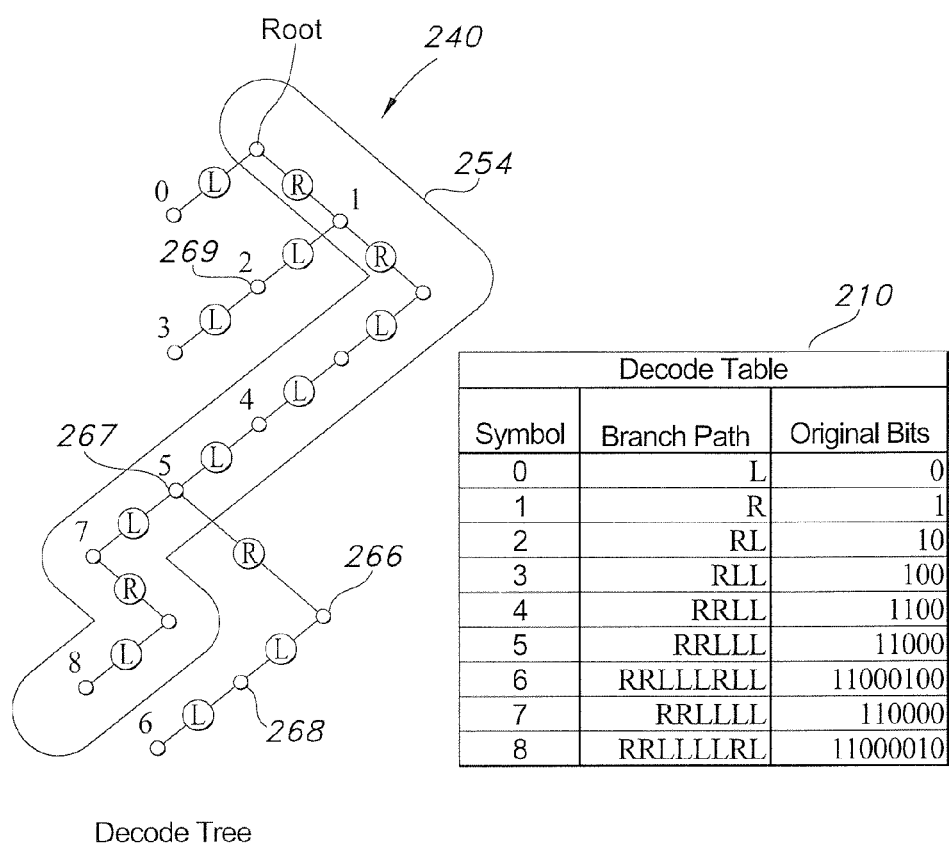

The final decode tree for all symbols put together in a single tree is element 240, FIG. 87, and the decode table 210 is populated with all original bit and branch path information.

Identifying and Counting Pattern Occurrences

For this example, the sample or "current file" to be compressed is similar to the one earlier compressed who's key information 200, FIG. 84, was earlier extracted. It contains the following representative "bit stream" (reproduced in FIG. 88, with spaces for readability):
0110000101100010011000010110001001100001011 0000
1011000100110000101100010011000 0101100001011000
1001100001011000100110000101100010011000010110 0
010011000100110    0010011000100110001001100001 0
1100001011000100110000101100010011000101100010

Figure 88:
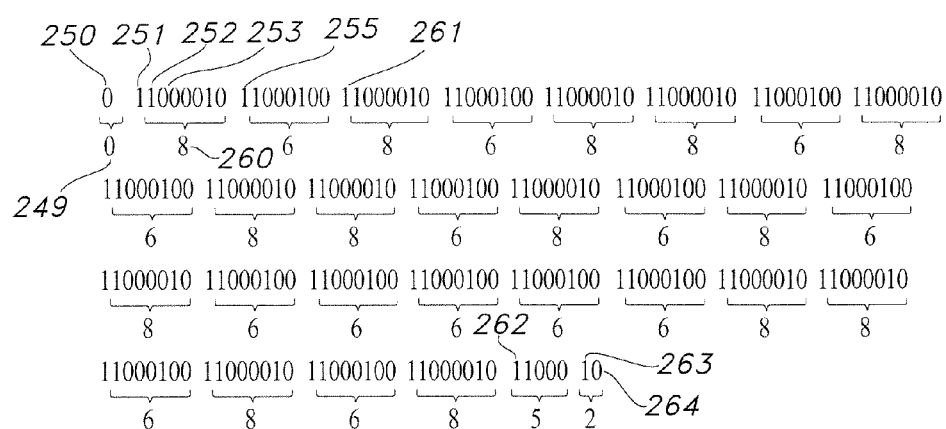

We step through the stream one bit at a time to match patterns in the stream to the known symbols from the dictionary 200, FIG. 85. To determine the next pattern in the bit stream, we look for the longest sequence of bits that match a known symbol. To discover symbols in the new data bit stream, read a single bit at a time from the input bit stream. Representatively, the very first bit, 250 FIG. 88, of the bit stream is a "0." With reference to the Decode Tree, 240 in FIG. 87, start at the top-most (the root) node of the tree. The "0" input bit indicates a down and left "Branch Path" from the root node. The next bit from the source bit stream at position 251 in FIG. 88, is a "1," indicating a down and right path. The Decode Tree does not have a defined path down and right from the current node. However the current node is a terminal node, with a symbol ID of 0. Write a symbol 0 to a temporary file, and increment the counter corresponding to symbol ID 0. Return to the root node of the Decode Tree, and begin looking for the next symbol. The "1" bit that was not previously usable in the decode (e.g., 251 in FIG. 88) indicates a down and right. The next bit "1" (252 in FIG. 88) indicates a down and right. Similarly, subsequent bits "000010" indicate further descents in the decode tree with paths directions of LLLLRL, resulting in path 254 from the root. The next bit "1" (position 255, FIG. 88) denotes a further down and right path, which does not exist in the decode tree 240, as we are presently at a terminal node. The symbol ID for this terminal node is 8. Write a symbol 8 to the temporary file, and increment the counter corresponding to symbol ID 8.

Return to the root node of the Decode Tree, and begin looking for the next symbol again starting with the last unused input stream bit, e.g., the bit "1" at position 255, FIG. 88. Subsequent bits in the source bit stream, "11000100," lead down through the Decode Tree to a terminal node for symbol 6. The next bit, "1", at position 261, FIG. 88, does not represent a possible down and right traversal path. Thus, write a symbol 6 to the temporary file, and increment the counter corresponding to symbol ID 6. Again, starting back at the root of the tree, perform similar decodes and book keeping to denote discovery of symbols 868686868686866666886868. Starting again at the root of the Decode Tree, parse the paths represented by input bits "1100010" beginning at position 262. There are no more bits available in the input stream. However, the current position in the Decode Tree, position 268, does not identify a known symbol. Thus, retrace the Decode Tree path upward toward the root. On each upward level node transition, replace a bit at the front of the input bit stream with a bit that represents that path transition; e.g. up and right is a "0", up and left is a "1". Continue the upward parse until reaching a valid symbol ID node, in this case the node 267 for symbol ID 5. In the process, two bits (e.g., positions 263 and 264, FIG. 88) will have been pushed back onto the input stream, a "0", and then a "1." As before, write a symbol 5 to a temporary file, and increment the counter corresponding to symbol ID 5. Starting back at the root of the tree, bits are pulled from the input stream and parsed downward, in this case the "1" and then the "0" at positions 263 and 264. As we are now out of input bits, after position 264, examine the current node for a valid symbol ID, which in this case does exist at node 269, a symbol ID of 2. Write a symbol 2 to the temporary files, increment the corresponding counter. All input bits have now been decoded to previously defined symbols. The entire contents of the temporary file are symbols: "08686868686868686866666688686852."

From here, the frequency of occurrence of each of the symbols in the new bit stream is counted. For example, the symbols "0" and "2" are each found occurring once at the beginning and end of the new bit stream. Similarly, the symbol "5" is counted once just before the symbol "2." Each of the symbols "6" and "8" are counted fourteen times in the middle of the new bit stream for a total of thirty-one symbols. Its result is shown in table 275, FIG. 89. Also, one count for the end of file (EOF) symbol is added that is needed to mark the end of the encoded data when we store the compressed data.

Creating a Huffman Tree and Code for the Current File

Figure 90:
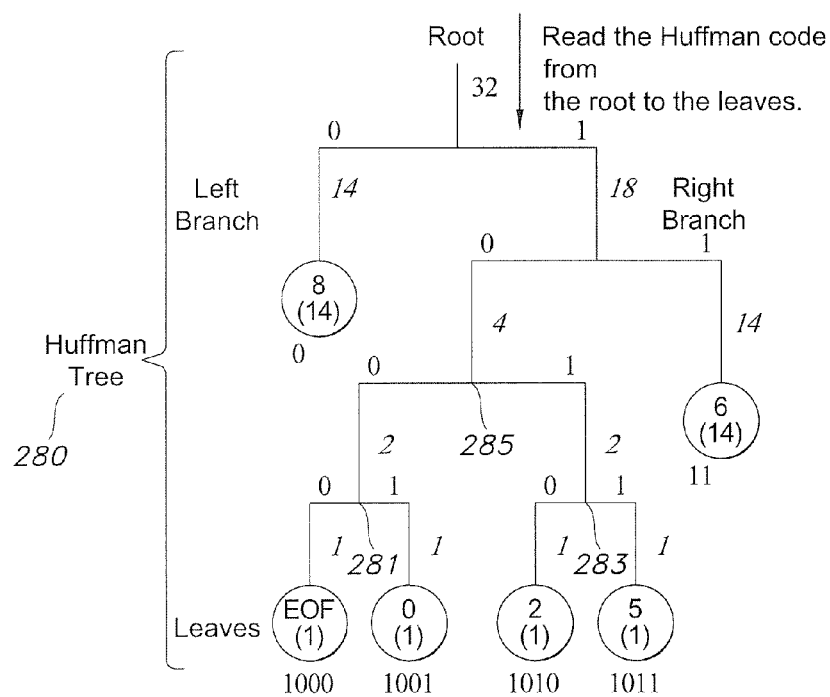

From the symbol "counts" in FIG. 89, a Huffman binary code tree 280 is built for the current file, as seen in FIG. 90. There is no Huffman code assigned to the symbol 1, symbol 3, symbol 4, and symbol 7 because there are no instances of these symbols in the new bit stream. However, the extinct symbols will be needed in the decode table for the tree. The reason for this is that a complex symbol may decode to two less complex symbols. For example, it is known that a symbol 8 decodes to tuple 7>2, e.g., FIG. 85.

To construct the tree 280, list first the symbols from highest count to lowest count. In this example, the symbol "8" and symbol "6" tied with a count of fourteen and are each listed highest on the tree. On the other hand, the least counted symbols were each of symbol "0," "2," "5," and the EOF. Combine the counts for the two least frequently occurring symbols in the dictionary. This creates a node that has the value of the sum of the two counts. In this example, the EOF and 0 are combined into a single node 281 as are the symbols 2 and 5 at node 283. Together, all four of these symbols combine into a node 285. Continue combining the two lowest counts in this manner until there is only one symbol remaining. This generates a Huffman binary code tree.

Label the code tree paths with zeros (0s) and ones (1s). To encode a symbol, parse from the root to the symbol. Each left and down path represents a 0 in the Huffman code. Each right and down path represents a 1 in the Huffman code. The Huffman coding scheme assigns shorter code words to the more frequent symbols, which helps reduce the size length of the encoded data. The Huffman code for a symbol is defined as the string of values associated with each path transition from the root to the symbol terminal node.

With reference to FIG. 91, table 290 shows the final Huffman code for the current file, as based on the tree. For example, the symbol "8" appears with the Huffman code 0. From the tree, and knowing the rule that "0" is a left and down path, the "8" should appear from the root at down and left, as it does. Similarly, the symbol "5" should appear at "1011" or right and down, left and down, right and down, and right and down, as it does. Similarly, the other symbols are found. There is no code for symbols 1, 3, 4, and 7, however, because they do not appear in the current file.

Storing the Compressed File

Figure 92:
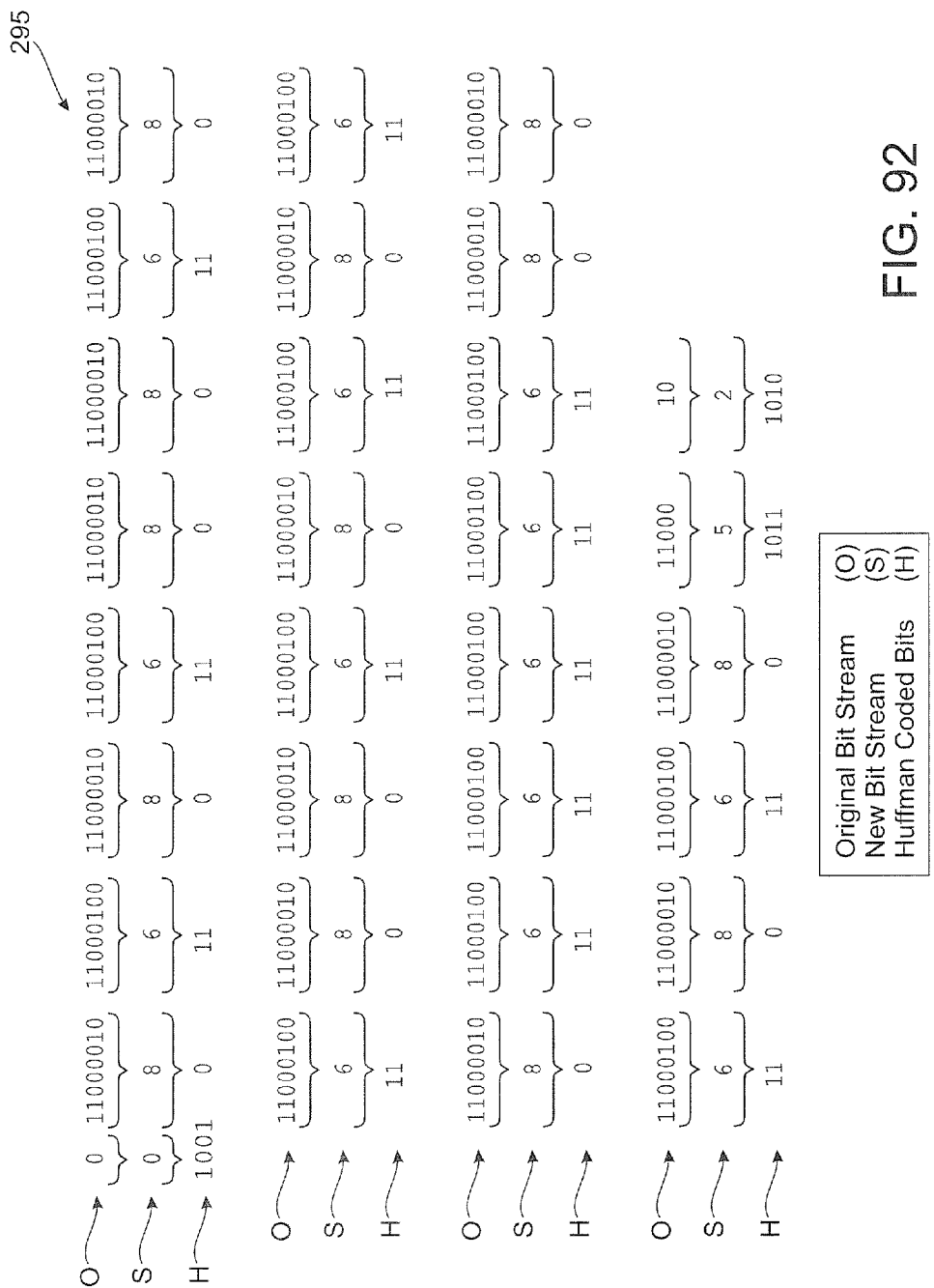

The diagram in FIG. 92 illustrates how we now replace the symbols with their Huffman code value when the file is stored, such as in file format element 69, FIG. 69. As is seen, the diagram 295 shows the original bit stream that is coded to symbols or a new bit stream, then coded to Huffman codes. For example, the "0" bit at position 250 in the original bit stream coded to a symbol "0" as described in FIG. 88. By replacing the symbol 0 with its Huffman code (1001) from table 290, FIG. 91, the Huffman encoded bits are seen, as:
1001 0 11 0 11 0 0 11 0 11 0 0 11 0 11 0 11 0 11 11 11 11 11 0 0 11 0 11 0
1011 1010 1000

Spaces are shown between the coded bits for readability; the spaces are not written to media. Also, the code for the EOF symbol (1000) is placed at the end of the encoded data and shown in underline.

Figure 93:
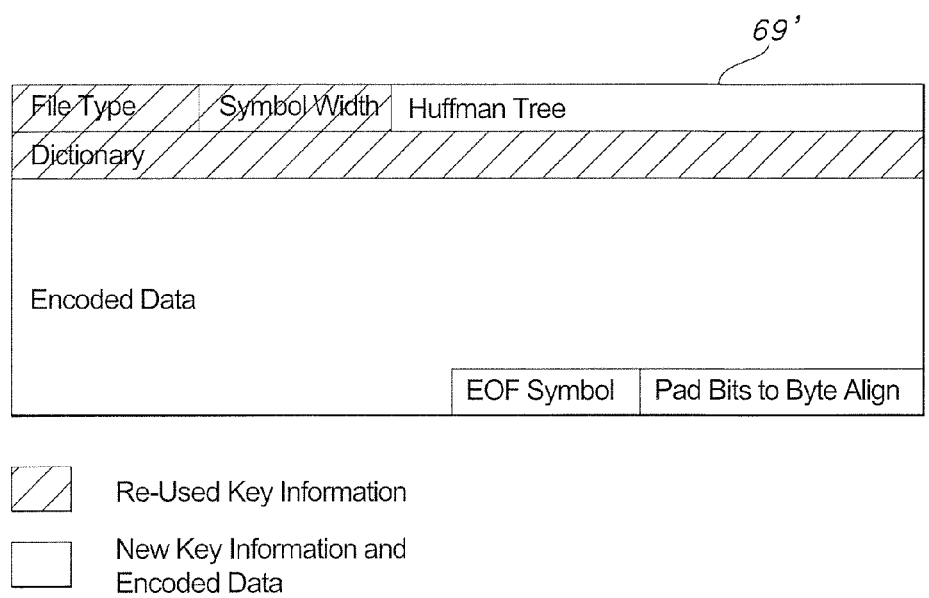

With reference to FIG. 93, the foregoing information is stored in the compressed file 69' for the current file. As skilled artisans will notice, it includes both original or re-used information and new information, thereby resulting in a "fast approximation." In detail, it includes the file type from the original key information (200), the symbol width from the original key information (200), the new Huffman coding recently created for the new file, the dictionary from the key information (200) of the original file, the data that is encoded by using the new Huffman tree, and the new EOF symbol. After the EOF symbol, a variable amount of pad bits are added to align the data with the final byte in storage.

In still another alternate embodiment, the following describes technology to identify a file by its contents. It is defined, in one sense, as providing a file's "digital spectrum." The spectrum, in turn, is used to define a file's position in an N-dimensional universe. This universe provides a basis by which a file's position determines similarity, adjacency, differentiation and grouping relative to other files. Ultimately, similar files can originate many new compression features, such as the "fast approximations" described above. The terminology defined in FIG. 1 remains valid as does the earlier-presented information for compression and/or fast approximations using similar files. It is supplemented with the definitions in FIG. 94. Also, the following considers an alternate use of the earlier described symbols to define a digital variance in a file. For simplicity in this embodiment, a data stream under consideration is sometimes referred to as a "file."

The set of values that digitally identifies the file, referred to as the file's digital spectrum, consists of several pieces of information found in two scalar values and two vectors.

The scalar values are:
The number of symbols in the symbol dictionary (the dictionary being previously determined above.)
The number of symbols also represents the number of dimensions in the N-dimensional universe, and thus, the number of coordinates in the vectors.

The length of the source file in bits.
This is the total number of bits in the symbolized data stream after replacing each symbol with the original bits that the symbol represents.

The vectors are:
An ordered vector of frequency counts, where each count represents the number of times a particular symbol is detected in the symbolized data stream.

$$F_x = (F_{0x}, F_{1x}, F_{2x}, F_{3x}, \ldots, F_{Nx}),$$

where F represents the symbol frequency vector, 0 to N are the symbols in a file's symbol dictionary, and x represents the source file of interest.

An ordered vector of bit lengths, where each bit length represents the number of bits that are represented by a particular symbol.

$$B_x = (B_{0x}, B_{1x}, B_{2x}, B_{3x}, \ldots, B_{Nx}),$$

where B represents the bit-length vector, 0 to N are the symbols in a file's symbol dictionary, and x represents the source file of interest.

The symbol frequency vector can be thought of as a series of coordinates in an N-dimensional universe where N is the number of symbols defined in the alphabet of the dictionary, and the counts represent the distance from the origin along the related coordinate axis. The vector describes the file's informational position in the N-dimension universe. The meaning of each dimension is defined by the meaning of its respective symbol.

The origin of N-dimensional space is an ordered vector with a value of 0 for each coordinate:

$$F_O = (0,0,0,0,0,0,0,0, \ldots, 0).$$

The magnitude of the frequency vector is calculated relative to the origin. An azimuth in each dimension can also be determined using ordinary trigonometry, which may be used at a later time. By using Pythagorean geometry, the distance from the origin to any point F in the N-dimensional space can be calculated, i.e.:

$$D_{ON} = \text{square root}(((F_{0x}-F_{0o})^2) + ((F_{1x}-F_{1o})^2) + ((F_{2x}-F_{2o})^2) + ((F_{3x}-F_{3o})^2) + \ldots + ((F_{Nx}-F_{No})^2))$$

Substituting the 0 at each coordinate for the values at the origin, the simplified equation is:

$$D_{ox} = \text{square root}(((F_{0x})^2) + (F_{1x})^2) + (F_{2x})^2) + (F_{3x})^2) + \ldots + (F_{Nx})^2))$$

As an example, imagine that a file has 10 possible symbols and the frequency vector for the file is:

$$F_x = (3,5,6,1,0,7,19,3,6,22).$$

Since this vector also describes the file's informational position in this 10-dimension universe, its distance from the origin can be calculated using the geometry outlined. Namely:

$$Dox = \text{square root}(((3-0)^2) + ((5-0)^2) + ((6-0)^2) + ((6-0)^2) + ((1-0)^2) + ((0-0)^2) + ((7-0)^2) + ((19-0)^2) + ((3-0)^2) + ((6-0)^2) + ((22-0)^2))$$

$$Dox = 31.78.$$

Determining a Characteristic Digital Spectrum

To create a digital spectrum for a file under current consideration, we begin with the key information 200, FIG. 84, which resulted from an original file of interest. The digital spectrum determined for this original file is referred to as the characteristic digital spectrum. A digital spectrum for a related file of interest, on the other hand, is determined by its key information from another file. Its digital spectrum is referred to as a related digital spectrum.

The key information actually selected for the characteristic digital spectrum is considered to be a "well-suited key." A "well-suited key" is a key best derived from original data that is substantially similar to the current data in a current file or source file to be examined. The key might even be the actual compression key for the source file under consideration. However, to eventually use the digital spectrum information for the purpose of file comparisons and grouping, it is necessary to use a key that is not optimal for any specific file, but that can be used to define the N-dimensional symbol universe in which all the files of interest are positioned and compared. The more closely a key matches a majority of the files to be examined, the more meaningful it is during subsequent comparisons.

The well-suited key can be used to derive the digital spectrum information for the characteristic file that we use to define the N-dimensional universe in which we will analyze the digital spectra of other files. From above, the following information is known about the characteristic digital spectrum of the file:

The number of symbols (N) in the symbol dictionary
The length of the source file in bits
An ordered vector of symbol frequency counts $$F_i = (F_{0i}, F_{1i}, F_{2i}, F_{3i}, \ldots, F_{Ni}),$$

where F represents the symbol frequency, 0 to N are the symbols in the characteristic file's symbol dictionary, and i represents the characteristic file of interest.
An ordered vector of bit lengths $$B_i = (B_{0i}, B_{1i}, B_{2i}, B_{3i}, \ldots, B_{Ni}),$$

where B represents the bit-length vector, 0 to N are the symbols in the characteristic file's symbol dictionary, and i represents the characteristic file of interest.

Determining a Related Digital Spectrum

Using the key information and digital spectrum of the characteristic file, execute the process described in the fast approximation embodiment for a current, related file of interest, but with the following changes:

1. Create a symbol frequency vector that contains one coordinate position for the set of symbols described in the characteristic file's symbol dictionary.

$$F_j = (F_{0j}, F_{1j}, F_{2j}, F_{3j}, \ldots, F_{Nj}),$$

where F represents the symbol frequency, 0 to N are the symbols in the characteristic file's symbol dictionary, and j represents the related file of interest. Initially, the count for each symbol is zero (0).

2. Parse the data stream of the related file of interest for symbols. As the file is parsed, conduct the following:
   a. Tally the instance of each discovered symbol in its corresponding coordinate position in the symbol frequency vector. That is, increment the respective counter for a symbol each time it is detected in the source file.
   b. Do not Huffman encode or write the detected symbol.
   c. Continue parsing until the end of the file is reached.

3. At the completion of the source file parsing, write a digital spectrum output file that contains the following:
   a. The number of symbols (N) in the symbol dictionary
   b. The length of the source file in bits
   c. The symbol frequency vector developed in the previous steps.

$$F_j = (F_{0j}, F_{1j}, F_{2j}, F_{3j}, \ldots, F_{Nj}),$$

where F represents the frequency vector, 0 to N are the symbols in the characteristic file's symbol dictionary, and the j represents the file of interest.
d. The bit length vector $$B_j = (B_{0j}, B_{1j}, B_{2j}, B_{3j}, \ldots, B_{Nj}),$$

where B represents the bit-length vector, 0 to N are the symbols in the characteristic file's symbol dictionary, and j represents the file of interest.

Additional Methods of Digital Spectrum Analysis

In other embodiments, other methods are used to determine characteristic and related digital spectra. One of these other methods could be to parse for tokens in token-based documents. One example of such is a human language text document with white space or punctuation mark delimited words. Another example of such would be files containing programming language files that are written using specific syntax rules and are parsable by compilers or other pre-processors. In these examples, the parsed tokens (words, keywords, symbols, etc.) can be indexed and counted for each file. The key information then becomes the set of tokens found in the file and the digital spectrum becomes the frequency of each of those symbols from the key for that file.

Using a trivial example, a file might contain the following paragraph:

Some apples are red. Most apples are juicy. Most people enjoy apples.

The key in this case (accounting for case, white space, punctuation, and other tokenizing options) would be:
"some:apples:are:red:most:juicy:people:enjoy"
And the characteristic digital spectrum would be:
1:3:2:1:2:1:1:1

Other embodiments might use other algorithms to determine keys, symbols, tokens, and each file's associated characteristic digital spectrum. No mater the method used to determine relevancy and relevancy groupings, the other algorithms and methods as taught in this invention still apply.

The following portion of this document teaches at least the following five concepts:
1. The digital spectrum information from a file is used to create an informational statistic.
2. The informational statistic is used to determine a file's position in an N-dimensional space.
3. The informational distance between file positions is determined.
4. The informational distances are sorted to reveal relationships between files.
5. Files are assigned to groups based on adjacency (or other distance) relationships.

Using information found in the digital spectra of a group of files, an analysis of similarity can be done. Information from the digital spectrum is used to create an information statistic for a file. Statistics found to be pertinent in doing this analysis include at least:
S1) Frequency of occurrence of each possible symbol (FREQ)
S2) Normalized frequency of occurrence of each possible symbol (NORM FREQ)
S3) Informational content of occurrence of each symbol (INFO)
S4) Normalized information content of occurrence of each symbol (NORM INFO)

For ease of reference, statistic S1 can be called FREQ for frequency, statistic S2 can be called NORM FREQ for normalized frequency, statistic S1 can be called INFO for informational content, and statistic S4 can be called NORM INFO for normalized informational content. A further discussion is given below for each of these statistical values.

As a first example, a digital spectra of three files, F1, F2, and F3 is given with respect to a common set of "N" symbols, e.g., symbols 1, symbol 2 and symbol 3. Each file is processed looking for the number of times each symbol is found in the file. The frequency of each symbol as it is found in each file is recorded along with a total number of symbols in each file. For this example, their respective spectra are:

| File | Description | Total | Symbol 1 | Symbol 2 | Symbol 3 |
|---|---|---|---|---|---|
| File 1 | Number of Symbols | 3 | | | |
| | Sum of all Symbol Occurrences | 9 | | | |
| | Symbol frequencies | | 2 | 4 | 3 |
| | Symbol bits sized | | 7 | 6 | 10 |
| File 2 | Number of Symbols | 3 | | | |
| | Sum of all Symbol Occurrences | 8 | | | |
| | Symbol frequencies | | 4 | 2 | 2 |
| | Symbol bits sized | | 7 | 6 | 10 |
| File 3 | Number of Symbols | 3 | | | |
| | Sum of all Symbol Occurrences | 27 | | | |
| | Symbol frequencies | | 8 | 11 | 8 |
| | Symbol bits sized | | 7 | 6 | 10 |

Using a relevant pattern-derived statistic (possibly including S1, S2, S3, or S4 above), a vector of values is calculated for the N symbol definitions that may occur in each file. A position in N-dimensional space is determined using this vector, where the distance along each axis in N-space is determined by the statistic describing its corresponding symbol.

Specifically in this example, we will use statistic S1 (FREQ) and we have three (3) common symbols that we are using to compare these files and so a 3-dimensional space is determined. Each file is then defined as a position in this 3-dimensional space using a vector of magnitude 3 for each file. The first value in each vector is the frequency of symbol 1 in that file, the second value is the frequency of symbol 2, and the third value is the frequency of symbol 3.

Figure 95:
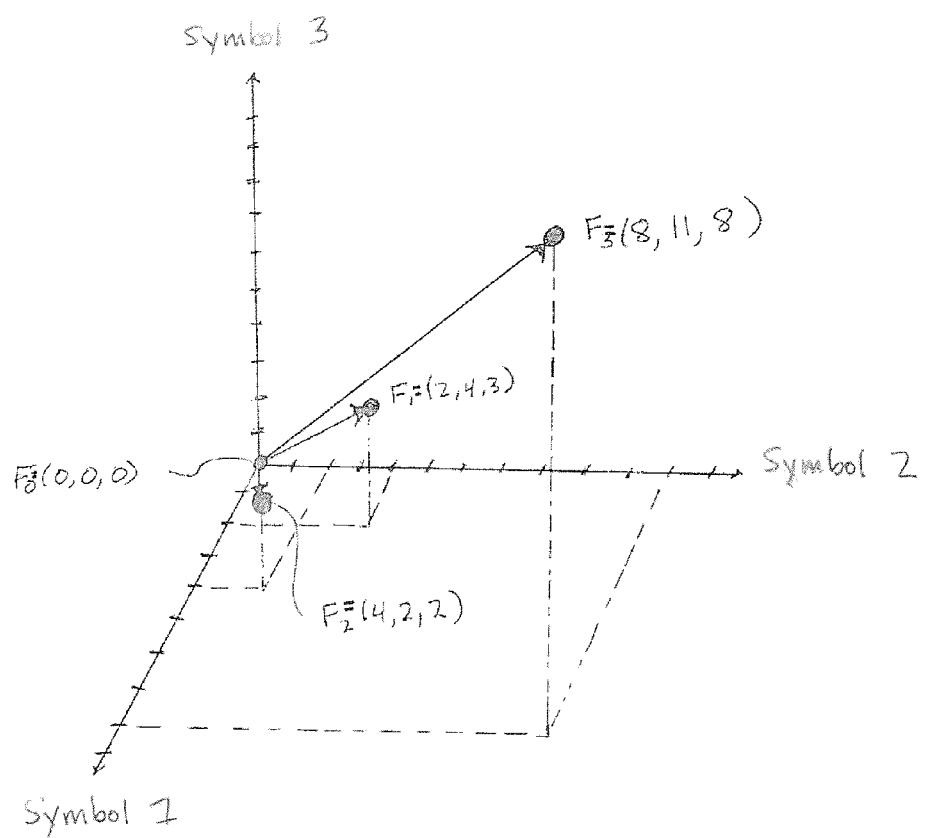

With reference to FIG. 95, these three example files are plotted. The frequency vectors are F1=(2, 4, 3), F2=(4, 2, 2), and F3=(8, 11, 8). The relative position in 3-space (N=3) for each of these files is readily seen.

A matrix is created with the statistic chosen to represent each file. A matrix using the symbol frequency as the statistic looks like the following:

| FileID | Sym1 | Sym2 | Sym3 |
|---|---|---|---|
| F1 | 2 | 4 | 3 |
| F2 | 4 | 2 | 2 |
| F3 | 8 | 11 | 8 |

Using Pythagorean arithmetic, the distance (D) between the positions of any two files (Fx, Fy) is calculated as $$D(Fx,Fy) = \sqrt{(Fx_1-Fy_1)^2 + (Fx_2-Fy_2)^2 + (Fx_n-Fy_n)^2} \quad (1)$$

In the example above, the distance between the position of F1 and F2 is $$\sqrt{(2-4)^2 + (4-2)^2 + (3-2)^2} = \sqrt{(4+4+1)} = \sqrt{9} = 3.00 \quad (2)$$

Similarly, the distance between F1 and F3 is found by $$\sqrt{(2-8)^2 + (4-11)^2 + (3-8)^2} = \sqrt{(36+49+25)} = \sqrt{110} = 10.49 \quad (3)$$

A matrix of distances between all possible files is built. In the above example this matrix would look like this:

| | F1 | F2 | F3 |
|---|---|---|---|
| F1 | 0.00 | 3.00 | 10.49 |
| F2 | 3.00 | 0.00 | 11.53 |
| F3 | 10.49 | 11.53 | 0.00 |

Distance between files

It can be seen graphically in FIG. 95, that the position of File 1 is closer to File 2 than it is to File 3. It can also be seen in FIG. 95 that File 2 is closer to File 1 than it is to File 3. File 3 is closest to File 1; File 2 is slightly further away.

Each row of the matrix is then sorted, such that the lowest distance value is on the left, and the highest value is on the right. During the sort process, care is taken to keep the File ID associated with each value. The intent is to determine an ordered distance list with each file as a reference. The above matrix would sort to this:

| File | | Distance | |
|---|---|---|---|
| F1 | F1 (0.00) | F2 (3.00) | F3 (10.49) |
| F2 | F2 (0.00) | F1 (3.00) | F3 (11.53) |
| F3 | F3 (0.00) | F1 (10.49) | F2 (11.53) |

Sorted Distance between files

Using this sorted matrix, the same conclusions that were previously reached by visual examination can now be determined mathematically. Exclude column 1, wherein it is obvious that the closest file to a given file is itself (or a distance value of 0.00). Column 2 now shows that the closest neighbor to F1 is F2, the closest neighbor to F2 is F1, and the closest neighbor the F3 is F1.

Of course, this concept can be expanded to hundreds, thousands, or millions or more of files and hundreds, thousands, or millions or more of symbols. While the matrices and vectors are larger and might take more time to process, the math and basic algorithms are the same. For example, consider a situation in which there exist 10,000 files and 2,000 symbols.

Each file would have a vector of length 2000. The statistic chosen to represent the value of each symbol definition with respect to each file is calculated and placed in the vector representing that file. An information position in 2000-space (N=2000) is determined by using the value in each vector position to represent the penetration along the axis of each of the 2000 dimensions. This procedure is done for each file in the analysis. With the statistic value matrix created, the distances between each file position are calculated using the above distance formula. A matrix that has 10,000 by 10,000 cells is created, for the 10,000 files under examination. The content of each cell is the calculated distance between the two files identified by the row and column of the matrix. The initial distance matrix would be 10,000×10,000 with the diagonal values all being 0. The sorted matrix would also be 10,000 by 10,000 with the first column being all zeros.

In a smaller example, say ten files, the foregoing can be much more easily demonstrated using actual tables represented as text tables in this document. An initial matrix containing the distance information of ten files might look like this.

| | | | | | Distance Matrix | | | | | |
|---|---|---|---|---|---|---|---|---|---|---|
| Files | F1 | F2 | F3 | F4 | F5 | F6 | F7 | F8 | F9 | F10 |
| F1 | 0.0 | 17.4 | 3.5 | 86.4 | 6.7 | 99.4 | 27.6 | 8.9 | 55.1 | 19.3 |
| F2 | 17.4 | 0.0 | 8.6 | 19.0 | 45.6 | 83.2 | 19.9 | 4.5 | 49.2 | 97.3 |
| F3 | 3.5 | 8.6 | 0.0 | 33.7 | 83.6 | 88.6 | 42.6 | 19.6 | 38.2 | 89.0 |
| F4 | 86.4 | 19.0 | 33.7 | 0.0 | 36.1 | 33.6 | 83.9 | 36.2 | 48.1 | 55.8 |
| F5 | 6.7 | 45.6 | 83.6 | 36.1 | 0.0 | 38.0 | 36.9 | 89.3 | 83.4 | 28.9 |
| F6 | 99.4 | 83.2 | 88.6 | 33.6 | 38.0 | 0.0 | 38.4 | 11.7 | 18.4 | 22.0 |
| F7 | 27.6 | 19.9 | 42.6 | 83.9 | 36.9 | 38.4 | 0.0 | 22.6 | 63.3 | 35.7 |
| F8 | 8.9 | 4.5 | 19.6 | 36.2 | 89.3 | 11.7 | 22.6 | 0.0 | 8.1 | 15.3 |
| F9 | 55.1 | 49.2 | 38.2 | 48.1 | 83.4 | 18.4 | 63.3 | 8.1 | 0.0 | 60.2 |
| F10 | 19.3 | 97.3 | 89.0 | 55.8 | 28.9 | 22.0 | 35.7 | 15.3 | 60.2 | 0.0 |

The distances in each row are then sorted such that an ordered list of distances, relative to each file, is obtained. The file identity relation associated with each distance is preserved during the sort. The resulting matrix now looks like this:

| | | | | | Sorted Distance Matrix | | | | | |
|---|---|---|---|---|---|---|---|---|---|---|
| | 1 | 2 | 3 | 4 | 5 | 6 | 7 | 8 | 9 | 10 |
| F1 | F1(0.0) | F3(3.5) | F5(6.7) | F8(8.9) | F2(17.4) | F10(19.3) | F7(27.6) | F9(55.1) | F4(86.4) | F6(99.4) |
| F2 | F2(0.0) | F8(4.5) | F3(8.6) | F1(17.4) | F4(19.0) | F7(19.9) | F5(45.6) | F9(49.2) | F6(83.2) | F10(97.3) |
| F3 | F3(0.0) | F1(3.5) | F2(8.6) | F8(19.6) | F4(33.7) | F9(38.2) | F7(42.6) | F5(83.6) | F6(88.6) | F10(89.0) |
| F4 | F4(0.0) | F2(19.0) | F6(33.6) | F3(33.7) | F5(36.1) | F8(36.2) | F9(48.1) | F10(55.8) | F1(86.4) | F7(83.9) |
| F5 | F5(0.0) | F1(6.7) | F10(28.9) | F4(36.1) | F7(36.9) | F6(38.0) | F2(45.6) | F9(83.4) | F3(83.6) | F8(89.3) |
| F6 | F6(0.0) | F8(11.7) | F9(18.4) | F10(22.0) | F4(33.6) | F5(38.0) | F7(38.4) | F2(83.2) | F3(88.6) | F1(99.4) |
| F7 | F7(0.0) | F2(19.9) | F8(22.6) | F1(27.6) | F5(36.9) | F10(35.7) | F6(38.4) | F3(43.6) | F9(63.3) | F4(83.9) |
| F8 | F8(0.0) | F2(4.5) | F9(8.1) | F1(8.9) | F6(11.7) | F10(15.3) | F3(19.6) | F7(22.6) | F4(36.2) | F5(89.3) |
| F9 | F9(0.0 | F8(8.1) | F6(18.4) | F3(38.2) | F4(48.1) | F2(49.2) | F1(55.1) | F10(60.2) | F7(63.3) | F5(83.4) |
| F10 | F10(0.0 | F8(15.3) | F1(19.3) | F6(22.0) | F5(28.9) | F7(35.7) | F4(55.8) | F9(60.2) | F3(89.0) | F2(97.3) |

Using the information in columns 1 and 2 a relationship graph can be created of closest neighbor files. From the above matrix, skilled artisans will note the following:

F1's nearest neighbor is F3. Create a group, G1, assign these two files to that group.

F2's nearest neighbor is F8. Create a group, G2, assign these two files to that group.

F3 has already been assigned, its nearest neighbor is F1, and they belong to group G1.

F4's nearest neighbor is F2, which already belongs to G2. Assign F4 to G2 as well.

F5's nearest neighbor is F1, which already belongs to G1. Assign F5 to G1 as well.

F6's nearest neighbor is F8, which already belongs to G2. Assign F6 to G2 as well.

F7's nearest neighbor is F2, which already belongs to G2. Assign F7 to G2 also.

F8's has already been assigned, It's nearest neighbor is F2, and they belong to G2.

F9's nearest neighbor is F8, which already belongs to G2. Assign F9 to G2 also.

F10's nearest neighbor is F8, which already belongs to G2. Assign F10 to G2 also.

The above "nearest neighbor" logic leads to the conclusion that two groups (G1 and G2) of files exist. Group G1 contains F1, F3, F5, while Group G2 contains F2, F4, F6, F7, F8, F9, and F10.

Figure 96:
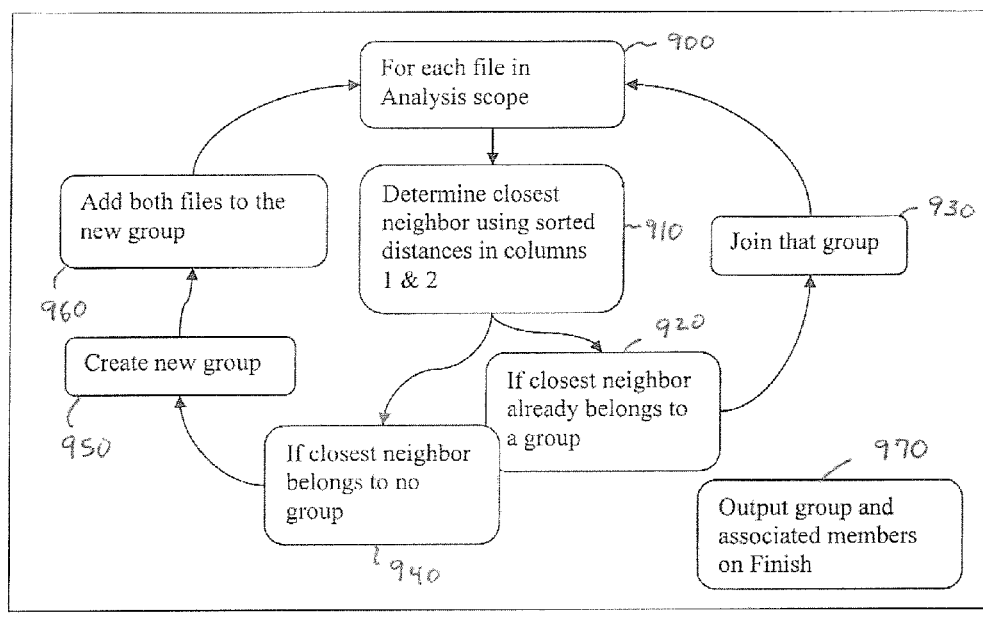

An algorithm for determining groups based on adjacent neighbors is given in FIG. 96. For each file in the scope of analysis 900, a closest neighbor is determined, 910. From the example, this includes using the distance values that have been sorted in columns 1 and 2. If a closest neighbor already belongs to a group at 920, the file joins that group at 930. Else, if the closest neighbor belongs to no group at 940, a new group is created at 950 and both files are added to the new group at 960. From the example, F1's nearest neighbor is F3 and no groups exist at 940. Thus, a new group G1 is created at 950 and both F1 and F3 are assigned, or added. Similarly, F2's nearest neighbor is F8, but only group G1 exists. Thus, a new group G2 is created at 950 for files F2 and F8 at 960. Later, it is learned that F4's nearest neighbor is F2, which already belongs to G2 at step 920. Thus, at 930 file F4 joins group G2. Once all files have been analyzed, the groups are finalized and group processing ceases at 970.

Figure 97:
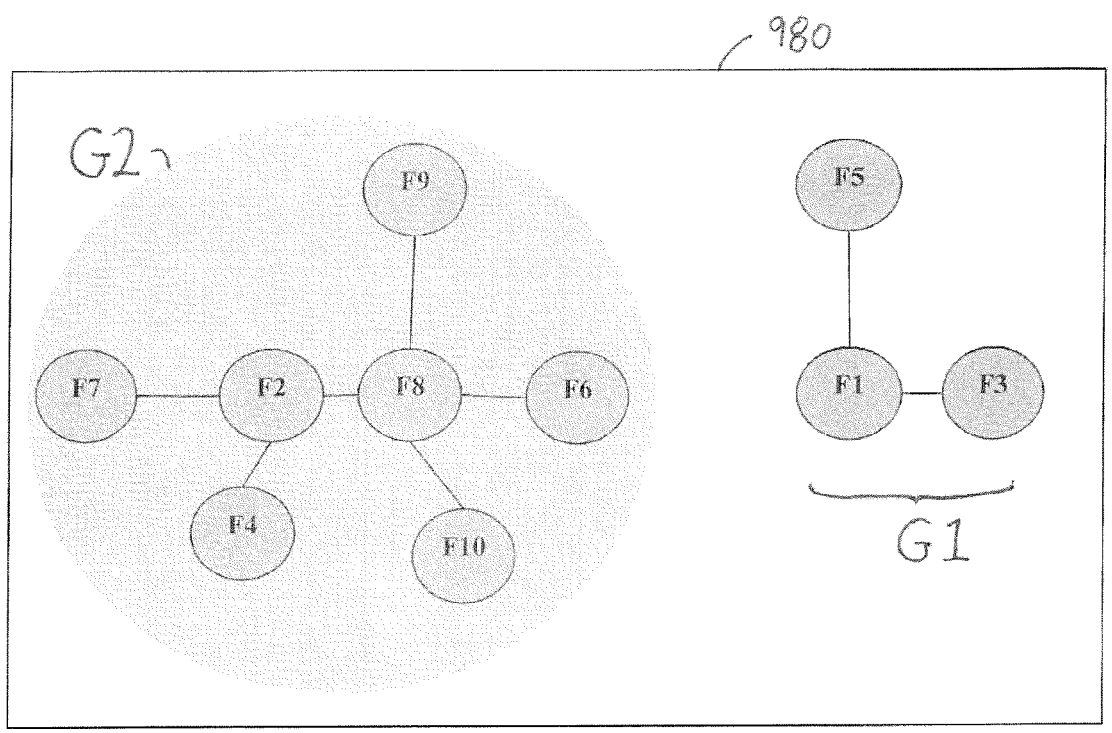

With reference to FIG. 97, a graph of the relationships can be made, although doing so in 2D space is often impossible. In groups G1 and G2 above, a representation of a 2-D graph that meets the neighbor criteria might look like reference numeral 980. Using this grouping method and procedure, it can be deduced that a group of files are pattern-related and are more closely similar to each other, than to files which find membership in another group. Thus, files F1, F3 and F5 are more closely similar than those in group G2.

Statistics Used when Computing Informational Distance Values

A discussion of the various statistics that might be employed to determine informational distance is now entertained. As an example file, the text of the Gettysburg Address (below) is used as a reference file F1. For the following example, the words found in the address are used as symbols. It should be noted that the symbol discovery process outlined previously in this document would not result in textual words being assigned as symbols, rather fragments of bit strings. But for ease of textual presentation, we shall use words as the example symbols.

The Gettysburg Address, File1:
Four score and seven years ago our fathers brought forth on this continent a new nation, conceived in Liberty, and dedicated to the proposition that all men are created equal. Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this. But, in a larger sense, we can not dedicate . . . we can not consecrate . . . we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government: of the people, by the people, for the people, shall not perish from the earth.

A second file, F2, which is exactly two copies of the Gettysburg address, concatenated together (not shown), is also analyzed for a digital spectrum. With the results as follows:

| Digital Spectra F1 and F2. | | | |
|---|---|---|---|
| F1 Freq. | F2 Freq. | Length | Symbol |
| 1 | 2 | 5 | above |
| 1 | 2 | 3 | add |
| 1 | 2 | 8 | advanced |
| 1 | 2 | 3 | ago |
| 1 | 2 | 3 | all |
| 1 | 2 | 10 | altogether |
| 1 | 2 | 3 | any |
| 1 | 2 | 2 | as |
| 1 | 2 | 12 | Battle-field |
| 1 | 2 | 6 | before |
| 1 | 2 | 5 | birth |
| 1 | 2 | 5 | brave |
| 1 | 2 | 7 | brought |
| 1 | 2 | 3 | but |
| 1 | 2 | 3 | But |
| 1 | 2 | 2 | by |
| 1 | 2 | 5 | cause |
| 1 | 2 | 5 | civil |
| 1 | 2 | 4 | come |
| 1 | 2 | 10 | consecrate |
| 1 | 2 | 11 | consecrated |
| 1 | 2 | 9 | continent |
| 1 | 2 | 7 | created |
| 1 | 2 | 7 | detract |
| 1 | 2 | 8 | devotion |
| 1 | 2 | 13 | Devotion-that |
| 1 | 2 | 3 | did |
| 1 | 2 | 5 | died |
| 1 | 2 | 2 | do |
| 1 | 2 | 5 | earth |
| 1 | 2 | 6 | endure |
| 1 | 2 | 7 | engaged |
| 1 | 2 | 5 | equal |
| 1 | 2 | 7 | fathers |
| 1 | 2 | 5 | field |
| 1 | 2 | 5 | final |
| 1 | 2 | 7 | fitting |
| 1 | 2 | 6 | forget |
| 1 | 2 | 5 | forth |
| 1 | 2 | 6 | fought |
| 1 | 2 | 4 | Four |
| 1 | 2 | 11 | Freedom-and |
| 1 | 2 | 5 | their |
| 1 | 2 | 5 | those |
| 1 | 2 | 4 | thus |
| 1 | 2 | 5 | under |
| 1 | 2 | 10 | unfinished |
| 1 | 2 | 7 | us-that |
| 1 | 2 | 9 | vain-that |
| 1 | 2 | 7 | whether |
| 1 | 2 | 5 | will |
| 1 | 2 | 4 | work |
| 1 | 2 | 5 | world |
| 2 | 4 | 2 | be |
| 2 | 4 | 9 | conceived |
| 2 | 4 | 8 | dedicate |
| 2 | 4 | 3 | far |
| 2 | 4 | 4 | from |
| 2 | 4 | 4 | gave |
| 2 | 4 | 2 | it |
| 2 | 4 | 6 | living |
| 2 | 4 | 4 | long |
| 2 | 4 | 3 | men |
| 2 | 4 | 3 | new |
| 2 | 4 | 2 | on |
| 2 | 4 | 2 | or |
| 2 | 4 | 3 | our |
| 2 | 4 | 6 | rather |
| 2 | 4 | 3 | The |
| 2 | 4 | 5 | these |
| 2 | 4 | 2 | us |
| 2 | 4 | 3 | war |
| 2 | 4 | 2 | We |
| 2 | 4 | 4 | what |
| 1 | 2 | 4 | full |
| 1 | 2 | 3 | God |
| 1 | 2 | 11 | government: |
| 1 | 2 | 6 | ground |
| 1 | 2 | 6 | hallow |
| 1 | 2 | 6 | highly |
| 1 | 2 | 7 | honored |
| 1 | 2 | 9 | Increased |
| 1 | 2 | 6 | larger |
| 1 | 2 | 4 | last |
| 1 | 2 | 7 | Liberty |
| 1 | 2 | 6 | little |
| 1 | 2 | 4 | live |
| 1 | 2 | 5 | lives |
| 1 | 2 | 7 | Measure |
| 1 | 2 | 3 | met |
| 1 | 2 | 5 | might |
| 1 | 2 | 5 | never |
| 1 | 2 | 5 | nobly |
| 1 | 2 | 3 | nor |
| 1 | 2 | 4 | note |
| 1 | 2 | 3 | Now |
| 1 | 2 | 6 | perish |
| 1 | 2 | 5 | place |
| 1 | 2 | 4 | poor |
| 1 | 2 | 7 | portion |
| 1 | 2 | 5 | power |
| 1 | 2 | 6 | proper |
| 1 | 2 | 11 | proposition |
| 1 | 2 | 9 | remaining |
| 1 | 2 | 8 | remember |
| 1 | 2 | 7 | resolve |
| 1 | 2 | 7 | resting |
| 1 | 2 | 3 | say |
| 1 | 2 | 5 | score |
| 1 | 2 | 5 | sense |
| 1 | 2 | 5 | seven |
| 1 | 2 | 6 | should |
| 1 | 2 | 9 | struggled |
| 1 | 2 | 5 | take |
| 1 | 2 | 4 | task |
| 1 | 2 | 7 | testing |

-continued

| Digital Spectra F1 and F2. | | | |
|---|---|---|---|
| F1 Freq. | F2 Freq. | Length | Symbol |
| 2 | 4 | 5 | which |
| 3 | 6 | 3 | are |
| 3 | 6 | 4 | dead |
| 3 | 6 | 5 | great |
| 3 | 6 | 2 | is |
| 3 | 6 | 2 | It |
| 3 | 6 | 6 | people |
| 3 | 6 | 5 | shall |
| 3 | 6 | 2 | so |
| 3 | 6 | 4 | they |
| 3 | 6 | 3 | who |
| 4 | 8 | 9 | dedicated |
| 4 | 8 | 2 | in |
| 4 | 8 | 4 | this |
| 5 | 10 | 3 | and |
| 5 | 10 | 3 | can |
| 5 | 10 | 3 | for |
| 5 | 10 | 4 | have |
| 5 | 10 | 6 | nation |
| 5 | 10 | 3 | not |
| 5 | 10 | 2 | of |
| 7 | 14 | 1 | a |
| 8 | 16 | 4 | here |
| 8 | 16 | 2 | to |
| 8 | 16 | 2 | we |
| 9 | 18 | 3 | the |
| 10 | 20 | 4 | that |
| 16 | 32 | 1 | "." |
| 22 | 44 | 1 | "," |
| 262 | 525 | 1 | Space |
| 566 | 1133 | | Total Symbols |

The first statistic mentioned above for use in file comparisons is the pure symbol frequency, S1 or FREQ. S1 is used when the number of times a symbol appears in a file is deemed important. If the frequency of symbol occurrence in the reference file (F1) is compared to frequency of symbol occurrence in a target file (F2), a positional difference will be noted when the symbol frequencies differ. If F1 and F2 are both a single copy of the Gettysburg Address, the positional difference will be zero, as expected. If F2 contains exactly two concatenated copies of the Gettysburg address (separated by a single space), the positional difference will be substantial, even though the informational content of two copies of the Gettysburg address is little different than one copy.

The second statistic, the normalized symbol frequency, S2 or NORM FREQ, provides a tool to evaluate the ratio of occurrence of the symbols. The use of strict symbol counts tends to over exaggerate the distance between two files that are different sizes, but contain substantially the same information. Instead of using the simple frequency of occurrence of each symbol, the frequency is divided by the sum of occurrences of all symbols within that file to provide a normalized statistic. Each value in the information vector is the fraction of all symbol occurrences that are represented by this symbol in that file. Using the above example of F1 and F2, the normalized frequency for each symbol in the two files is nearly equal. Subsequent distance calculations using this normalized statistic will show the two files occupying very nearly the same position in N-space, and therefore highly similar as seen in the next table.

| F1 Freq | F2 Freq | F1 Freq/SUM | F2 Freq/SUM | Symbol |
|---|---|---|---|---|
| 1 | 2 | 1/566 = 0.0017 | 2/1133 = 0.0017 | above |
| 1 | 2 | 0.0017 | 0.0017 | add |
| 1 | 2 | 0.0017 | 0.0017 | advanced |
| 1 | 2 | 0.0017 | 0.0017 | ago |
| 1 | 2 | 0.0017 | 0.0017 | all |
| 1 | 2 | 0.0017 | 0.0017 | altogether |
| 1 | 2 | 0.0017 | 0.0017 | any |
| 1 | 2 | 0.0017 | 0.0017 | as |
| 1 | 2 | 0.0017 | 01.0017 | Battle-field |
| 1 | 2 | 0.0017 | 0.0017 | before |
| 1 | 2 | 0.0017 | 0.0017 | birth |
| 1 | 2 | 0.0017 | 0.0017 | brave |
| 1 | 2 | 0.0017 | 0.0017 | brought |
| 1 | 2 | 0.0017 | 0.0017 | but |
| 1 | 2 | 0.0017 | 0.0017 | But |
| 1 | 2 | 0.0017 | 0.0017 | by |
| 1 | 2 | 0.0017 | 0.0017 | cause |
| 1 | 2 | 0.0017 | 0.0017 | civil |
| 1 | 2 | 0.0017 | 0.0017 | come |
| 1 | 2 | 0.0017 | 0.0017 | consecrate |
| 1 | 2 | 0.0017 | 0.0017 | consecrated |
| 1 | 2 | 0.0017 | 0.0017 | continent |
| 1 | 2 | 0.0017 | 0.0017 | created |
| 1 | 2 | 0.0017 | 0.0017 | detract |
| 1 | 2 | 0.0017 | 0.0017 | devotion |
| 1 | 2 | 0.0017 | 0.0017 | Devotion-that |
| 1 | 2 | 0.0017 | 0.0017 | did |
| 1 | 2 | 0.0017 | 0.0017 | died |
| 1 | 2 | 0.0017 | 0.0017 | do |
| 1 | 2 | 0.0017 | 0.0017 | earth |
| 1 | 2 | 0.0017 | 0.0017 | endure |
| 1 | 2 | 0.0017 | 0.0017 | engaged |
| 1 | 2 | 0.0017 | 0.0017 | equal |
| 1 | 2 | 0.0017 | 0.0017 | fathers |
| 1 | 2 | 0.0017 | 0.0017 | field |
| 1 | 2 | 0.0017 | 0.0017 | final |
| 1 | 2 | 0.0017 | 0.0017 | fitting |
| 1 | 2 | 0.0017 | 0.0017 | forget |
| 1 | 2 | 0.0017 | 0.0017 | forth |
| 1 | 2 | 0.0017 | 0.0017 | fought |
| 1 | 2 | 0.0017 | 0.0017 | Four |
| 1 | 2 | 0.0017 | 0.0017 | Freedom-and |
| 1 | 2 | 0.0017 | 0.0017 | full |
| 1 | 2 | 0.0017 | 0.0017 | God |
| 1 | 2 | 0.0017 | 0.0017 | government: |
| 1 | 2 | 0.0017 | 0.0017 | ground |
| 1 | 2 | 0.0017 | 0.0017 | hallow |
| 1 | 2 | 0.0017 | 0.0017 | highly |
| 1 | 2 | 0.0017 | 0.0017 | honored |
| 1 | 2 | 0.0017 | 0.0017 | Increased |
| 1 | 2 | 0.0017 | 0.0017 | larger |
| 1 | 2 | 0.0017 | 0.0017 | last |
| 2 | 4 | 0.0035 | 0.0035 | men |
| 2 | 4 | 0.0035 | 0.0035 | new |
| 2 | 4 | 0.0035 | 0.0035 | on |
| 2 | 4 | 0.0035 | 0.0035 | or |
| 2 | 4 | 0.0035 | 0.0035 | our |
| 2 | 4 | 0.0035 | 0.0035 | rather |
| 2 | 4 | 0.0035 | 0.0035 | The |
| 2 | 4 | 0.0035 | 0.0035 | these |
| 2 | 4 | 0.0035 | 0.0035 | us |
| 2 | 4 | 0.0035 | 0.0035 | war |
| 2 | 4 | 0.0035 | 0.0035 | We |
| 2 | 4 | 0.0035 | 0.0035 | what |
| 2 | 4 | 0.0035 | 0.0035 | which |
| 3 | 6 | 0.0053 | 0.0053 | are |
| 3 | 6 | 0.0053 | 0.0053 | dead |
| 3 | 6 | 0.0053 | 0.0053 | great |
| 3 | 6 | 0.0053 | 0.0053 | is |
| 3 | 6 | 0.0053 | 0.0053 | It |
| 3 | 6 | 0.0053 | 0.0053 | people |
| 3 | 6 | 0.0053 | 0.0053 | shall |
| 3 | 6 | 0.0053 | 0.0053 | so |
| 1 | 2 | 0.0017 | 0.0017 | Liberty |
| 1 | 2 | 0.0017 | 0.0017 | little |
| 1 | 2 | 0.0017 | 0.0017 | live |
| 1 | 2 | 0.0017 | 0.0017 | lives |

-continued

| F1 Freq | F2 Freq | F1 Freq/ SUM | F2 Freq/ SUM | Symbol |
|---|---|---|---|---|
| 1 | 2 | 0.0017 | 0.0017 | Measure |
| 1 | 2 | 0.0017 | 0.0017 | met |
| 1 | 2 | 0.0017 | 0.0017 | might |
| 1 | 2 | 0.0017 | 0.0017 | never |
| 1 | 2 | 0.0017 | 0.0017 | nobly |
| 1 | 2 | 0.0017 | 0.0017 | nor |
| 1 | 2 | 0.0017 | 0.0017 | note |
| 1 | 2 | 0.0017 | 0.0017 | Now |
| 1 | 2 | 0.0017 | 0.0017 | perish |
| 1 | 2 | 0.0017 | 0.0017 | place |
| 1 | 2 | 0.0017 | 0.0017 | poor |
| 1 | 2 | 0.0017 | 0.0017 | portion |
| 1 | 2 | 0.0017 | 0.0017 | power |
| 1 | 2 | 0.0017 | 0.0017 | proper |
| 1 | 2 | 0.0017 | 0.0017 | proposition |
| 1 | 2 | 0.0017 | 0.0017 | remaining |
| 1 | 2 | 0.0017 | 0.0017 | remember |
| 1 | 2 | 0.0017 | 0.0017 | resolve |
| 1 | 2 | 0.0017 | 0.0017 | resting |
| 1 | 2 | 0.0017 | 0.0017 | say |
| 1 | 2 | 0.0017 | 0.0017 | score |
| 1 | 2 | 0.0017 | 0.0017 | sense |
| 1 | 2 | 0.0017 | 0.0017 | seven |
| 1 | 2 | 0.0017 | 0.0017 | should |
| 1 | 2 | 0.0017 | 0.0017 | struggled |
| 1 | 2 | 0.0017 | 0.0017 | take |
| 1 | 2 | 0.0017 | 0.0017 | task |
| 1 | 2 | 0.0017 | 0.0017 | testing |
| 1 | 2 | 0.0017 | 0.0017 | their |
| 1 | 2 | 0.0017 | 0.0017 | those |
| 1 | 2 | 0.0017 | 0.0017 | thus |
| 1 | 2 | 0.0017 | 0.0017 | under |
| 1 | 2 | 0.0017 | 0.0017 | unfinished |
| 1 | 2 | 0.0017 | 0.0017 | us-that |
| 1 | 2 | 0.0017 | 0.0017 | vain-that |
| 1 | 2 | 0.0017 | 0.0017 | whether |
| 1 | 2 | 0.0017 | 0.0017 | will |
| 1 | 2 | 0.0017 | 0.0017 | work |
| 1 | 2 | 0.0017 | 0.0017 | world |
| 2 | 4 | 0.0035 | 0.0035 | be |
| 2 | 4 | 0.0035 | 0.0035 | conceived |
| 2 | 4 | 0.0035 | 0.0035 | dedicate |
| 2 | 4 | 0.0035 | 0.0035 | far |
| 2 | 4 | 0.0035 | 0.0035 | from |
| 2 | 4 | 0.0035 | 0.0035 | gave |
| 2 | 4 | 0.0035 | 0.0035 | it |
| 2 | 4 | 0.0035 | 0.0035 | living |
| 2 | 4 | 0.0035 | 0.0035 | Long |
| 3 | 6 | 0.0053 | 0.0053 | they |
| 3 | 6 | 0.0053 | 0.0053 | who |
| 4 | 8 | 0.0071 | 0.0071 | dedicated |
| 4 | 8 | 0.0071 | 0.0071 | in |
| 4 | 8 | 0.0071 | 0.0071 | this |
| 5 | 10 | 0.0088 | 0.0088 | and |
| 5 | 10 | 0.0088 | 0.0088 | can |
| 5 | 10 | 0.0088 | 0.0088 | for |
| 5 | 10 | 0.0088 | 0.0088 | have |
| 5 | 10 | 0.0088 | 0.0088 | nation |
| 5 | 10 | 0.0088 | 0.0088 | not |
| 5 | 10 | 0.0088 | 0.0088 | of |
| 7 | 14 | 0.0124 | 0.0124 | a |
| 8 | 16 | 0.0141 | 0.0141 | here |
| 8 | 16 | 0.0141 | 0.0141 | to |
| 8 | 16 | 0.0141 | 0.0141 | we |
| 9 | 18 | 0.0159 | 0.0159 | the |
| 10 | 20 | 0.0177 | 0.0177 | that |
| 16 | 32 | 0.0282 | 0.0282 | "." |
| 22 | 44 | 0.0388 | 0.0388 | "," |
| 262 | 525 | 0.4629 | 0.4629 | Space |
| 566 | 1133 | | | Sum of Symbols |

The third statistic, the informational content represented by a symbol, S3 or INFO, is calculated as the symbol frequency multiplied by the length of the information represented by that symbol. It might be surmised that if symbol A represents 10 bits of original information while symbol B represents original information that is 500 bits, symbol B might be appropriately weighted more when comparing the files. However, if symbol A is used 1000 times, and symbol B is used 5 times, symbol A accounts for 10,000 bits in the file (1000×10=1000) while symbol B accounts for 2500 bits (5×500=2500). Hence, a greater informational content is represented by symbol A than symbol B.

In the fourth statistic, the normalized informational content represented by a symbol, S4 or NORM INFO, is calculated as statistic three divided by the total length of the file in bits (characters in this example). This generates a statistic that specifies what fraction of the total file informational content is represented by a given symbol. F1 size (size of F1 in characters) is 1455; F2 size is 2911 (with 1 space between files). A sampling of the statistics has been calculated in the table below.

| F1 Freq | F2 Freq | Sym Len | F1 Freq* SymLen)/ F1 Size | (F2Freq* SymLen)/ F2 Size | Symbol |
|---|---|---|---|---|---|
| 1 | 2 | 5 | 1 × 5/1455 = 0.0034 | 2 × 5/2911 = 0.0034 | above |
| 1 | 2 | 3 | 1 × 3/1455 = 0.0021 | 2 × 3/2911 = 0.0021 | add |
| 1 | 2 | 8 | | | advanced |
| 1 | 2 | 3 | | | all |
| 1 | 2 | 10 | | | altogether |
| 1 | 2 | 3 | | | any |
| 1 | 2 | 2 | | | as |
| 1 | 2 | 12 | | | Battle-field |
| 1 | 2 | 6 | | | before |
| 1 | 2 | 5 | | | birth |
| 1 | 2 | 5 | | | brave |
| 1 | 2 | 7 | | | brought |
| 1 | 2 | 3 | | | but |
| 1 | 2 | 3 | | | But |
| 1 | 2 | 2 | | | by |
| 1 | 2 | 5 | | | cause |
| 1 | 2 | 5 | | | civil |
| 1 | 2 | 4 | | | come |
| 1 | 2 | 10 | | | consecrate |
| 1 | 2 | 11 | | | consecrated |
| 1 | 2 | 9 | | | continent |
| 1 | 2 | 7 | | | created |
| 1 | 2 | 7 | | | detract |
| 1 | 2 | 8 | | | devotion |
| 1 | 2 | 13 | | | devotion-that |
| 1 | 2 | 3 | | | did |
| 1 | 2 | 5 | | | died |
| 1 | 2 | 2 | | | do |
| 1 | 2 | 5 | | | earth |
| 1 | 2 | 6 | | | endure |
| 1 | 2 | 7 | | | engaged |
| 1 | 2 | 5 | | | equal |
| 1 | 2 | 7 | | | fathers |
| 1 | 2 | 5 | | | field |
| 1 | 2 | 5 | | | final |
| 1 | 2 | 7 | | | fitting |
| 1 | 2 | 6 | | | forget |
| 1 | 2 | 5 | | | forth |
| 1 | 2 | 5 | | | score |
| 1 | 2 | 5 | | | sense |
| 1 | 2 | 5 | | | seven |
| 1 | 2 | 6 | | | should |
| 1 | 2 | 9 | | | struggled |
| 1 | 2 | 5 | | | take |
| 1 | 2 | 4 | | | task |
| 1 | 2 | 7 | | | testing |
| 1 | 2 | 5 | | | their |
| 1 | 2 | 5 | | | those |
| 1 | 2 | 4 | | | thus |
| 1 | 2 | 5 | | | under |
| 1 | 2 | 10 | | | unfinished |

| F1 Freq | F2 Freq | Sym Len | F1 Freq* SymLen)/ F1 Size | (F2Freq* SymLen)/ F2 Size | Symbol |
|---|---|---|---|---|---|
| 1 | 2 | 7 | | | us-that |
| 1 | 2 | 9 | | | vain-that |
| 1 | 2 | 7 | | | whether |
| 1 | 2 | 5 | | | will |
| 1 | 2 | 4 | | | work |
| 1 | 2 | 5 | | | world |
| 2 | 4 | 2 | 2 × 2/1455 = 0.0027 | 4 × 2/2911 = 0.0027 | be |
| 2 | 4 | 9 | | | conceived |
| 2 | 4 | 8 | | | dedicate |
| 2 | 4 | 3 | | | far |
| 2 | 4 | 4 | | | from |
| 2 | 4 | 4 | | | gave |
| 2 | 4 | 2 | | | it |
| 2 | 4 | 6 | | | living |
| 2 | 4 | 4 | | | long |
| 2 | 4 | 3 | | | men |
| 2 | 4 | 3 | | | new |
| 2 | 4 | 2 | | | on |
| 2 | 4 | 2 | | | or |
| 2 | 4 | 3 | | | our |
| 2 | 4 | 6 | | | rather |
| 2 | 4 | 3 | | | The |
| 2 | 4 | 5 | | | these |
| 1 | 2 | 6 | | | fought |
| 1 | 2 | 4 | | | Four |
| 1 | 2 | 11 | | | freedom-and |
| 1 | 2 | 4 | | | full |
| 1 | 2 | 3 | | | God |
| 1 | 2 | 11 | | | government: |
| 1 | 2 | 6 | | | ground |
| 1 | 2 | 6 | | | hallow |
| 1 | 2 | 6 | | | highly |
| 1 | 2 | 7 | | | honored |
| 1 | 2 | 9 | | | Increased |
| 1 | 2 | 6 | | | larger |
| 1 | 2 | 4 | | | last |
| 1 | 2 | 7 | | | Liberty |
| 1 | 2 | 6 | | | little |
| 1 | 2 | 4 | | | live |
| 1 | 2 | 5 | | | lives |
| 1 | 2 | 7 | | | Measure |
| 1 | 2 | 3 | | | met |
| 1 | 2 | 5 | | | might |
| 1 | 2 | 5 | | | never |
| 1 | 2 | 5 | | | nobly |
| 1 | 2 | 3 | | | nor |
| 1 | 2 | 4 | | | note |
| 1 | 2 | 3 | | | Now |
| 1 | 2 | 6 | | | perish |
| 1 | 2 | 5 | | | place |
| 1 | 2 | 4 | | | poor |
| 1 | 2 | 7 | | | portion |
| 1 | 2 | 5 | | | power |
| 1 | 2 | 6 | | | proper |
| 1 | 2 | 11 | | | proposition |
| 1 | 2 | 9 | | | remaining |
| 1 | 2 | 3 | | | met |
| 1 | 2 | 8 | | | remember |
| 1 | 2 | 7 | | | resolve |
| 1 | 2 | 7 | | | resting |
| 1 | 2 | 3 | | | say |
| 2 | 4 | 2 | | | us |
| 2 | 4 | 3 | | | war |
| 2 | 4 | 2 | | | We |
| 2 | 4 | 4 | | | what |
| 2 | 4 | 5 | | | which |
| 3 | 6 | 3 | | | are |
| 3 | 6 | 4 | | | dead |
| 3 | 6 | 5 | | | great |
| 3 | 6 | 2 | | | is |
| 3 | 6 | 2 | | | It |
| 3 | 6 | 6 | | | people |
| 3 | 6 | 5 | | | shall |
| 3 | 6 | 2 | | | so |
| 3 | 6 | 4 | | | they |
| 3 | 6 | 3 | | | who |
| 4 | 8 | 9 | | | dedicated |
| 4 | 8 | 2 | | | in |
| 4 | 8 | 4 | | | this |
| 5 | 10 | 3 | | | and |
| 5 | 10 | 3 | | | can |
| 5 | 10 | 3 | | | for |
| 5 | 10 | 4 | | | have |
| 5 | 10 | 6 | | | nation |
| 5 | 10 | 3 | | | not |
| 5 | 10 | 2 | | | of |
| 7 | 14 | 1 | | | a |
| 8 | 16 | 4 | 8 × 4/1455 = 0.0220 | 16 × 4/2911 = 0.0220 | here |
| 8 | 16 | 2 | | | to |
| 8 | 16 | 2 | | | we |
| 9 | 18 | 3 | | | the |
| 10 | 20 | 4 | | | that |
| 16 | 32 | 1 | | | "." |
| 22 | 44 | 1 | | | "," |
| 262 | 525 | 1 | 262 × 1/1455 = 0.1801 | 525 × 1/2911 = 0.1804 | Space |
| 566 | 1133 | | | | Total Symbols |

Experimental research thus far has shown that the S2 and S4 statistics usually do a better job at defining recognizable groups of files. Of course, other types of statistical comparisons are contemplated using the above mentioned comparison and grouping techniques.

It should be appreciated that since a file's digital spectrum is created without regard to the type of information contained in the file, it applies equally to digital information of files of any type, for example, text, audio, image, data, .pdf, .xls, .ppt, foreign language, etc. In turn, application of a file's grouping and differentiating can be applied across vastly differing technologies. Early possibilities considered by the inventor include, but are not limited to, automated organization of unstructured data based on underlying content (not metadata), research applications, forensic searches, etc.

Reference is now made to FIGS. 98-100*b* which illustrate a user input auto-completion method for executing on a processing device in a computing system environment. In this representative embodiment, the method may be broadly described as including the steps of monitoring, by the processing device, user activity in the computing system environment and triggering, by the processing device, lookup relevancy analysis without user request each time the application tool is used in the computing system environment.

The lookup relevancy analysis may be particularly described as including the steps of: (a) detecting, by the processing device, any common patterns in lookups in the at least one lookup repository; and (c) grouping by the processing device, the lookups into different relevancy groups based upon detected common patterns. Further, the method may be described as including the additional steps of (a) receiving, by the processing device, user input under the application tool; (b) determining, by the processing device, which relevancy group is closest to the user input; and (c) presenting, by the processing device, lookups from the closest relevancy group to the user for possible selection and use.

In one useful embodiment of the invention the common patterns in the lookups are arbitrarily detected. In this context, "arbitrarily detected" or "arbitrarily detecting" means there are no preconceived parameters that limit the ability of the relevancy agent to identify common patterns of any type in the lookups. Thus, the relevancy agent is able to discover patterns that might otherwise not be considered and therefore, overlooked. Therefore, the relevancy agent exhibits an intelligence that effectively expands the abilities of the auto-completion method beyond those currently available in the art.

Advantageously, the method and computer program product described function as an auto-complete tool with an enhanced ability to, for example, complete partial code and even non-complete or non-compiliable code user inputs with sample code from a lookup in the closest relevancy group. The sample code performs the operation or accomplishes the goal suggested by the partial code. Further, the method and related computer program product has the ability to look for existing code in the same or different projects that is "duplicate" code thereby turning that code into a common method or procedure.

Figure 98:
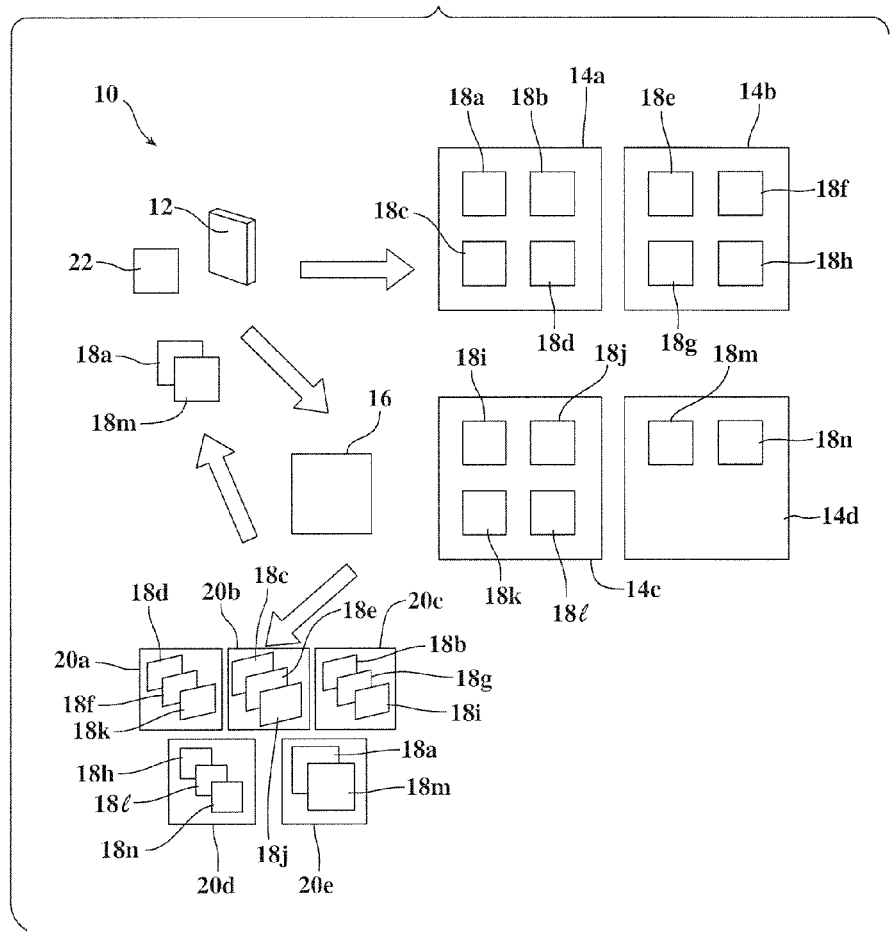
FIG. 98 is a schematical block diagram illustrating a user input auto-completion method that groups lookups for an application into different relevancy groups based upon detected common patterns.

Reference is now made to FIG. 98 schematically illustrating one possible embodiment of the user input auto-completion method and computer program product 10 where the application tool is an IDE. This illustration is only exemplary in nature and it should be appreciated that the application tool need not be limited to an IDE.

As illustrated, the IDE 12 is configured with sample code repositories 14a-14d. The sample code repositories 14a-14d may be local or on-line. The processing device 16 functions in accordance with the relevancy agent to detect common patterns in lookups 18a-18n in the repositories 14a-14d and groups the lookups 18a-18n into different relevancy groups 20a-20e based upon the detected common patterns.

When the processing device 16 receives a user input 22, the processing device determines which relevancy group 20a-20e is closest to that user input and then presents the lookups/sample codes 18a, 18n from the closest relevancy group 20e to the user for possible selection and use. These determining and presenting steps are triggered automatically by the processing device 16 each time the processing device receives a new or modified user input.

Figure 99B:
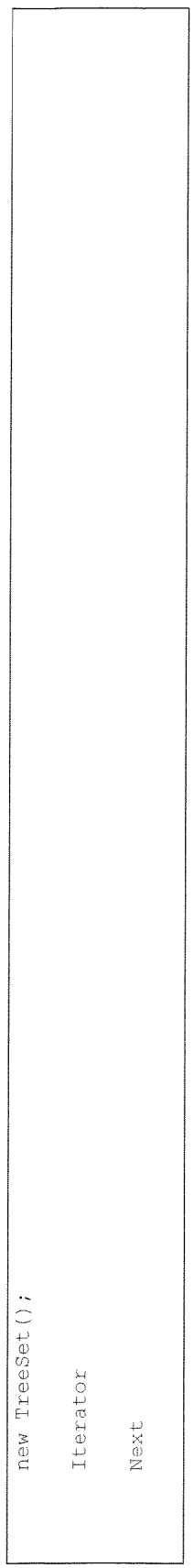
Figure 99C:
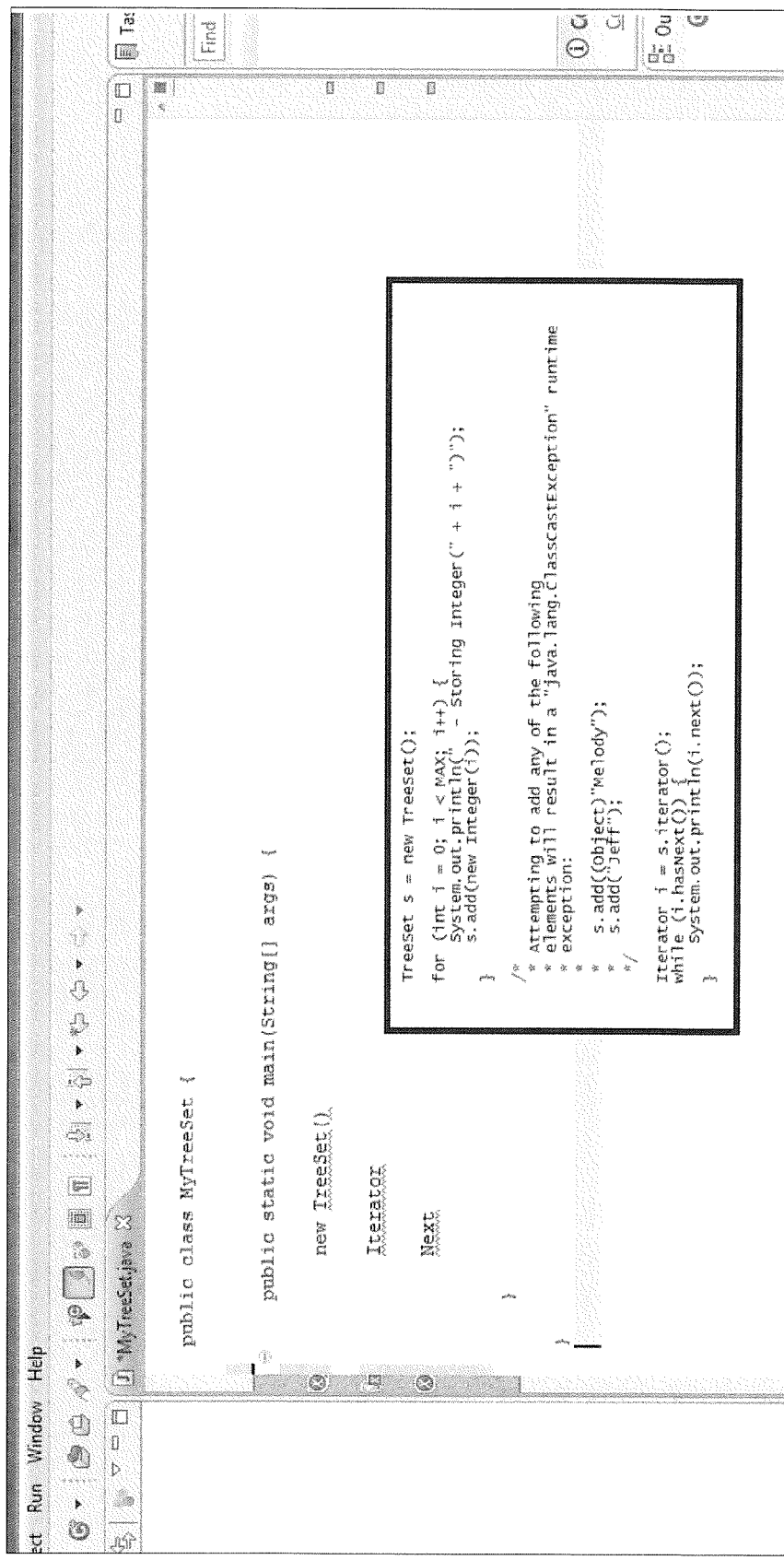

Reference is now made to FIGS. 99a-99c illustrating an example application for the user input auto-complete method and related computer program product compared to a prior art auto-complete scheme. The user is programming in JAVA (computer programming language) under a prior art auto-complete scheme. The user is unable to recall exactly how to reiterate through a TreeSet class and, accordingly, the user opens a web browser and searches for "(JAVA(computer programming language)) sample code Tree set" and finds a hit on an JAVA example and the user is presented with the display on the monitor as illustrated in FIG. 99a. The user then does a copy and paste from his browser into his IDE tool and continues programming. As should be appreciated, under the prior art auto-complete scheme the user had to manually open a web browser and complete a search for the JAVA (computer programming language) sample code TreeSet in order to complete the programming task.

In contrast, under the current user input auto-complete method and related computer program product the user could simply start typing relative technical terms related to the intended purpose such as a partial code entry or a non-complete or non-compilable code entry. See the illustrated screen display in FIG. 99b. Upon receiving this user input the processing device, as directed by the relevancy agent, would determine which relevancy group is closest to the user input and present lookups from the closest relevancy group to the user for possible selection and use. As illustrated in FIG. 99c, the display screen would automatically present a pop-up window for "sample code auto-complete". Stated another way, the method and computer program product would note the three lines of incorrect syntax submitted as user input to determine which relevancy group includes sample code most closely related to the input and then select sample code files from that relevancy group that matched the input for display. Thus, for example, the user could be presented with a display monitor as illustrated in FIG. 99c. As should be appreciated, the user input auto-completion method and computer program product provides for automatic completion of the code without manually opening a web browser or completing any searches as with the prior art schemes. This reduces work time and greatly improves the efficiency of the user.

The current user input auto-completion method and computer program product adds support to an existing application tool such as an IDE like Eclipse. The method and product is capable of identifying and collecting snippets of code that are relevant and match any of the following conditions:

(1) blocks of syntactically incorrect codes:

(2) blocks of code that have special comments such as /*samplecode*/;

(3) blocks of code that are selected and marked as sample code using IDE specific menus including right click; and (4) blocks of code that are formatted using special formatting tools (font, size, background, etc.).

Figure 100A:
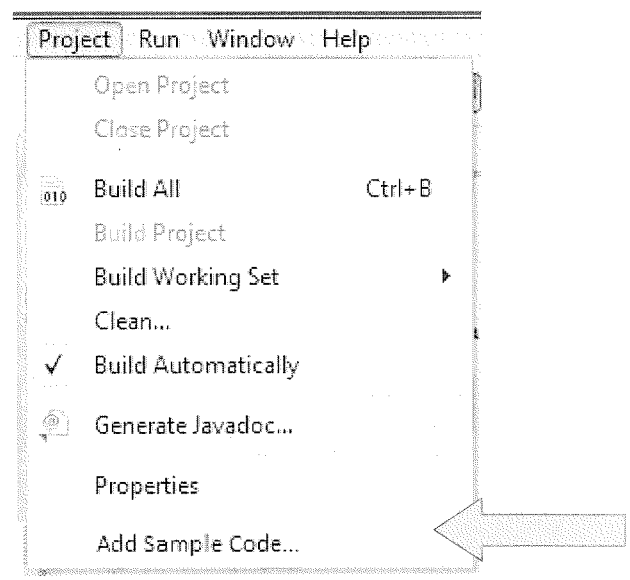
FIGS. 100*a* and 100*b* are sample display screens further illustrating the user input auto-completion method schematically illustrated in FIG. 98.
Figure 100B:
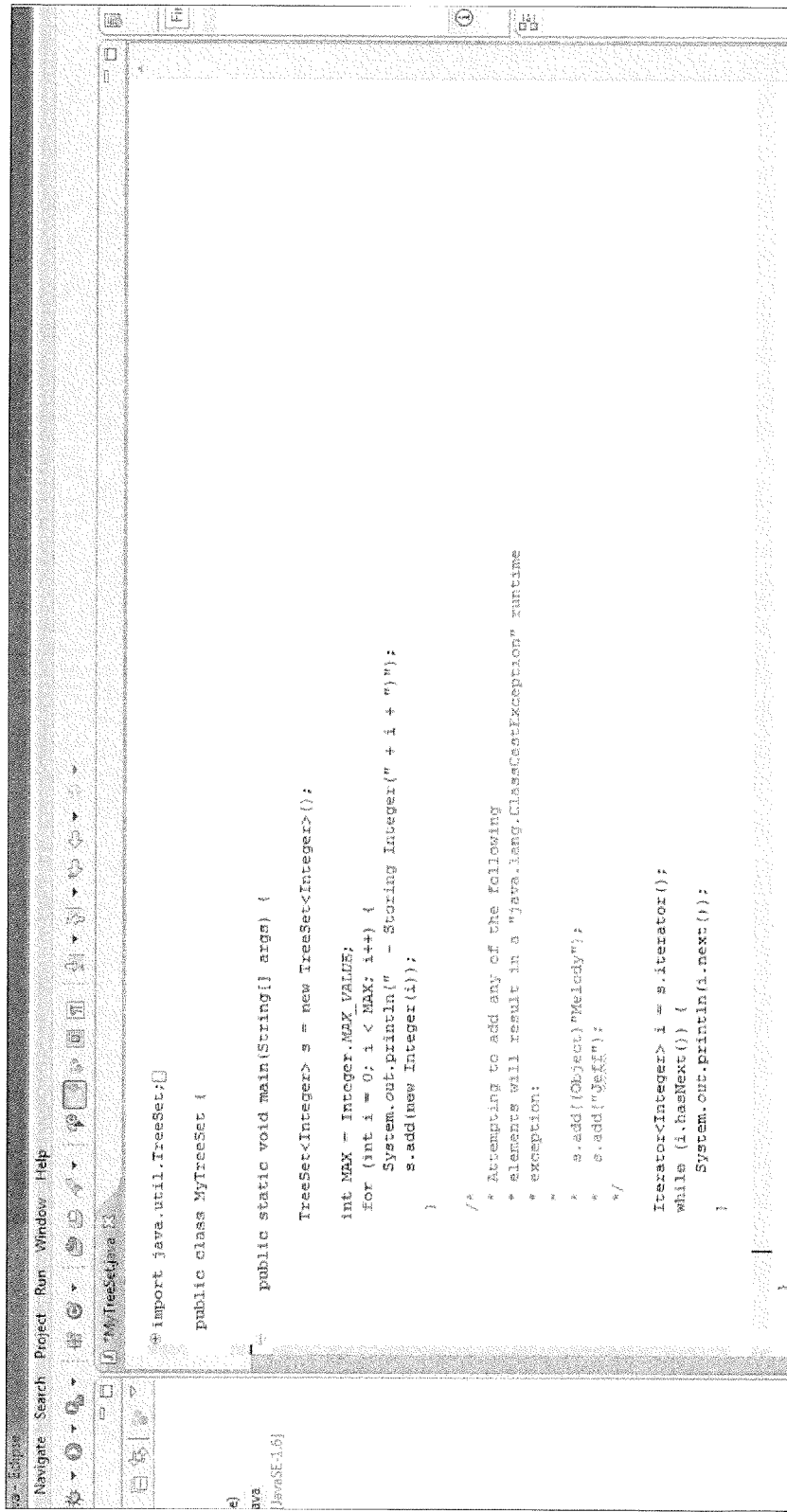

The method and computer product are also configured to look at known sets of sample code. Thus, for example, the IDE could have an interface that would be displayed to the user on a monitor as illustrated in FIG. 100a. Such an interface would allow the user to add one or more sets of sample code. The sets of sample code would be processed in the relevancy groups and when the user uses one of the above mechanisms to mark a block of code for possible use, the IDE would determine which relevancy group includes new snippets of code most closely related to the user input. The IDE would then prompt the user to use any of the other sample code snippets in that relevancy group since they are most likely to be useful to the user in order to complete the desired programming task. In the event the user selected any of those sample code snippets, the IDE would take that code and automatically paste it into the current editor and replace the original code. Thus, the on-screen result would look something like that illustrated in FIG. 100b.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, an no unnecessary limitations are to be implied, for modifications will become evident to those skilled in the art upon reading this disclosure and may be made without departing from the spirit or scope of the invention. Relatively apparent modifications, of course, including combining various features of one or more figures with the features of one or more of the other features.

What is claimed:

1. A user input auto-completion method for executing on a processing device, comprising:

running, on said processing device, an application tool having at least one lookup repository;

detecting, by said processing device, any common patterns in lookups in said at least one lookup repository, wherein said at least one lookup repository includes a first, local repository and a second, on-line repository and said method includes:

detecting, by said processing device, any common patterns in said lookups in both said first, local repository and said second, on-line repository; and grouping, by said processing device, said lookups from said first, local repository and said second, on-line repository into different relevancy groups based upon detected common patterns whereby at least one of said different relevancy groups includes lookups from both of said first, local repository and said second, on-line repository; and grouping, by said processing device, said lookups into different relevancy groups based upon detected common patterns, the patterns detected on any arbitrary sized set of data from the repository for any type, kind or format associated with the set of data.

2. The method of claim 1, including:
receiving, by said processing device, user input under said application tool;
determining, by said processing device, which relevancy group is closest to said user input;
presenting, by said processing device, lookups from said closest relevancy group to said user for possible selection and use; and
triggering, by said processing device, the determining and presenting steps without user request each time new or modified user input is received by said processing device.

3. The method of claim 1, including evaluating, by said processing device, (a) all lookups in said at least one lookup repository that consist of parsable data token by token and (b) all lookups in said at least one lookup repository that consist of binary data bit by bit.

4. The method of claim 1, wherein said application tool includes multiple lookup repositories and said method includes grouping, by said processing device, lookups from different lookup repositories into a single relevancy group based upon detected common patterns in said lookups.

5. The method of claim 4, further including placing, by said processing device, a single lookup into multiple relevancy groups based upon detected common patterns in said single lookup shared with other lookups in said multiple relevancy groups.

6. The method of claim 1, wherein said detecting step includes arbitrarily detecting, by said processing device, any arbitrary common patterns in lookups in said at least one lookup repository.

7. The method of claim 1, wherein said application tool is an integrated development environment tool for writing programming code, said lookups comprise sample code and said method includes auto-completing programming code, by said processing device, for said user.

8. A method, comprising:
monitoring, by a processing device, user activity in a computing system environment; and
triggering, by said processing device, lookup relevancy analysis without user request each time an application tool is used in said computing system environment, the lookup relevancy analysis includes detection of patterns on data of any arbitrary size and for any type, kind, or format associated with the data, wherein said lookup relevancy analysis includes:
detecting, by said processing device, any common patterns in lookups in said at least one lookup repository;

grouping, by said processing device, said lookups into different relevancy groups based upon detected common patterns;
wherein said application tool is an integrated development environment tool for writing programming code, said lookups comprise sample code and said method includes auto-completing programming code, by said processing device, for said user, and wherein detecting further includes detecting by said processing device, any common patterns in said lookups in a local lookup repository and an on-line lookup repository and said grouping step includes grouping, by said processing device, said lookups from said local lookup repository and said on-line lookup repository into different relevancy groups based upon detected common patterns.

9. The method of claim 8, further including:
receiving, by said processing device, user input under said application tool;
determining, by said processing device, which relevancy group is closest to said user input; and
presenting, by said processing device, lookups from said closest relevancy group to said user for possible selection and use.

10. The method of claim 9, including evaluating (a) all lookups in said at least one lookup repository that consist of parsable data token by token and (b) all lookups in said at least one lookup repository that consist of binary data bit by bit.

11. The method of claim 10, wherein said application tool includes multiple lookup repositories and said method includes grouping, by said processing device, lookups from different lookup repositories into a single relevancy group based upon detected common patterns in said lookups.

12. The method of claim 8, including creating relevancy groups with lookups from said local lookup repository and said on-line lookup repository.

13. A method, comprising:
monitoring, by a processing device, user activity of a user in a computing system environment; and
triggering, by said processing device, lookup relevancy analysis without user request each time an application tool is used in said computing system environment the lookup relevancy analysis includes detection of patterns on data of any arbitrary size and for any type, kind, or format associated with the data, wherein said application tool is an integrated development environment tool for writing programming code, said lookup comprises sample code and said method includes auto-completing programming code, by said processing device, for said user, and detecting, by said processing device, any common patterns in said lookup in a local lookup repository and an on-line lookup repository, and grouping, by said processing device, said lookup from said local lookup repository and said on-line lookup repository into different relevancy groups based upon the common patterns.

14. The method of claim 13, further including:
receiving, by said processing device, user input under said application tool;
determining, by said processing device, which of the relevancy groups is closest to said user input; and
presenting lookups from said closest relevancy group to said user for possible selection and use.

* * * * *